United States Patent [19]

Aoki et al.

[11] Patent Number: 5,433,512
[45] Date of Patent: Jul. 18, 1995

[54] BRAKING SYSTEM FOR ELECTRIC VEHICLE

[75] Inventors: Yasushi Aoki; Takeshi Ohba; Iwao Nakamura; Ikuo Nonaga; Yukihisa Ishii, all of Saitama, Japan

[73] Assignee: Honda Giken Kogyo Kabushiki Kaisha, Tokyo, Japan

[21] Appl. No.: 152,792

[22] Filed: Nov. 15, 1993

[30] Foreign Application Priority Data

Nov. 13, 1992 [JP] Japan .................. 4-303444

[51] Int. Cl.$^6$ .................. B60T 13/74; B60T 8/58; B60L 7/10
[52] U.S. Cl. .................. 303/3; 180/65.1; 180/165; 188/156; 188/159; 303/20; 303/100
[58] Field of Search .................. 303/3, 112, 100, 93, 303/113.1, 20, 15, 113.2, 113.4, 9.61, 9.62, 9.75, 91, 102–111; 180/165, 65.1–65.8, 197; 364/426.01, 426.02, 426.03; 188/156, 181 T, 157–165, 349; 318/376, 371; 477/188, 203, 20, 7, 15

[56] References Cited

U.S. PATENT DOCUMENTS

| | | | |
|---|---|---|---|
| 3,621,929 | 11/1971 | Oberthur | 180/65 |
| 4,005,759 | 2/1977 | Farr | 188/156 X |
| 4,181,366 | 1/1980 | Dobner | 303/3 |
| 4,270,806 | 6/1981 | Venkataperumai et al. | 303/3 |
| 4,962,969 | 10/1990 | Davis | 303/3 |
| 5,024,489 | 6/1991 | Tanaka et al. | 303/3 |
| 5,148,883 | 9/1992 | Tanaka et al. | 180/165 |
| 5,253,929 | 10/1993 | Ohori | 188/181 T |
| 5,294,191 | 3/1994 | Giorgetti et al. | 188/156 X |
| 5,312,167 | 5/1994 | Giorgetti et al. | 303/3 |
| 5,318,355 | 6/1994 | Asanuma et al. | 188/156 |

Primary Examiner—Douglas C. Butler
Attorney, Agent, or Firm—Lyon & Lyon

[57] ABSTRACT

In an electric vehicle capable of regenerative braking of wheels, a differential pressure regulating valve is interposed between a master cylinder for generating a hydraulic braking pressure by operation of a brake operating element and a brake cylinder for a driven wheel. In a first region in which an input hydraulic pressure into the differential pressure regulating valve is equal to or less than a predetermined value, an output hydraulic pressure from the differential pressure regulating valve is maintained at zero, and in a second region in which the input hydraulic pressure exceeds the predetermined value, the output hydraulic pressure is lower than the input hydraulic pressure by the predetermined value. Further, in the first region, a regenerative braking force is determined in proportion to a quantity of operation of the brake operating element, and in the second region, the regenerative braking force is maintained at a constant value irrespective of the quantity of operation of the brake operating element. Thus, the regenerative braking force is preferentially generated at the start of braking, and after the regenerative braking force reaches a limit, a deficiency of braking force can be made up by the hydraulic braking force. Moreover, a sum total of the hydraulic braking force and the regenerative braking force can be proportioned to the quantity of operation of the brake operating element.

52 Claims, 50 Drawing Sheets

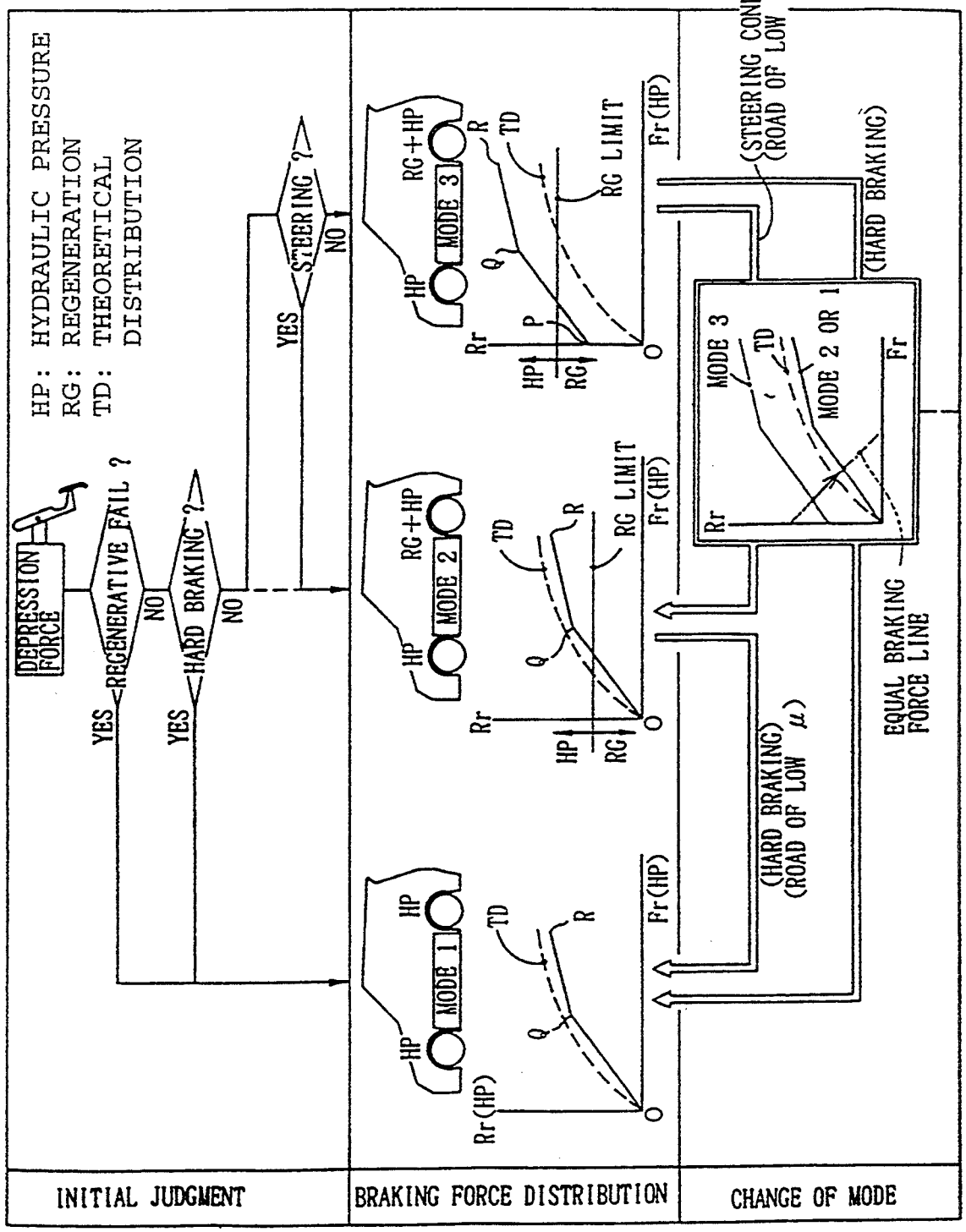

(MODE 3)

(MODE 2)

(MODE 1)

Regenerative braking force limit ($T_{RGLM}$)

Quantity of operation of differential pressure regulating valve ($\Delta P_{OF}$, $\Delta P_{OR}$)

$\Delta P_{OF} = \dfrac{1}{K_F + K_R} T_{RGLM}$ $\Delta P_{OR} = \dfrac{1}{K_F + K_R} T_{RGLM}$ Regenerative braking force limit ($T_{RGLM}$)

Quantity of operation of differential pressure regulating valve ($\Delta P_{OR}$)

$\Delta P_{OR} = \dfrac{1}{K_R} T_{RGLM}$

FIG. 49 A
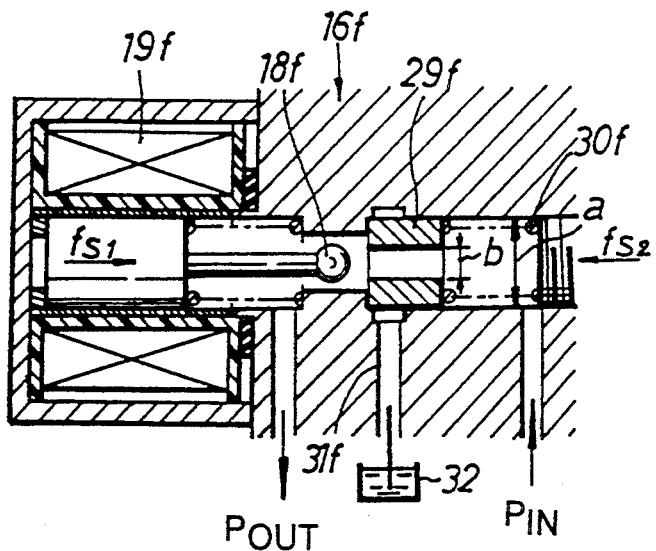
FIG. 49 B
FIG. 49 C
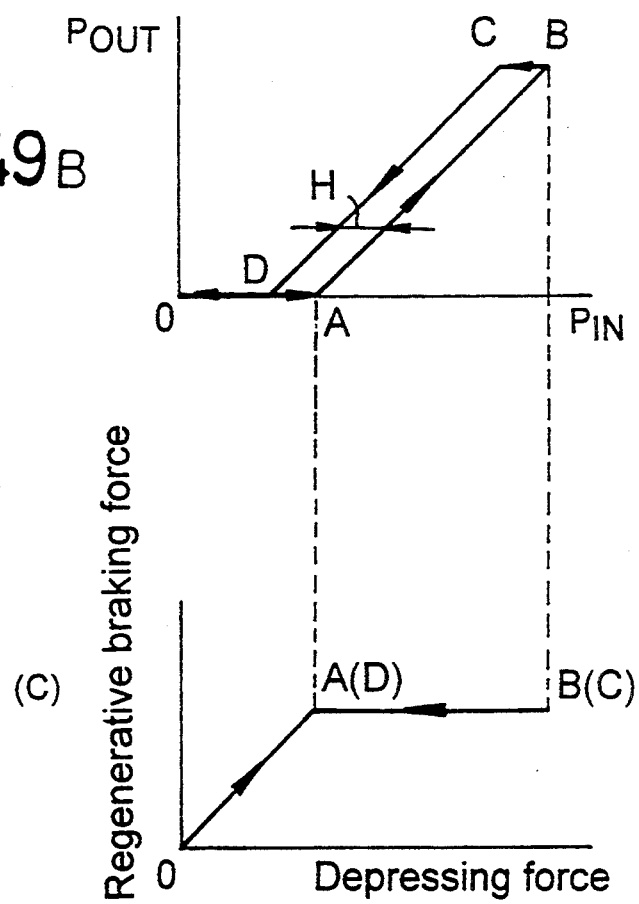

BRAKING SYSTEM FOR ELECTRIC VEHICLE

BACKGROUND OF THE INVENTION

1. Field of the Invention

The present invention relates to a braking system for an electric vehicle including driven wheels which are connected to and driven by a motor using a battery as an energy source and which are braked hydraulically and regeneratively on the basis of the operation of a brake operating element.

2. Description of the Prior Art

There are conventionally known electric vehicles having driven wheels capable of being braked hydraulically and regeneratively, which are described in Japanese Patent Publication No. 28933/74. In such electric vehicle, the recovery of energy by a regenerative braking can be preferentially performed to charge the battery as much as possible, and after the magnitude of a regenerative braking force reaches a limit, a hydraulic braking force can be additionally used to insure a sufficient braking force.

In order to preferentially exhibit the regenerative braking force, it is conceived that while the depression force on a brake pedal is small, the hydraulic braking pressure generated by a master cylinder may be cut by a differential pressure regulating valve so that it is not transmitted to a brake cylinder, and when the depression force on a brake pedal is increased, the hydraulic braking pressure generated by the master cylinder may be reduced by the differential pressure case, the differential pressure regulating valve has various input and output characteristics and hence, if the characteristic of the differential pressure regulating valve and the magnitude of the regenerative braking force do not suit to each other, the sum total of the hydraulic braking force and the regenerative braking force is not proportional to the quantity of brake pedal operated, and the feeling of braking may be degraded.

In a vehicle using an internal combustion engine as a drive source, in addition to a hydraulic braking force generated by the operation of the brake pedal, a so-called engine braking force can be applied by releasing the accelerator pedal. On the other hand, in an electric vehicle in which a motor functions as a power generator to exhibits a regenerative braking force, if the regenerative braking force is exhibited by the operation of the brake pedal, a braking force corresponding to an engine brake of the vehicle including the internal combustion engine as a drive source is not obtained, resulting in a degraded feeling of braking. In addition, if the regenerative braking force is controlled by the operation of the accelerator pedal, most of the kinetic energy of the vehicle is abandoned by the hydraulic braking, resulting in a poor economy.

SUMMARY OF THE INVENTION

Accordingly, it is an object of the present invention to enhance the feeling of braking of an electric vehicle in which a regenerative braking is conducted, and to enhance the efficiency of recovery of energy by the regenerative braking.

To achieve the above object, according to the present invention, there is a braking system for an electric vehicle having a driven wheel which is connected to and driven by a motor using a battery as an energy source, wherein the driven wheel is braked hydraulically and regeneratively on the basis of the operation of a brake operating element, and a differential pressure regulating valve is interposed between a master cylinder for generating a hydraulic braking pressure by the operation of the brake operating element and a brake cylinder for the driven wheel so as to reduce the hydraulic braking pressure from the master cylinder and transmit a reduced pressure to the brake cylinder, wherein the differential pressure regulating valve is formed to have such a characteristic that an output hydraulic pressure is maintained substantially at zero in a first region in which an input hydraulic pressure is equal to or lower than a predetermined value, and the output hydraulic pressure is lower than the input hydraulic pressure by substantially the predetermined value in a second region in which the input hydraulic pressure exceeds the predetermined value, and wherein, in the first region, a regenerative braking force is determined in proportion to a quantity of operation of the brake operating element, and in the second region, the regenerative braking force is maintained at a constant value irrespective of the quantity of operation of the brake operating element.

With the above feature of the present invention, if there is no hysteresis between the input and output hydraulic pressures into and from the differential pressure regulating valve, the regenerative braking force can preferentially be generated at the start of braking, and after the regenerative braking force has reached a limit, a deficiency of braking force can be made up by the hydraulic braking force, but also the sum total of the hydraulic braking force and the regenerative braking force can be proportioned to the quantity of operation of the brake operating element to provide a good feeling of braking.

In addition, according to the present invention, there is a braking system for an electric vehicle having a driven wheel which is connected to and driven by a motor using a battery as an energy source, wherein the driven wheel is braked hydraulically and regeneratively on the basis of the operation of a brake operating element, and a differential pressure regulating valve is interposed between a master cylinder for generating a hydraulic braking pressure by the operation of the brake operating element and a brake cylinder for the driven wheel so as to reduce the hydraulic braking pressure from the master cylinder and transmit a reduced pressure to the brake cylinder, wherein the differential pressure regulating valve is formed to have such a characteristic that when a quantity of operation of the brake operating element is increased, an output hydraulic pressure is maintained at zero in a first region in which an input hydraulic pressure is increased but at or below a predetermined value, and the output hydraulic pressure is increased to the largest value in a second region in which the input hydraulic pressure is increased above the predetermined value, and when the quantity of operation of the brake operating element is decreased, the output hydraulic pressure is maintained at a constant value in a third region in which the input hydraulic pressure is decreased but still at or level above the predetermined value, and the output hydraulic pressure is decreased to zero in a fourth region in which the input hydraulic pressure is decreased lower than the predetermined value, and wherein a regenerative braking force is increased in the first region in accordance with an increase in the quantity of operation of the brake operating element; the regenerative braking force is maintained at a constant value in the second region, irrespective of the quantity of operation of the brake operating element; the regenerative braking force is decreased in the third region in accordance with a decrease in the quantity of operation of the brake operating element; and the regenerative braking force is maintained at zero in the fourth region, irrespective of the quantity of operation of the brake operating element.

With the above feature of the invention, even if there is a hysteresis between the input and output hydraulic pressures into and from the differential pressure regulating valve, the regenerative braking force can be preferentially generated at the start of braking, and after the regenerative braking force has reached a limit, a deficiency of braking force can be made up by the hydraulic braking force, but also when the quantity of operation of the brake operating element is either increased or decreased, the sum total of the hydraulic braking force and the regenerative braking force can be proportioned to the quantity of operation of the brake operating element to provide a good feeling of braking.

Further, according to the present invention, there is provided a braking system for an electric vehicle having a driven wheel which is connected to and driven by a motor using a battery as an energy source, wherein the driven wheel is braked hydraulically and regeneratively on the basis of the operation of a brake operating element and an accelerator operating element, the braking system comprising means for determining a first regenerative braking force on the basis of an operated state of the brake operating element, means for determining a second regenerative braking force on the basis of an operated state of the accelerator operating element and the number of revolutions of the motor, and means for producing a regenerative braking force corresponding to a sum of the first and second regenerative braking forces to regeneratively brake the driven wheel.

With the above feature of the invention, the first regenerative braking force is determined on the basis of the operated state of the brake operating element and the second regenerative braking force is determined on the basis of the operated state of the accelerator operating element and the number of revolutions of the motor, so that the sum total of the first and second regenerative braking forces is outputted to regeneratively brake the driven wheels. Therefore, a braking force corresponding to a hydraulic braking force in a vehicle using an internal combustion engine as a drive source and a regenerative braking force corresponding to an engine brake can be exhibited simultaneously, thereby providing a good feeling of braking free from a sense of disharmony, and an enhanced efficiency of recovery of energy by the regenerative braking.

The above and other objects, features and advantages of the invention will become apparent from the following description of preferred embodiments taken in conjunction with the accompanying drawings.

BRIEF DESCRIPTION OF THE DRAWINGS

FIGS. 1 to 48 illustrate a preferred embodiment of the present invention, wherein FIG. 1 is a diagram illustrating the entire arrangement of an electric vehicle equipped with a braking system according to the present invention;

FIG. 2 is a block diagram of a control system;

FIG. 3 is a diagram for explaining the outline of braking modes;

FIG. 6 is a flow chart of a main routine;

FIG. 7 is a flow chart of a vehicle speed calculating routine;

FIG. 8 is a flow chart of a steering-angle calculating routine;

FIG. 9 is a diagram illustrating the vehicle which is in a normal turning movement;

FIG. 10 is a flow chart of an engine brake-corresponding regenerative braking force calculating routine;

FIG. 11 is a graph illustrating the relationship of the motor torque relative to the number of revolutions of a motor and the accelerator pedal opening degree;

FIG. 12 is a flow chart of a regenerative limit calculating routine;

FIG. 13 is a graph illustrating the relationship of the limit value of the regenerative braking force relative to the number of revolutions of the motor;

FIG. 14 is a graph illustrating the relationship of the battery temperature factor relative to the battery temperature;

FIG. 15 is a graph illustrating the relationship of the limit reducing factor relative to the battery overvoltage;

FIG. 16 is a graph illustrating variations in battery voltage and regenerative braking force attendant on the control of battery voltage;

FIG. 17 is a flow chart of a mode determining routine;

FIG. 18 is a flow chart of a hard-braking judging routine;

FIG. 19 is a flow chart of a steering condition judging routine;

FIG. 20 is a graph illustrating the relationship of the vehicle speed;

FIG. 21 is a flow chart of another embodiment of a steering condition judging routine;

FIG. 22 is a first portion of a flow chart of a differential pressure regulating value operation quantity determining routine;

FIG. 23 is a second portion of the flow chart of the differential pressure regulating value operation quantity determining routine;

FIG. 24 is a third portion of the flow chart of the differential pressure regulating value operation quantity determining routine;

FIG. 28 is a graph illustrating the functioning provided when the hydraulic braking force is delay-controlled;

FIG. 29 is a first portion of a regenerative braking force command value determining routine;

FIG. 30 is a second portion of the regenerative braking force command value determining routine;

FIG. 31 is a third portion of the regenerative braking force command value determining routine;

FIG. 32 is a fourth portion of the regenerative braking force command value determining routine;

FIG. 33 is a graph illustrating the functioning provided when the regenerative braking force is delay-controlled;

FIG. 34 is a graph illustrating the relationship of the output hydraulic pressure relative to the input hydraulic pressure;

FIG. 35 is a flow chart of another embodiment of the regenerative braking force command value determining routine;

FIG. 36 is a flow chart of a brake pedal sensor zero correcting routine;

FIG. 37 is a flow chart of a variable-clearing routine;

FIG. 38 is a first portion of a flow chart of a shift command routine;

FIG. 39 is a second portion of the flow chart of the shift command routine;

FIG. 40 is a third portion of the flow chart of the shift command routine;

FIG. 41 is a graph illustrating the relationship of the motor efficiency relative to the number of revolutions of the motor and the motor torque;

FIG. 42 is a time chart provided when the shift change is conducted during braking;

FIG. 43 is a flow chart of a fail judging routine;

FIG. 44 is a flow chart of a regenerative fail judging routine;

FIG. 45 is a flow chart of a brake pedal depression force sensor fail detecting routine;

FIG. 46 is a graph used for judgment of a regenerative fail;

FIG. 47 is a graph used for detection of a fail of a brake pedal depression force;

FIG. 48 is a flow chart of a regenerative command output routine;

FIG. 49A is a sectional view illustrating the structure of another embodiment of a differential pressure regulating valve and FIGS. 49B and 49C are graphs illustrating the characteristics.

DESCRIPTION OF THE PREFERRED EMBODIMENTS

The present invention will now be described by way of a preferred embodiment in connection with the accompanying drawings.

Figure 1:
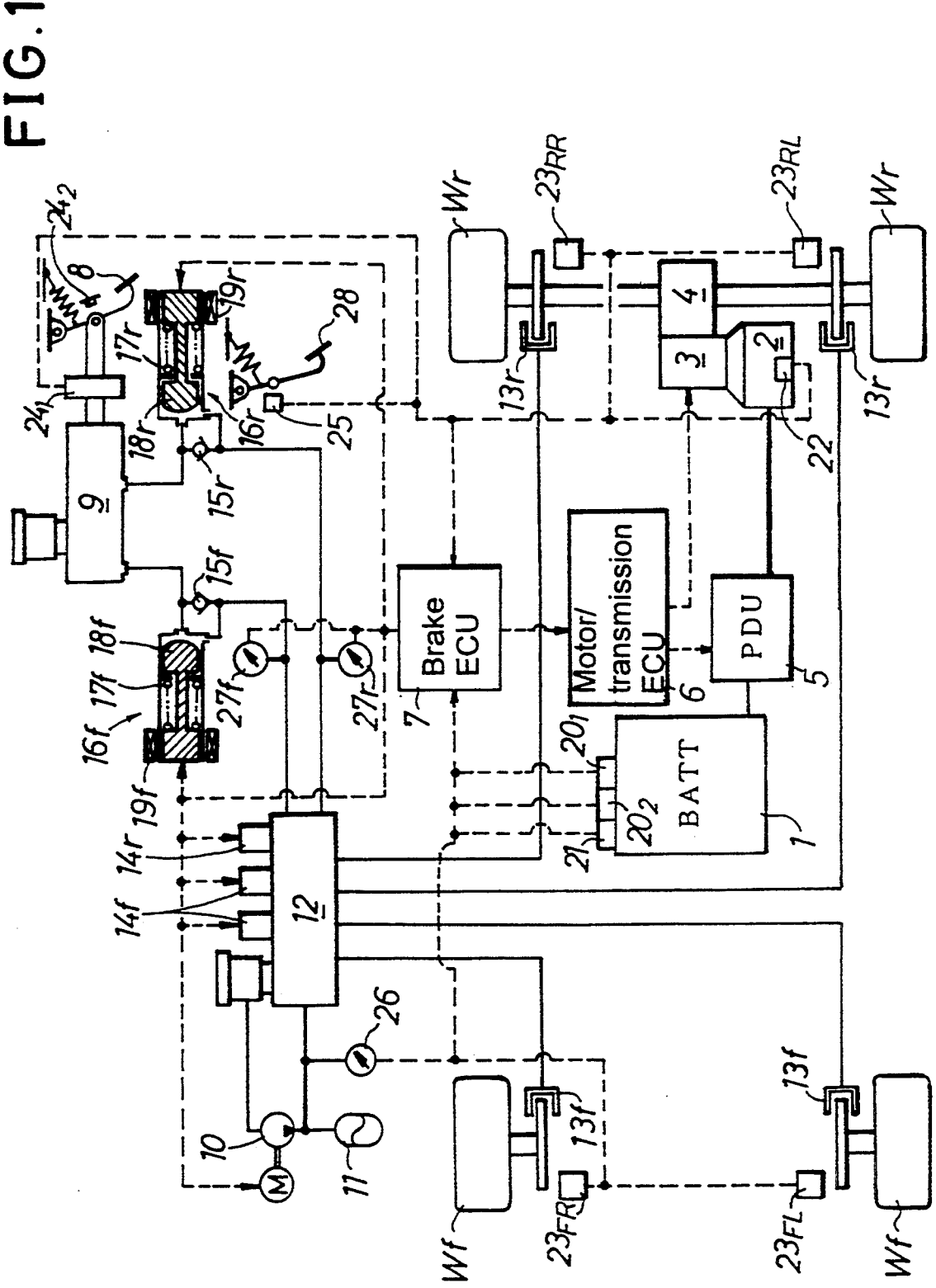

Referring to FIG. 1, the electric vehicle is a 4-wheel vehicle including a pair of front wheels Wf as free-rolling or non-driven wheels, and a pair of rear wheels Wr as driven wheels. The rear wheels Wr are connected through a forward 4-stage transmission 3 and a differential 4 to an electric motor 2 driven by a battery 1 serving as an energy source. A power drive unit (PDU) 5 is interposed between the battery (BATT) 1 and the motor 2 to control the driving of the motor by the battery 1 and to control the charging of the battery 1 by an electric power generated by the motor 2 during regenerative braking. The PDU 5 and the transmission 3 are connected to a motor/transmission electronic-control unit (ECU) 6 which is connected to a brake electronic-control unit (ECU) 7.

A master cylinder 9 operated by the operation of a brake pedal 8 is connected to brake cylinders 13f for the front wheels Wf and to brake cylinders 13r for the rear wheels Wr through a modulator 12 which is connected to an accumulator 11 in which hydraulic brake fluid is accumulated from a hydraulic pump 10. The modulator 12 includes two 2-channel anti-lock brake system (ABS) control valves 14f for the front wheels and a 1-channel anti-lock brake system (ABS) control valve 14r for the rear wheels. A braking hydraulic pressure transmitted to the brake cylinders 13f and 13r is reduced, when a locking tendency is produced in the front wheels Wf and the rear wheels Wr.

Provided in an oil passage connecting the master cylinder 9 and the modulator 12 are a differential pressure regulating valve 16f for controlling the braking hydraulic pressure transmitted to the front wheel brake cylinders 13f, and a differential pressure regulating valve 16r for controlling the braking hydraulic pressure transmitted to the rear wheel brake cylinders 13r.

The differential pressure regulating valve 16f for the front wheels includes a valve member 18f biased in its opening direction by a spring 17f, and a linear solenoid 19f for adjusting the preset load of the spring 17f. The differential pressure regulating valve 16r for the rear wheels has the same structure as the differential pressure regulating valve 16f for the front wheels. One way valves 15f and 15r are mounted in parallel to the differential pressure regulating valves 16f and 16r for restraining the transmission of the hydraulic pressure from the master cylinder 9 to the modulator 12 and for permitting the transmission of the hydraulic pressure and fluid from the modulator 12 to the master cylinder 9.

Figure 2:
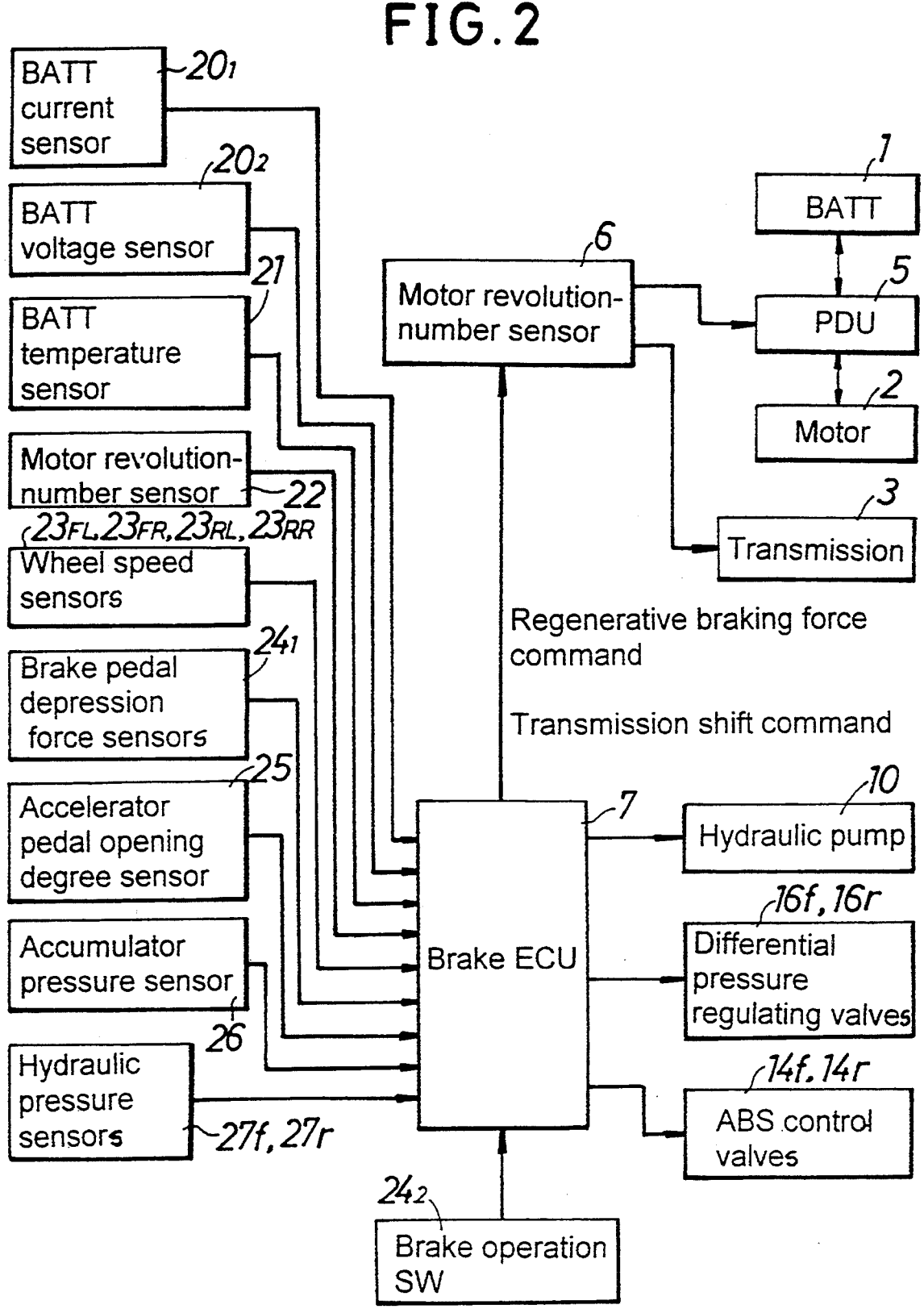

As can be seen from FIGS. 1 and 2, connected to the brake ECU 7 are a battery current sensor 201, a battery voltage sensor 202 and a battery temperature sensor 21 which are mounted on the battery 1; a motor revolution number sensor 22 for detecting the number of revolutions of the motor 2; wheel speed sensors $23_{FL}$, $23_{FR}$, $23_{RL}$ and $23_{RR}$ mounted on the front and rear wheels Wf and Wr; a brake pedal depression force sensor $24_1$ and a brake operation switch $24_2$ which are mounted on the brake pedal 8; an accelerator pedal opening degree sensor 25 mounted on an accelerator pedal 28; an accumulator pressure sensor 26 mounted on the accumulator 12; and a pair of hydraulic pressure sensors 27f and 27r mounted between the differential pressure regulating valves 16f and 16r and the modulator 12, respectively. Further, the hydraulic pump 10, the differential pressure regulating valves 16f and 16r and the ABS control valves 14f and 14r are connected to the brake ECU 7, and controlled on the basis of output signals from the above-described sensors.

The PDU 5 for controlling the battery 1 and the motor 2 and the transmission 3 are connected to the motor/transmission electronic control unit (ECU) 6 which is operated by reception of a regenerative braking command from the brake ECU 7 and a transmission shifting command.

The outline of each of braking modes will be described with reference to FIG. 3 and FIGS. 4A, 4B and 4C.

Figure 4A:
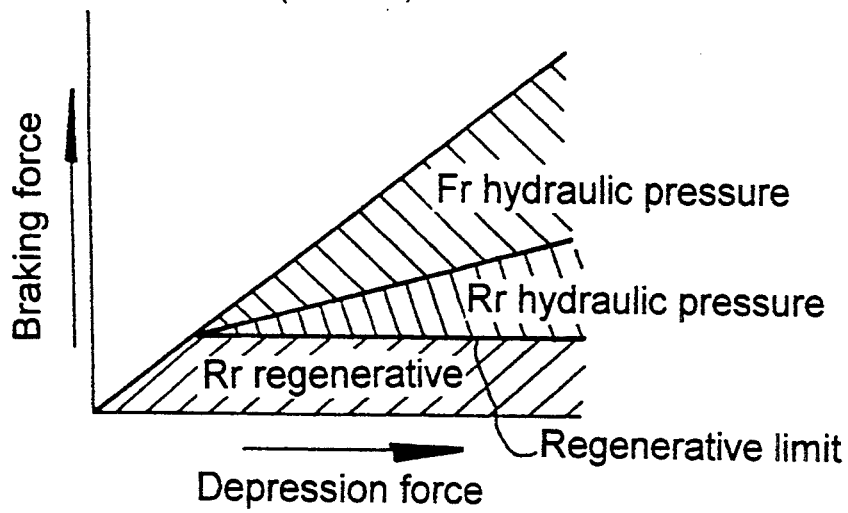
FIGS. 4A, 4B and 4C are graphs illustrating braking force distributions in the respective modes.
Figure 4B:
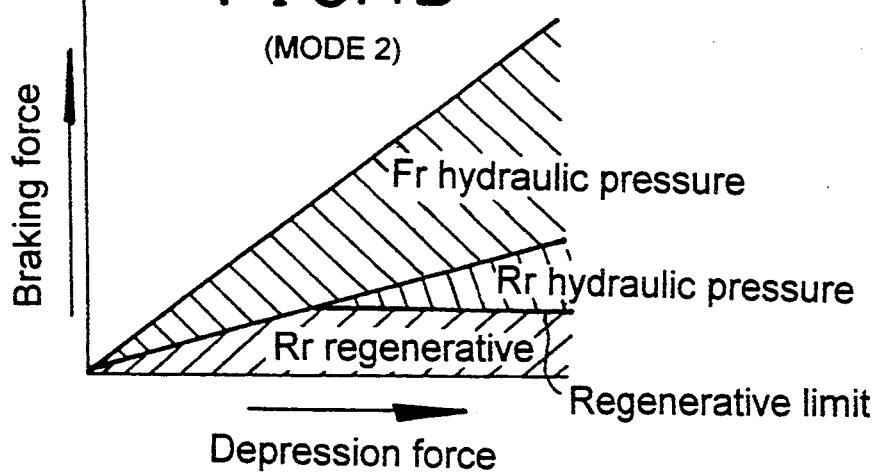
Figure 4C:
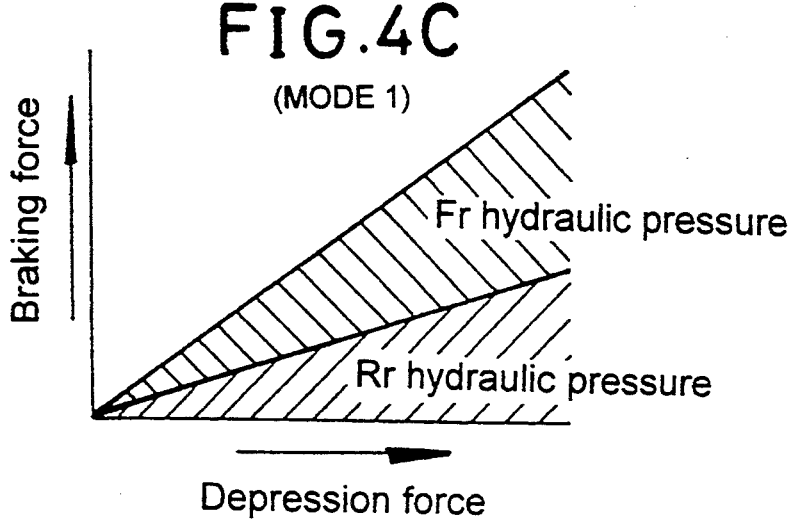

The braking modes for the front and rear wheels Wf and Wr in the vehicle equipped with the braking system according to the present invention include three types, i.e., a mode-I, a mode-2 and a mode-3 shown in FIGS. 4A, 4B and 4C, respectively, and the central portion of FIG. 3. Any one of these modes is selected by an initial decision, so that the braking is conducted in the selected mode. The change of the mode is performed during braking in response to the variation in operational condition.

(1) Mode 3

This mode is selected in a normal operational condition. More specifically, this mode is selected when each system is normally functioning and moreover, when a hard braking and a steering are not conducted and the anti-lock brake system is not in operation. The mode-3 is a mode in which the front wheels Wf are braked hydraulically, and the rear wheels Wr are braked hydraulically and regeneratively. When the brake pedal 8 is initially depressed, only the rear wheels Wr are first regeneratively braked, and the hydraulic braking of the front wheels Wf is not effected. If the braking force Rr for the rear wheels Wr exceeds a fold point P which is a regenerative limit determined from various conditions of the battery 1 and the motor 2, the rear wheels Wr are braked regeneratively and hydraulically in combination, and the hydraulic braking force Fr (HP) of the front wheels Wf is started. If the combined braking force reaches a fold point Q, the rate of increase of the braking force Rr on the rear wheels Wr is reduced by the action of a well-known proportional reduction valve mounted within the modulator 12, and ultimately, a braking-force distribution characteristic as indicated by a folded line OPQR is provided. This braking-force distribution characteristic is offset above a theoretical distribution characteristic indicated by a dashed line TD, i.e., it is offset so that the distribution of the braking force on the rear wheels Wr becomes more than the theoretic distribution characteristic. This ensures that the regenerative braking of the rear wheels Wr is utilized, whenever possible, to charge the battery 1, thereby providing a prolongation in travellable distance per charging.

(2) Mode 2

This mode is selected, when each of the systems is normally functioning and a steering operation is conducted without hard braking, or the anti-lock brake system has been operated. As in the mode-3, the mode-2 is a mode in which the front wheels Wf are braked hydraulically, and the rear wheels Wr are braked hydraulically and regeneratively in combination. However, when the brake pedal 8 is depressed, the hydraulic braking of the front wheels Wf is conducted simultaneously with and in parallel to the regenerative braking of the rear wheels Wr, and if the braking force Rr for the rear wheels Wr exceeds the regenerative limit during that time, the rear wheels Wr are braked regeneratively and hydraulically in combination. If the braking force then reaches the fold point Q, the rate of increase of the braking force Rr for the rear wheels Wr is reduced by the proportional reduction valve. As a result, a folded line 0QR indicating a braking-force distribution characteristic in the mode-2 shows that the braking force on the front wheels is larger than the theoretical distribution characteristic indicated by the dashed line TD. A reduction in steering stability can be avoided by selecting the mode-2 during steering or during operation of the anti-lock brake system to simultaneously brake the front and rear wheels Wf and Wr beginning with the initial braking stage.

(3) Mode 1

This mode is selected when each of the systems is not normally functioning, or when a hard braking is being conducted and the anti-lock brake system is in operation under predetermined conditions, even if each of the systems is normally functioning. In the mode-I, the regenerative braking of the rear wheels Wr is not conducted, and both of the front and rear wheels Wf and Wr are braked hydraulically. By conducting only the hydraulic braking in this manner without the regenerative braking of the rear wheels Wr, the responsiveness of the braking force can be enhanced, as compared with a regenerative braking wherein a slight lag of responsiveness is generated while the rotation of the rear eels Wr is transmitted through the differential 4 and the transmission 3 to the motor 2. A braking force distribution characteristic indicated by a folded line 0QR shows that the braking force on the front wheels Wf is larger than a theoretical distribution characteristic indicated by a dashed line TD as in the mode-2. A responsiveness of braking is enhanced by selecting the mode-I during hard braking or the like as described above.

In short, when a hard braking is conducted during braking in the mode-3 or the mode-2, the mode is changed to the mode-1. On the other hand, when a steering operation is conducted during braking in the mode-3, or when a locking tendency of a wheel due to a low frictional coefficient road (a low $\mu$ road) has been detected and the anti-lock brake system is operated, the change from the mode-3 to the mode-2 is conducted. When a further strong wheel-locking tendency due to a low frictional coefficient road has been detected during braking in the mode-2, the change from the mode-2 to the mode-1 is conducted. A reduction in steering stability can be avoided by selecting the mode-2 or 1 in accordance with the steering conditions and the friction coefficient of a road surface in this manner. The change from the mode-3 to the mode-2 or 1 is conducted along an equal braking-force line, i.e., a line in which a sum of the braking force Fr on the front wheels Wf and the braking force Rr on the rear wheels Wr is maintained constant. This avoids a sudden change in total braking force on the front and rear wheels Wf and Wr.

Figure 5A:
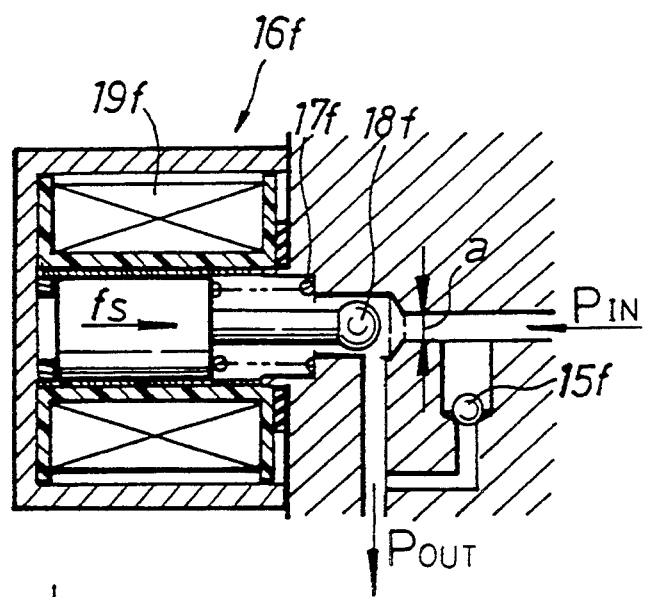
FIG. 5A is a sectional view illustrating the structure of a differential pressure regulating valve and FIGS. 5B and 5C are graphs illustrating the characteristics thereof.

FIG. 5A illustrates a specified structure of the differential pressure regulating valve 16$f$ for the front wheel Wf. The differential pressure regulating valve 16$r$ for the rear wheel Wr has the same structure. As can be seen from FIG. 5A, the differential pressure regulating valve 16$f$ includes the valve member 18$f$ biased in an opening direction by the spring 17$f$, and the linear solenoid 19$f$ for adjusting the preset load of the spring 17$f$ as described above, and further includes the one-way valve 15$f$ for restraining the transmission of the hydraulic pressure from the master cylinder 9 to the modulator 12.

Figure 5B:
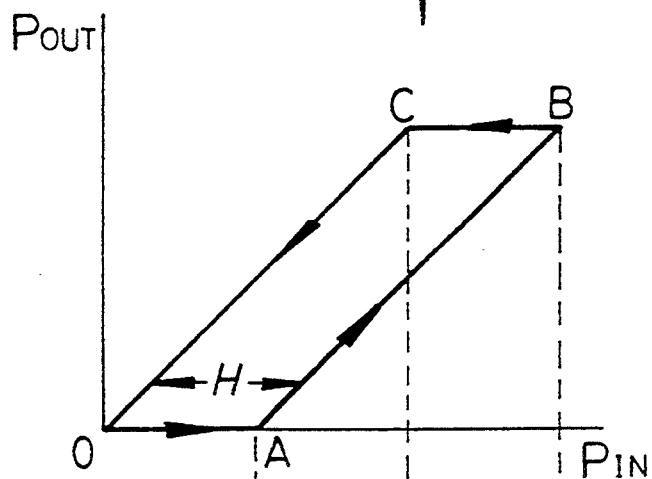

The differential pressure regulating valve 16$f$ ensures that with the linear solenoid 19$f$ being in its de-energized state, an input hydraulic pressure $P_{IN}$ and an output hydraulic pressure $P_{OUT}$ are equal to each other, but with the linear solenoid 19$f$ energized to bias the valve member 18$f$ by a biasing force fs, an output characteristic having a hysteresis as shown in FIG. 5B by O, A, B and C is provided. More specifically, the output hydraulic pressure $P_{OUT}$ is zero, while the input hydraulic pressure $P_{IN}$ is increased from an O point to an A point. If the valve member 18f is opened at the A point, the output hydraulic pressure $P_{OUT}$ is increased with an increase of the input hydraulic pressure $P_{IN}$ in a following relation:

$$P_{OUT} = P_{IN} - fs/a \qquad (1)$$

wherein a is a sectional area of an input port. Even if the input hydraulic pressure $P_{IN}$ is reduced at a B point, the valve member 18f is maintained in its closed state, so that the output hydraulic pressure $P_{OUT}$ is not immediately reduced, and is maintained constant until the input hydraulic pressure $P_{IN}$ reaches a C point. If the one-way valve 15 is opened at the C point, the output hydraulic pressure $P_{OUT}$ and the input hydraulic pressure $P_{IN}$ become equal to each other, and the output hydraulic pressure $P_{OUT}$ is reduced to the o point while being maintained in a relation:

$$P_{OUT} = P_{IN} \qquad (2)$$

At this time, a hysteresis H between the increase and decrease in pressure is determined by $$H = fs/a \qquad (3)$$

and a value thereof is relatively large.

Figure 5C:
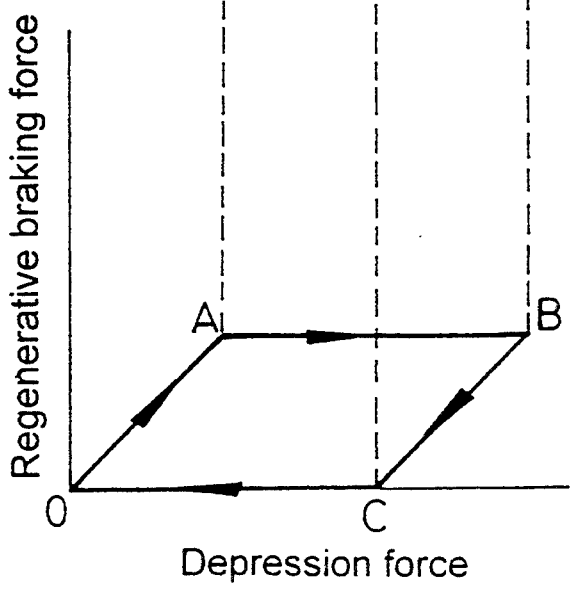

Therefore, in order to ensure that a sum total of the braking forces is not suddenly changed when the ratio of the hydraulic braking force and the regenerative braking force is changed in the course of increasing or decreasing the depression force on the brake pedal 8, it is necessary to control the magnitude of the regenerative braking force, as shown in FIG. 5C. More specifically, in a region from the O point to the A point where the output hydraulic pressure $P_{OUT}$ (i.e., hydraulic braking force) is not increased even if the input hydraulic pressure $P_{IN}$ (i.e., the depression force) is increased, the regenerative braking force is increased with an increase in depression force. In a region from the A point to the B point where the output hydraulic pressure $P_{OUT}$ is increased, the increase in regenerative braking force is suppressed. In a region from B point to the C point where the output hydraulic pressure $P_{OUT}$ is not decreased even if the input hydraulic pressure $P_{IN}$ is decreased, the regenerative braking force is decreased with a decrease in depression force. In a region from C point to the O point where the output hydraulic pressure $P_{OUT}$ is decreased, it is necessary to suppress the decrease in regenerative braking force. Such operation will be described hereinafter in detail in connection with flow charts and graphs.

The operation of the braking system having the above-described construction will be described below in connection with a flow chart of a main routine shown in FIG. 6.

First, at a step S100, various programs and data are stored in memories in the brake ECU 7 and the motor/transmission control ECU 6, and the braking system is initially set in an operable state.

At a step S200, output signals from the battery current sensor $20_1$, the battery voltage sensor $20_2$, the battery temperature sensor 21, the motor revolution-number sensor 22, the wheel speed sensors $23_{FL}$, $23_{FR}$, $23_{RL}$ and $23_{RR}$, the brake pedal depression sensor $24_1$, the accelerator pedal opening degree sensor 25, the accumulator pressure sensor 26 and the hydraulic pressure sensors 27f and 27r are read in the brake ECU 7 (see FIG. 2). The calculation of a vehicle speed V is carried out according to a vehicle speed calculating routine (see FIG. 7), and the calculation of a steering angle O is carried out according to a steering-angle calculating routine (see FIGS. 8 and 9).

Figure 10:
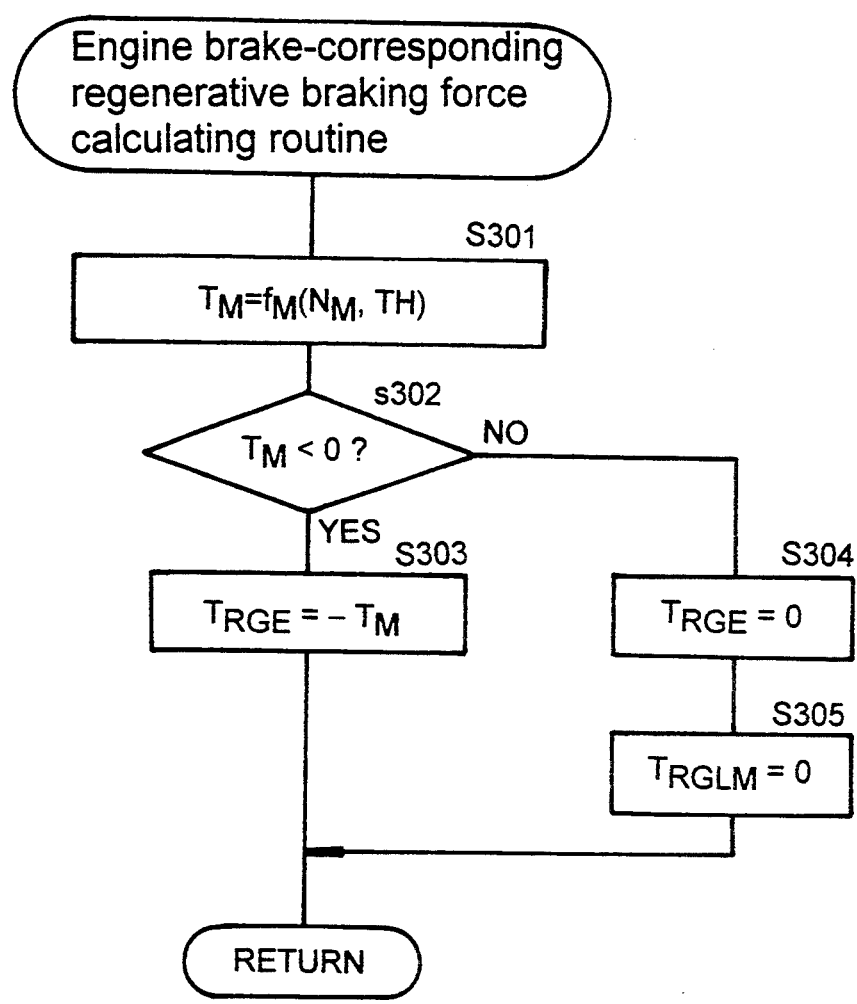
Figure 11:
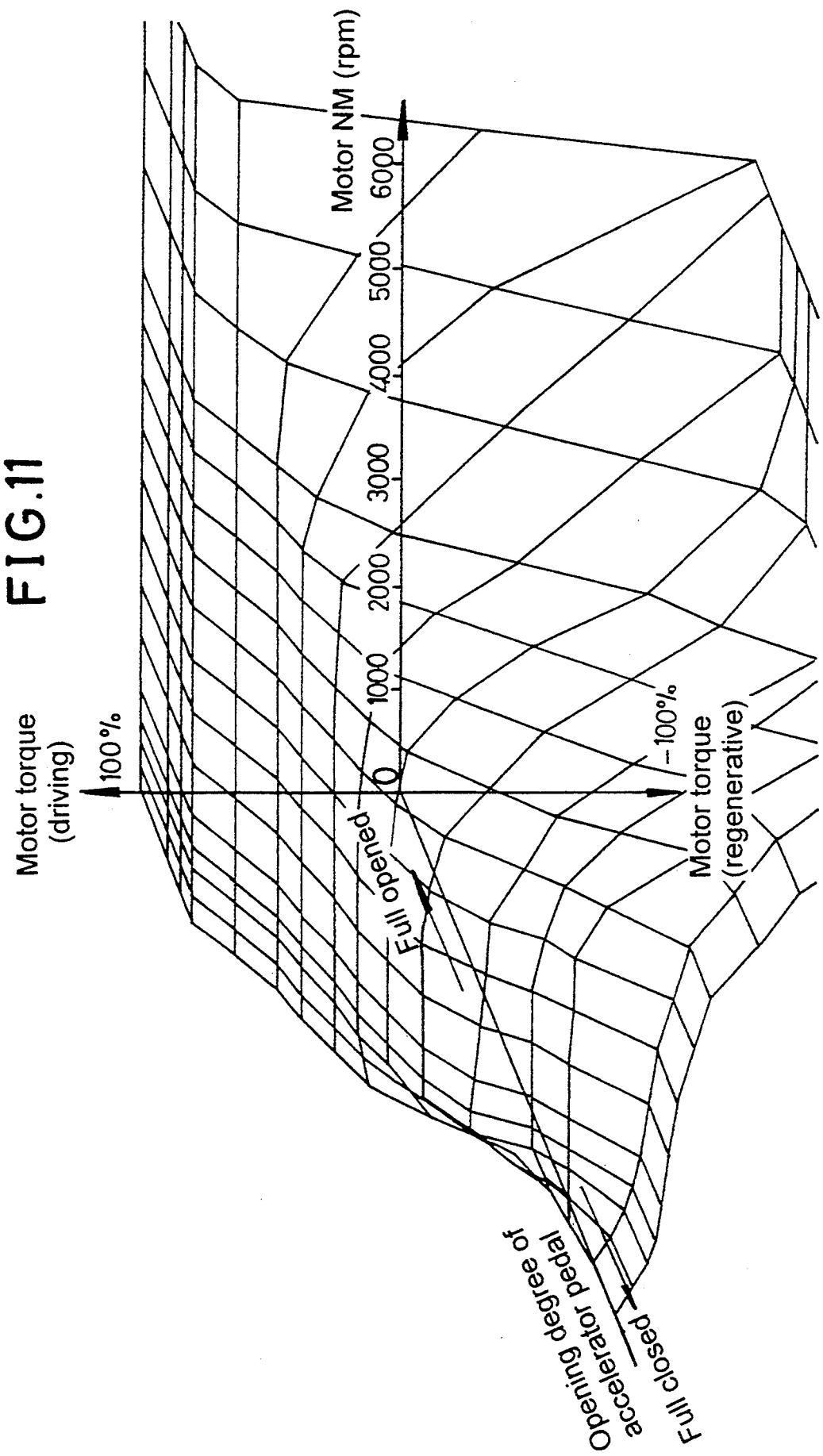

At a step S300, the calculation of a regenerative braking force corresponding to an engine brake of the vehicle using an internal combustion engine as a driving source is carried out according to an engine brake-corresponding regenerative braking force calculating routine (see FIGS. 10 and 11).

At a step S400, a limit value of the regenerative braking force exhibitable in each instant is calculated on the basis of the state of the battery 1 and the state of the motor 2.

At a step S500, it is first judged on the basis of an output from the brake operating switch $24_2$ mounted on the brake pedal 8 whether or not the braking is being conducted. If it has been decided that the braking is being conducted, the mode-3, the mode-2 or the mode-1 is selected on the basis of the states of the braking and the steering operations or the friction coefficient of a road surface, and the mode change from the mode-3 to the mode-2 or 1 is determined, both according to a mode determining routine (see FIGS. 17 to 21). Then, the quantity of differential pressure regulating valve operated for determining hydraulic pressure braking forces for the front wheels Wf and the rear wheels Wr is determined according to a differential pressure regulating valve operation quantity determining routine (see FIGS. 22 to 28), and the magnitude of a regenerative braking force for the rear wheel Wr is determined according to a regenerative braking force command value determining routine (see FIGS. 29 to 35).

Figure 36:
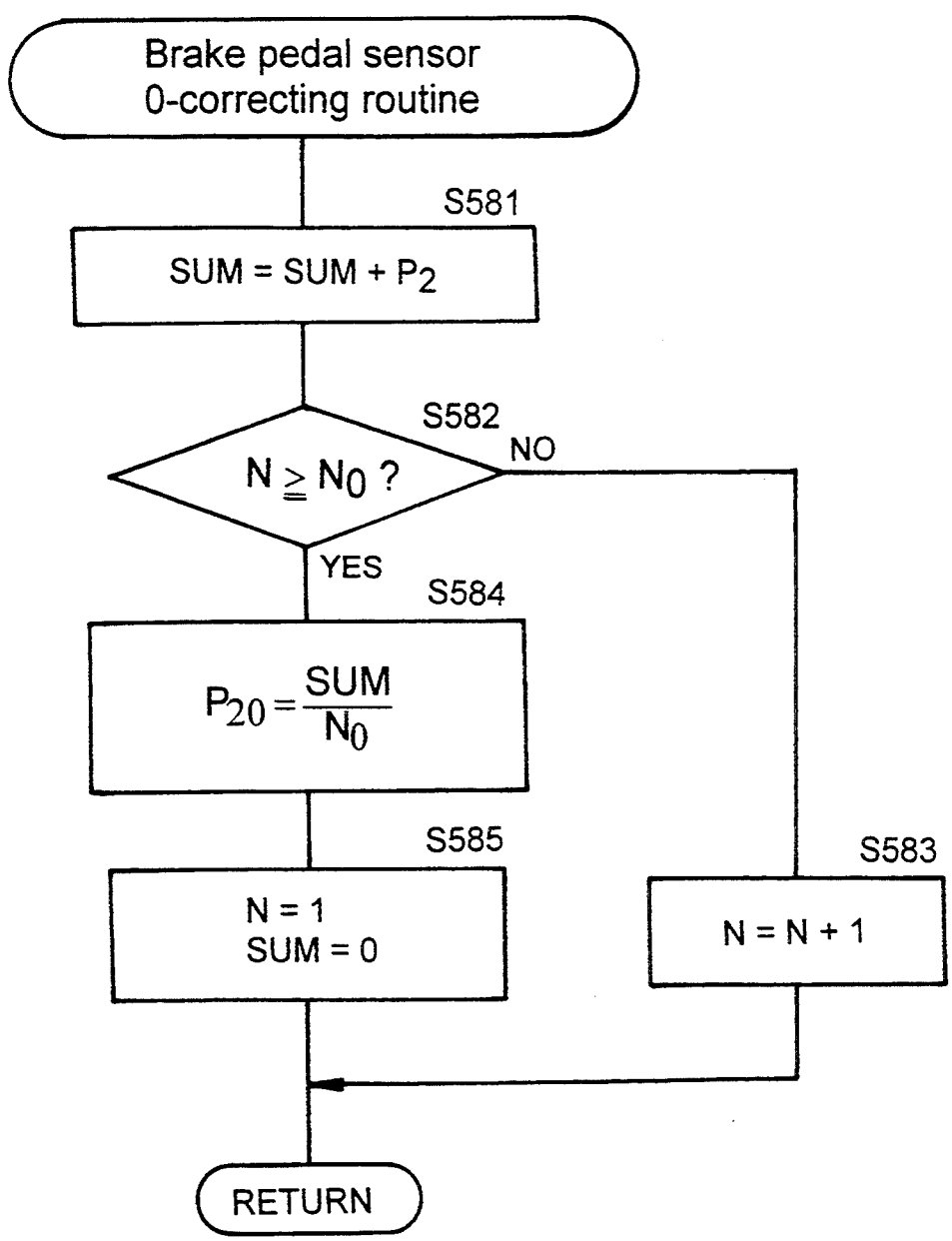

If it has been decided on the basis of the output from the braking operation switch $24_2$ that the braking is not being conducted, the correction of a zero-point of the brake pedal depression sensor $24_1$ is carried out according to a brake pedal depression force sensor correcting routine (see FIG. 36). Then, both the output value from the differential pressure regulating valve and the regenerative command valve are set at zero and subsequently, each of the constants is set at zero according to a constant clearing routine (see FIG. 37).

At a step S600, a shift position capable of exhibiting the regenerative braking force to the maximum is calculated according to a shift command routine (see FIGS. 38 to 42), and the transmission 3 is automatically operated toward such shift position.

At a step S700, a fail of each system is judged according to a fail judging routine (see FIGS. 43 to 47). If it has been decided that there is any fail generated, the mode-I is selected unconditionally, so that the front and rear wheels Wf and Wr are braked by the hydraulic pressure, as in a usual hydraulic pressure braking system.

At a step S800, the hydraulic braking of the front wheels Wf and the rear wheels Wr is carried out according to a differential pressure regulating valve output routine.

Figure 48:
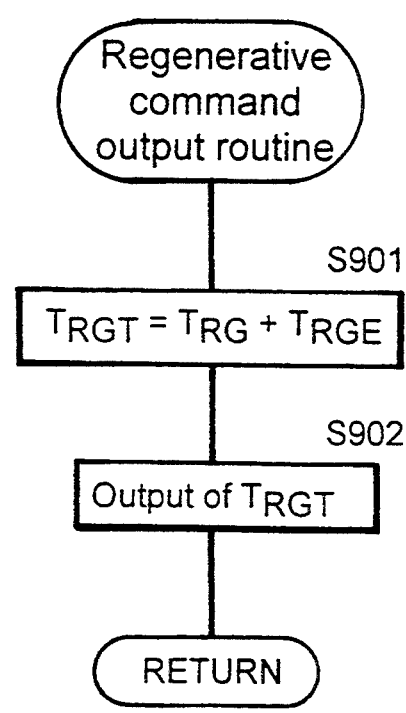

At a step S900, the regenerative braking of the rear wheels Wr is carried out according to a regenerative command output routine (see FIG. 48).

At a step S1000, an anti-lock brake system (ABS) control is carried out to prevent an excessive slip of the front wheels Wf or the rear wheels Wr. More specifically, if it has been detected by an output signal from the wheel speed sensor $23_{FL}$, $23_{FR}$, $23_{RL}$ or $23_{RR}$ that that wheel is about to become a locked state, the ABS control valves 14f and 14r shown in FIG. 1 are controlled. By this, the modulator 12 interposed between the master cylinder 9 and the brake cylinder 13f or 13r are operated, so that the hydraulic pressure transmitted to the brake cylinder 13f or 13r for the wheel which is in the locking tendency is reduced to prevent such wheel from being locked.

The specified content of the vehicle speed calculating routine at the step S200 in the flow chart shown in FIG. 6 now will be described in connection with a flow chart shown in FIG. 7.

First, at a step S201, wheel speeds $V_{WFL}$ and $V_{WFR}$ of left and right front non-driven wheels Wf detected by the wheel speed sensors $23_{FL}$ and $23_{FR}$ for left and right front wheels Wf are compared with each other. If the wheel speed $V_{WFL}$ of the left front wheel Wf is larger than the wheel speed $V_{WFR}$ of the right front wheel Wf, i.e., the vehicle is turning rightwardly (clockwise), a difference $\Delta v$ between the left and right wheel speeds is calculated according to an expression, $V_{WFL} - V_{WFR}$, and the wheel speed $V_{WFR}$ of the wheel which is an inner wheel during turning of the vehicle is employed as a vehicle speed, at a step S202. On the other hand, if the wheel speed $V_{WFL}$ of the left front wheel Wf is equal to or smaller than the wheel speed $V_{WFR}$ of the right front wheel Wf, i.e., when the vehicle is turning leftwardly (counterclockwise), a difference $\Delta v$ between the left and right wheel speeds is calculated according to an expression, $V_{WFR} - V_{WFL}$, and the wheel speed $V_{WFL}$ of the wheel which is an inner wheel during turning of the vehicle is employed as a vehicle speed.

Figure 8:
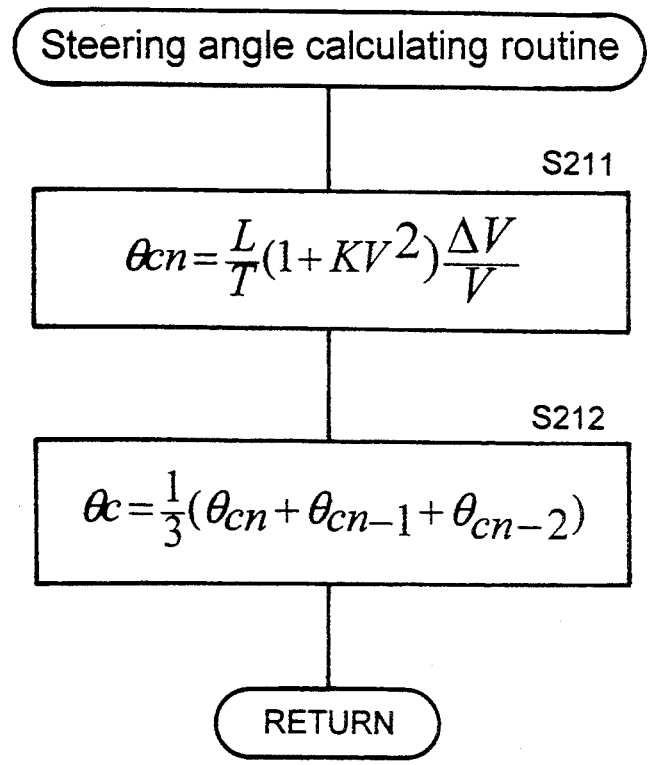
Figure 9:
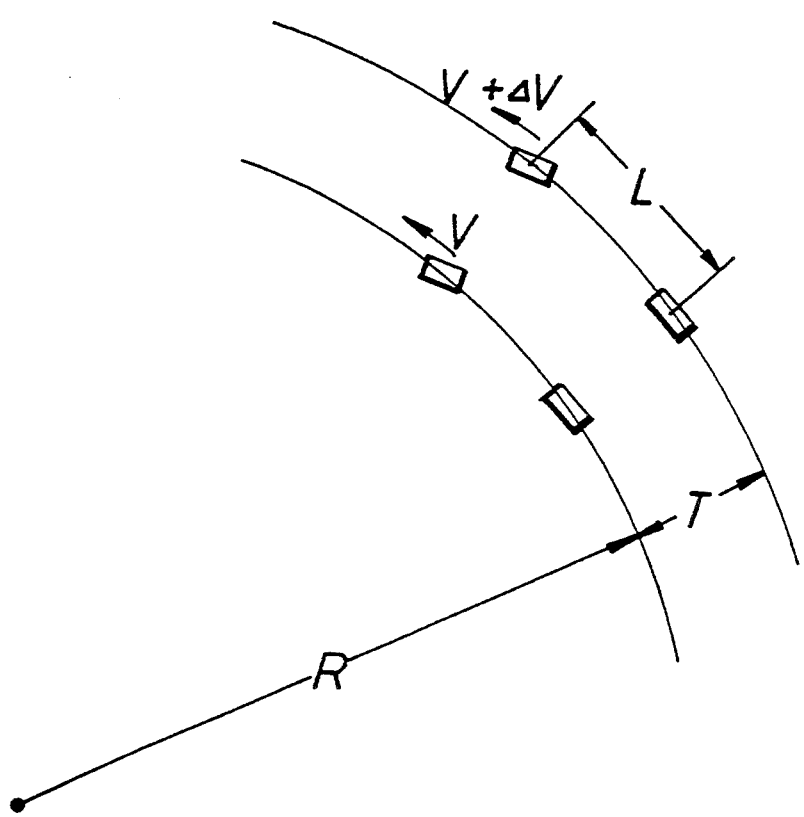

The specified content of the steering-angle calculating routine at the step S200 in the flow chart shown in FIG. 6 will be described in connection with a flow chart shown in FIG. 8 and a diagram shown in FIG. 9.

First, at a step S211, a presumed value $\theta_{cn}$ of steering angle is calculated according to a following equation:

$$\theta_{cn} = (L/T) \times (I + Kv^2) \times (\Delta v/v) \quad (4)$$

wherein L is a wheel base; T is a tread of a vehicle; and K is a stability factor.

The above equation will be further described in connection with FIG. 9. Suppose a condition in which the vehicle is normally being turned with a turning radius R. In this case, the speeds of the wheels which are an inner wheel and an outer wheel during turning of the vehicle are V and $V+\Delta v$, respectively. These wheel speeds V and $V+\Delta v$ are proportional to the distance from the turning centers, respectively and hence, a relation $V:V+\Delta V = R:R+T$ is established. Thus, the turning radius R is represented by a following expression:

$$R = T \times (V/\Delta V) \quad (5)$$

On the other hand, as well-known, the turning radius and an actual steering angle $\theta$ have a following relation to each other:

$$\theta = (L/R) \times (I + Kv^2) \quad (6)$$

Therefore, the expression (4) is provided by incorporating the expression (6) into the expression (5).

Then, at a step S212, a presumed value $\theta_c$ of steering angle is provided by determining an average value of values $\theta_{cn}$, $\theta_{cn-1}$ and $\theta_{cn-2}$ resulting from three calculations according to the expression (4) for every loop. The presumed value $\theta_c$ of steering angle calculated in this manner is thereafter used as a steering angle $\theta_c$.

The specified content of the engine brake-corresponding regenerative braking force calculating routine at the step S300 in the flow chart shown in FIG. 6 will be described below in connection with a flow chart shown in FIG. 10 and a graph shown in FIG. 11.

First, at a step S301, a motor torque $T_M$ is determined on the basis of the motor revolution number $N_M$ and the accelerator pedal opening degree TH. FIG. 11 illustrates a map for determining the motor torque $T_M$. If the motor revolution number $N_M$ and the accelerator pedal opening degree TH are determined, the motor torque $T_M$ corresponding to them is provided as a function $f_M(N_N, TH)$. Such value of the motor torque $T_M$ is a driving torque when it lies above the origin of the axis of ordinates, and is a regenerative torque when it lies below the origin of the axis of ordinates.

At a next step S302, it is judged whether the motor torque $T_M$ determined at the step S301 is positive or negative. If it has been decided that the motor torque $T_M$ is negative, and the regenerative braking is being conducted, the regenerative braking force $T_{RGE}$ corresponding to the engine brake is set at $-T_M$ at a step S303. On the other hand, if it has been decided at the step S302 that the motor torque $T_M$ is not negative, and a usual driving is conducted, the regenerative braking force $T_{RGE}$ corresponding to the engine brake is set as zero at a step S304, and the regenerative braking force limit $T_{RGLM}$ corresponding to an axis torque is set at zero at a step S305.

When the motor torque $T_M$ has been brought into a nonnegative value by depression of the accelerator pedal 28, the regenerative braking force limit $T_{RGLM}$ corresponding to the axle torque is set at zero, as described above. Therefore, when the accelerator pedal 28 and the brake pedal 8 are operated simultaneously, it is possible to generate a hydraulic braking force taking place of the regenerative braking force by the operation of the brake pedal 8 simultaneously with the generation of the driving force of the motor 2 by the operation of the accelerator pedal 28. This enables a feeling similar to that in a vehicle having an internal combustion engine as a driving source to be provided, but also enables a hydraulic braking force to be generated at the start of the driving of the vehicle on a sloping road, thereby preventing the vehicle from rolling backward.

Figure 12:
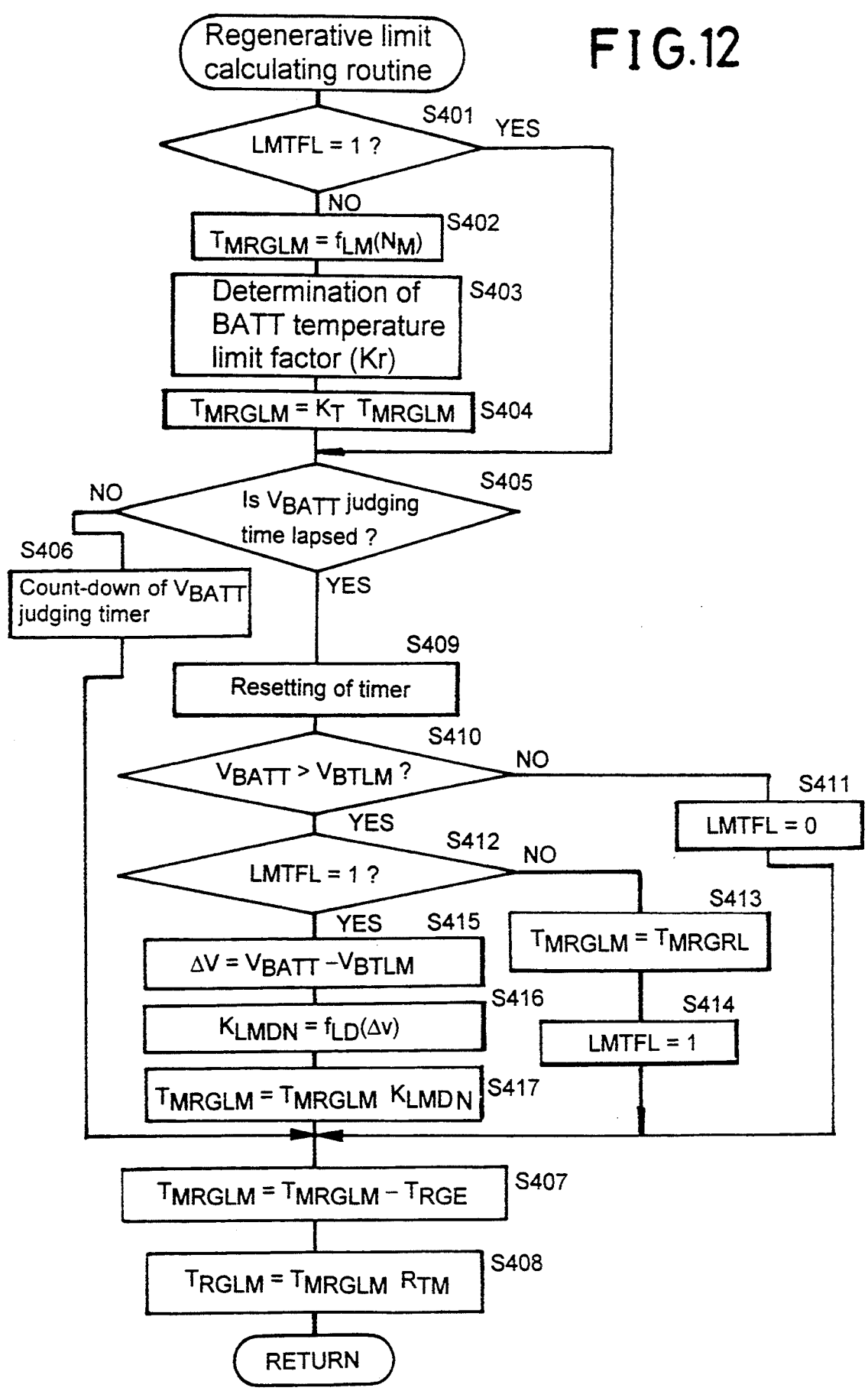
Figure 13:
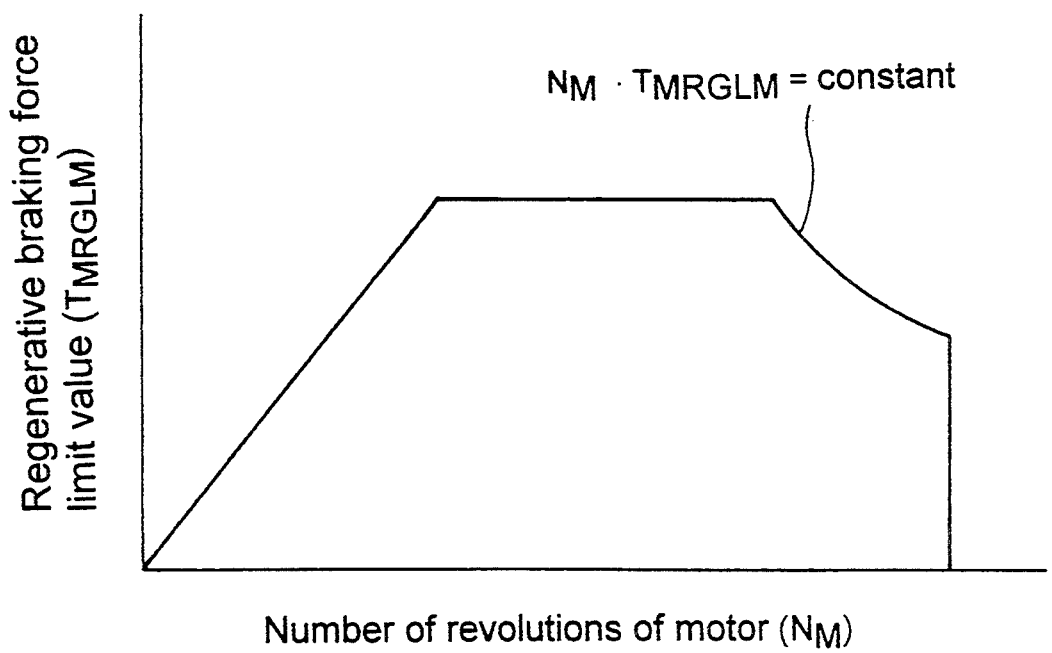

The specified content of the regenerative limit calculating routine at the step S400 in the flow chart shown in FIG. 6 will be described in connection with a flow chart shown in FIG. 12 and graphs shown in FIGS. 13 to 16.

First, at a step S401, it is judged whether or not a regenerative limit flag $L_{MTFL}$ is set at "1". If NO, a generative braking force limit $T_{MRGLM}$ of the motor 2 is determined from the map shown in FIG. 13 and from a number $N_M$ of revolutions of the motor 2 delivered by the motor revolution number sensor 22. The regenerative braking force limit $T_{MRGLM}$ is provided by a function $f_{LM}(N_M)$, and the variation in regenerative braking force limit $T_{MRGLM}$ in accordance with the output signal $N_M$ from the motor revolution-number sensor 22 is increased linearly with an increase in number $N_M$ of revolutions of the motor 2, then becomes substantially constant and is thereafter abruptly decreased.

Figure 14:
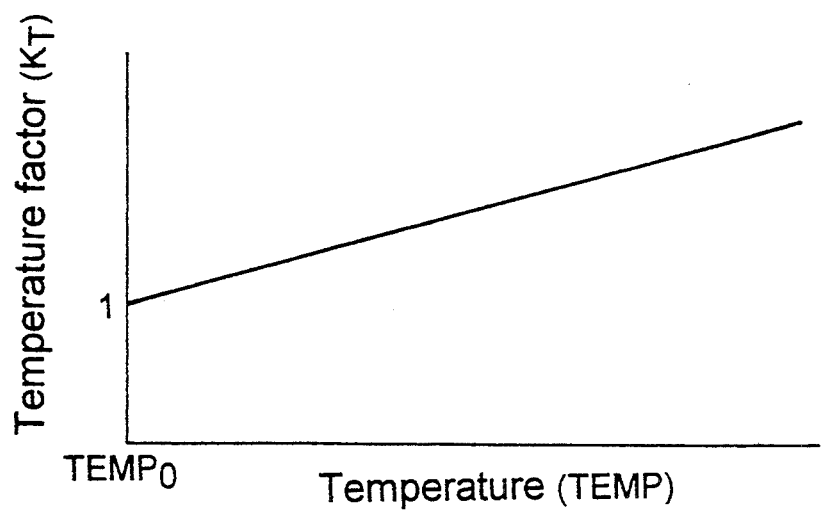

Then, at a step S403, a temperature limit factor $K_T$ for the battery 1 is determined from the map shown in FIG. 14 and from a battery temperature TEMP delivered by the battery temperature sensor 21. More specifically, the capacity of the battery 1 is increased with an increase in temperature and therefore, the temperature limit factor $K_T$ is set so that it is increased linearly from 1, as the battery temperature TEMP exceeds a reference value $TEMP_O$. Then, at a step S404, the value of the regenerative braking force limit $T_{MRGLM}$ is corrected by multiplying the regenerative braking force limit $T_{MRGLM}$ determined at the step S402 by the temperature limit factor $K_T$ determined at the step S403.

If a battery judging timer BTM reset for every predetermined battery voltage judging period is in countdown at steps S405 and 406, the regenerative braking force $T_{RGE}$ corresponding to the engine brake is subtracted from the regenerative braking force limit $T_{MRGLM}$ to calculate a net regenerative braking force limit $T_{MRGLM}$ at a step S407, and this net regenerative braking force limit $T_{MRGLM}$ is multiplied by a gear ratio $R_{TM}$ to determine a final regenerative braking force limit TRGLM corresponding to the axle torque.

If the battery judging timer BTM has finished counting (time-up) at the step S405, it is reset at each time at a step S409, and the correction of the regenerative braking force limit $T_{MRGLM}$ by the voltage of the battery I is carried out at subsequent steps S410 to S417.

More specifically, if the battery voltage $V_{BATT}$ detected by the battery voltage sensor 20₂ is equal to or less than a predetermined battery voltage limit $V_{BTLM}$ at the step S410, the regenerative limit flag $L_{MTEL}$ is set at "0" at the step S411. If the battery voltage $V_{BATT}$ detected by the battery voltage sensor 20₂ is more than the predetermined battery voltage limit $V_{BTLM}$ at the step S410, and the regenerative limit flag $L_{MTFL}$ is not set at "I" at the step S411, i.e., when the battery voltage $V_{BATT}$ becomes equal to or more than the battery voltage limit $V_{BTLM}$ only after the battery judging timer BTM completes the count down, the current regenerative braking force $T_{MRGRL}$ is set at the regenerative braking force $T_{MRGRL}$ at the step S413, and the regenerative limit flag $L_{MTFL}$ is set at "I" at the step S414.

Figure 15:
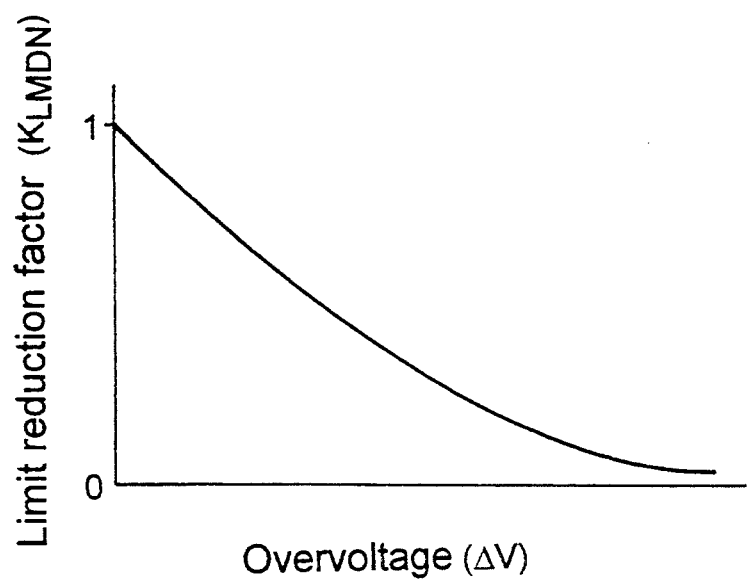

If the determination is YES at the step S412 in a next loop, the battery voltage limit $V_{BTLM}$ is subtracted from the battery voltage $V_{BATT}$ detected by the battery voltage sensor 20₂ to determine a battery overvoltage $\Delta v$ at the step S415, and at the subsequent step S416, a limit reduction factor $K_{LMDN}$ is determined using the battery overvoltage $\Delta V$ as a function on the basis of the map shown in FIG. 15. At the step S417, the regenerative braking force limit $T_{MRGLM}$ is corrected by multiplying it by the limit reduction factor $K_{LMDN}$.

Figure 16:
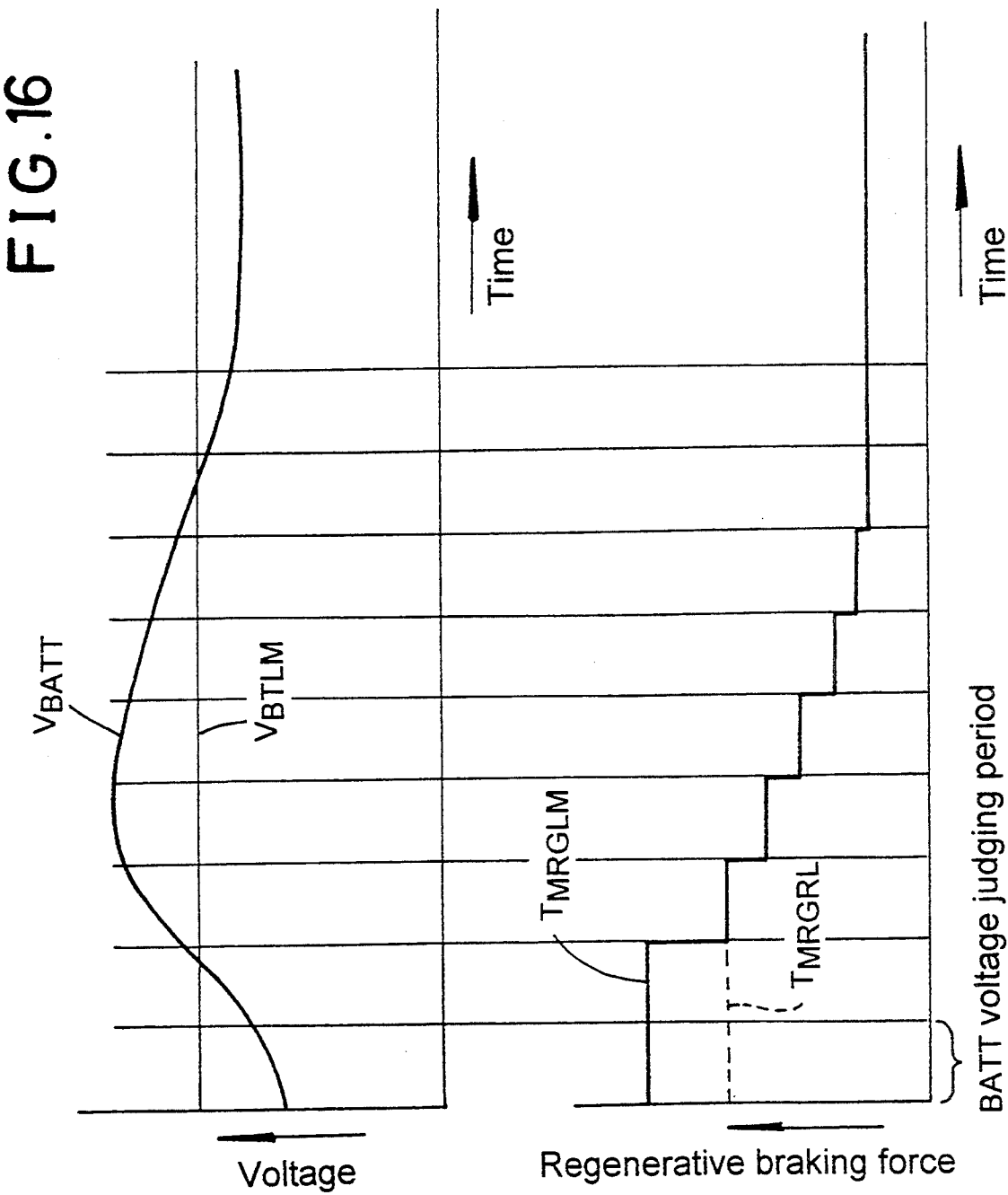

If the battery voltage $V_{BATT}$ is increased more than a preset battery voltage limit $V_{BTLM}$, as shown in FIG. 16, the regenerative braking force $T_{MRGRL}$ is decreased by successively decreasing the regenerative braking force limit $T_{MRGLM}$. This enables the prevention of trouble such as the deterioration of the battery and the fracture of elements of the PDU 5 due to an excessive increase in battery voltage $V_{BATT}$. Moreover, the regenerative braking force $T_{MRGRL}$ is step wise decreased for every battery voltage judging period determined by the battery judging timer BTM and therefore, a sudden change in regenerative braking force cannot be caused. In addition, a response speed from the decrease of the regenerative braking force limit $T_{MRGLM}$ to the reduction of the battery voltage $V_{BATT}$ is far lower than the period of a control loop and for this reason, if the judgment is conducted for every loop, the regenerative braking force limit $T_{MRGLM}$ may be decreased more than necessary in some cases, but the battery voltage $V_{BATT}$ can be properly controlled by conducting the judgment for every battery voltage judgment period longer than the period of the control loop.

The specified content of a mode determining routine at the step S500 in the flow chart shown in FIG. 6 will be described below in connection with flow charts shown in FIGS. 17, 18, 19 and 20 and a graph shown in FIG. 20.

First, if a fail flag FAILFL which will be described hereinafter is not set at "I" at a step S501 in the flow chart shown in FIG. 17, the processing is advanced to a step S502. There, an average deviation $P_{20}$ (see FIG. 36) which will be described hereinafter is subtracted from an output value $P_2$ of the brake pedal depression force sensor 24₁ mounted on the brake pedal 8 to determine a corrected input hydraulic pressure $P_{IN}$ into the differential pressure regulating valve 16f, 16r in order to correct the zero point of the brake pedal depression force sensor 24₁. More specifically, the correction of the zero point of the brake pedal depression force sensor 24₁ is carried out for the purpose of adjusting the output from the brake pedal depression force sensor 24₁ exactly to zero in a condition in which the brake pedal 8 is not operated, thereby causing the magnitudes of the quantity of brake pedal 8 operated and the regenerative braking force to be equalized to each other, in order to prevent the fact that if the output from the brake pedal depression force sensor 24₁ is excessively large, the regenerative braking force determined on the basis of the output from the brake pedal depression force sensor 24₁ is more than a specified value, on the one hand, and if the output from the brake pedal depression force sensor 24₁ is excessively small, the regenerative braking force is less than the specified value, on the other hand.

Then, at a step S503, it is judged whether or not the braking which is currently being conducted is a hard braking.

Figure 18:
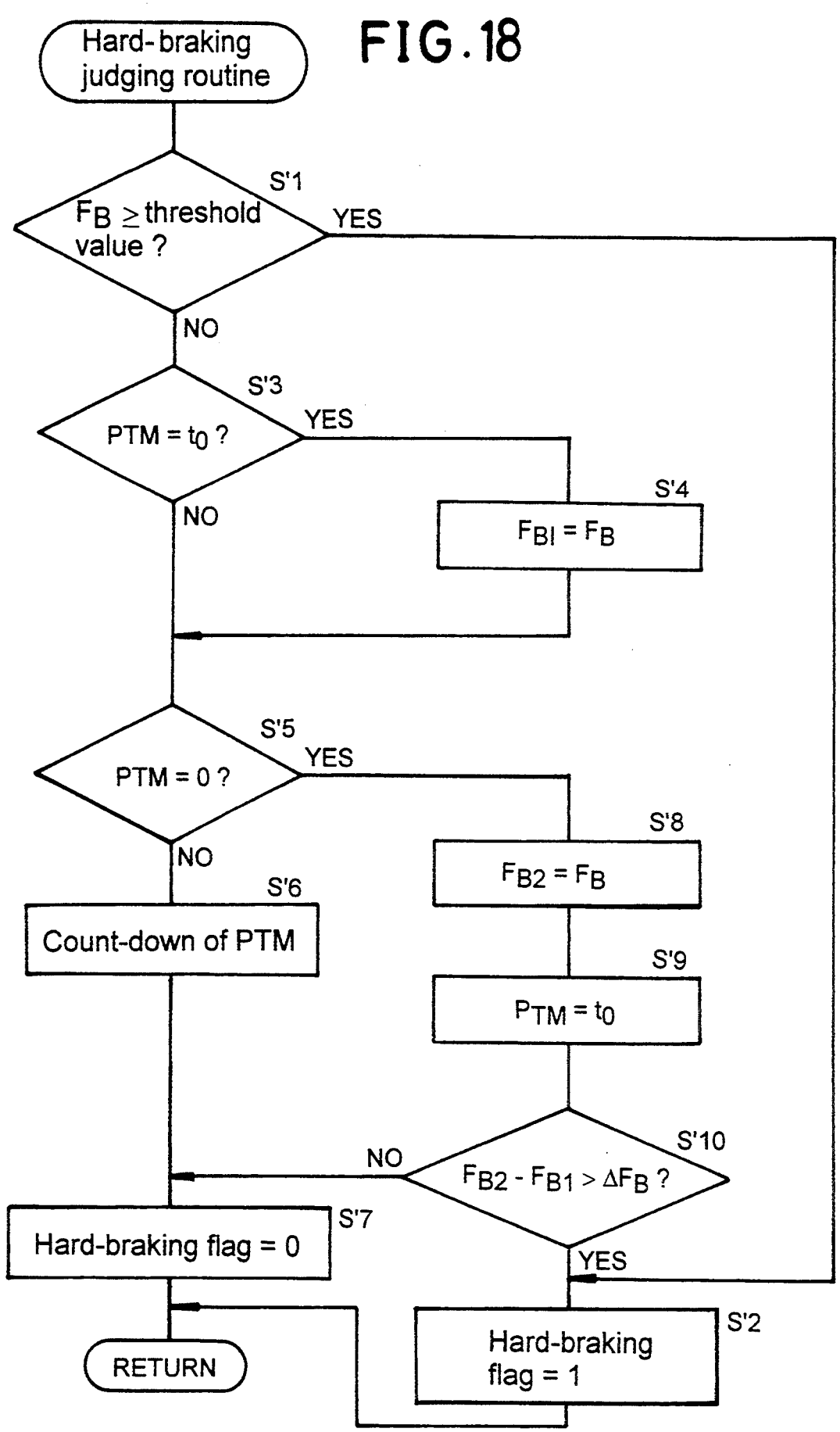

FIG. 18 illustrates a hard-braking judging routine. First, if the depression force $F_B$ detected by the brake pedal depression force sensor 24₁ is equal to or more than a predetermined threshold value at a step S'1 in the hard-braking judging routine, it is decided unconditional that such braking is a hard braking, and at a step S'2, a hard-braking flag is set at "1".

On the other hand, if the depression force $F_B$ is less than the predetermined threshold value at a step S'I and a hardbraking judging timer PTM is at an initial value to at the start of countdown at a step S'3, the current depression force $F_B$ is equalized to an initial depression force $F_{B1}$ at a step S'4. If the hard-braking judging timer PTM is not counted down to zero at a next step S'5, the countdown is carried out at a step S'6, and a hard-braking flag is set at "0" at a step S'7.

When the hard-braking judging timer PTM has been counted down to zero at the next step S'5, i.e., when a predetermined time $t_o$ has been lapsed, the current depression force $F_B$ is regarded as a $t_o$-later depression force $F_{B2}$ at a step S'8, and the hard-braking judging timer PTM is reset at to at a step S'9. Then, at a step S'I0, a difference between the $t_o$-later depression force $F_{B2}$ and the initial depression force $F_{B1}$ is compared with a depression force variation threshold value $\Delta F_B$. If the difference is more than the depression force variation threshold value $\Delta_{FB}$, the hard-braking flag is set at "1" at a step S'2. If the difference is not more than the depression force variation threshold value $\Delta_{FB}$, the hardbraking flag is set at "0" at a step S'7.

In this way, when the depression force $F_B$ is more than a first threshold value and when an increment in depression force $F_B$ within a predetermined time is more than a second threshold value, it is decided that the braking is a hard braking.

Figure 17:
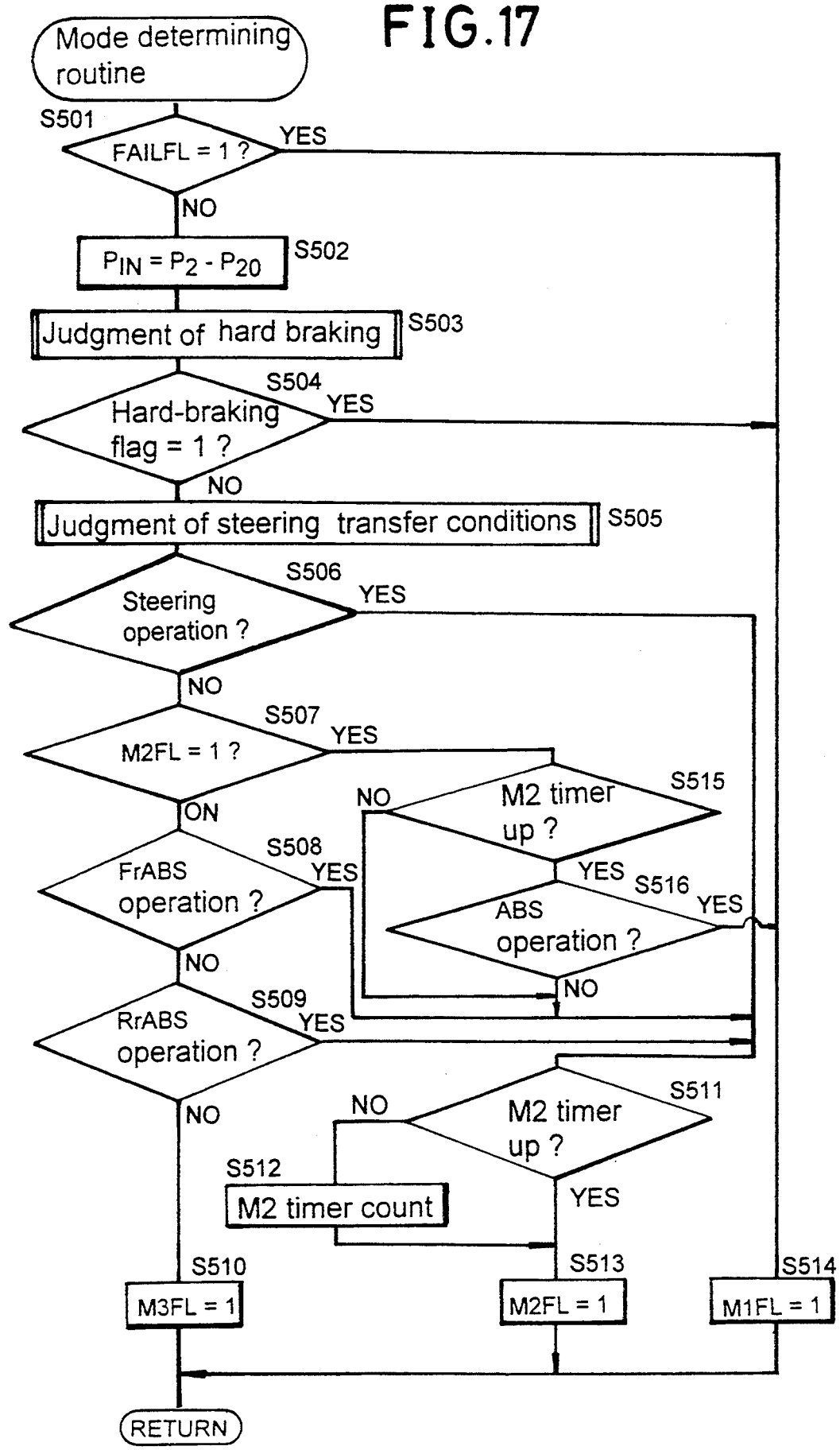

Then, at a step S505 in the flow chart shown in FIG. 17, it is judged whether or not steering is now being conducted.

Figure 19:
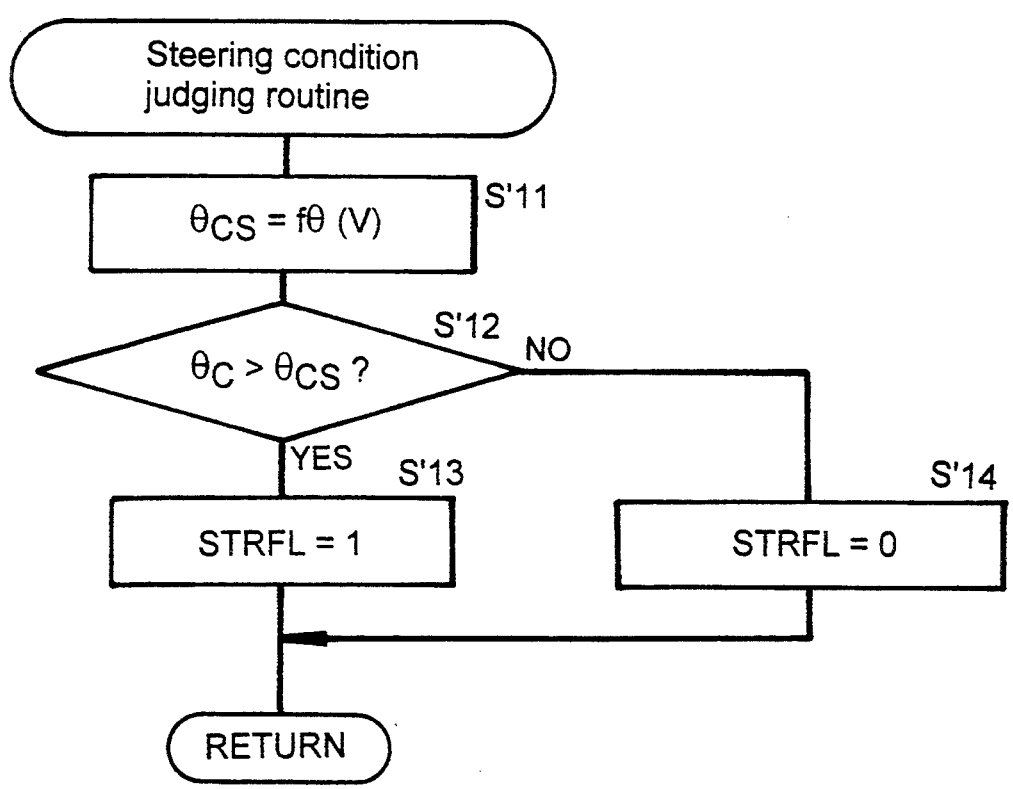

FIG. 19 illustrates a steering condition judging routine. First, at a step S'11 in this steering condition judging routine, a steering judging steering-angle threshold value $\theta_c S$ is determined from the vehicle speed V on the basis of a map shown in FIG. 20, and at a step S'12, this steering judging steering-angle threshold value $\theta$ cs is compared with the steering angle $\theta$ cs determined in the above-described steering angle calculating routine (see FIG. 8). If the steering angle $\theta$ cs is more than the steering judging steering-angle threshold value $\theta$ cs, it is decided that steering is being conducted, and at a step S'I3, a steering flag STRFL is set at "1". On the other hand, if the steering angle $\theta$ cs is equal to or less than the steering judging steering-angle threshold value $\theta$ cs, it is decided that steering is not being conducted, and at a step S544, the steering flag STRFL is set at "0".

Figure 20:
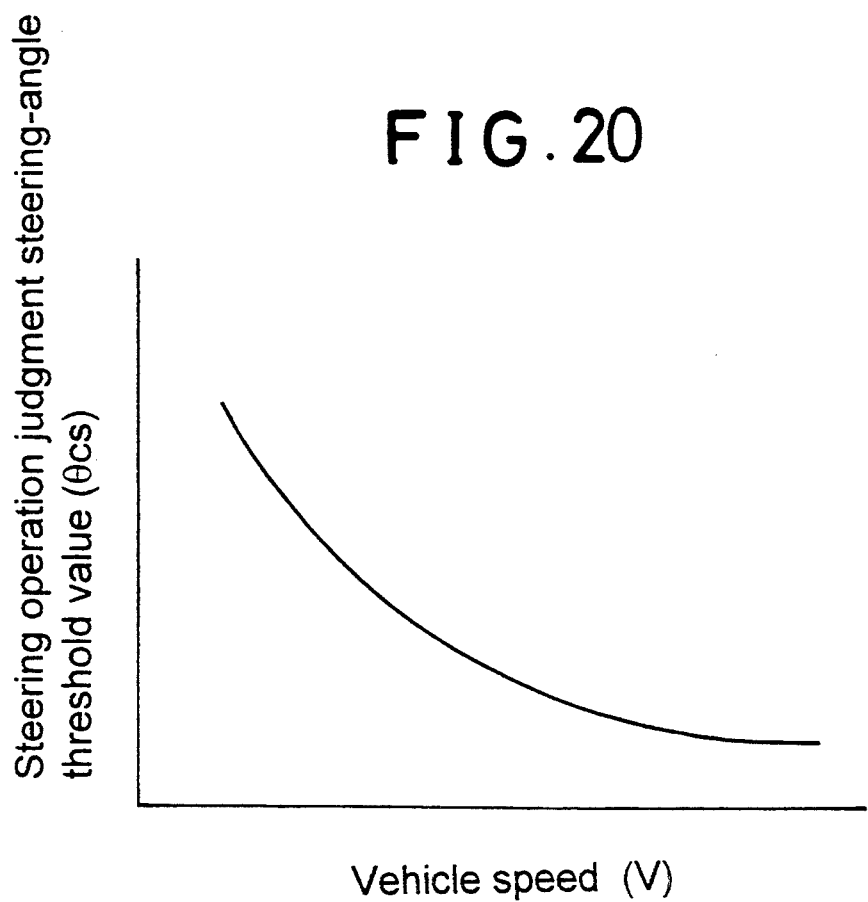

As apparent from FIG. 20, the steering judging steering angle threshold value $\theta$ cs becomes small when the vehicle speed V is large, and becomes large when the vehicle speed V is small. For this reason, during traveling of the vehicle at a high speed, it is decided that the steering operation is being conducted even if the steering angle $\theta$ c is of a small value. On the other hand, during traveling of the vehicle at a low speed, it is not decided that the steering operation is being conducted, unless the steering angle $\theta c$ is of a large value.

Figure 21:
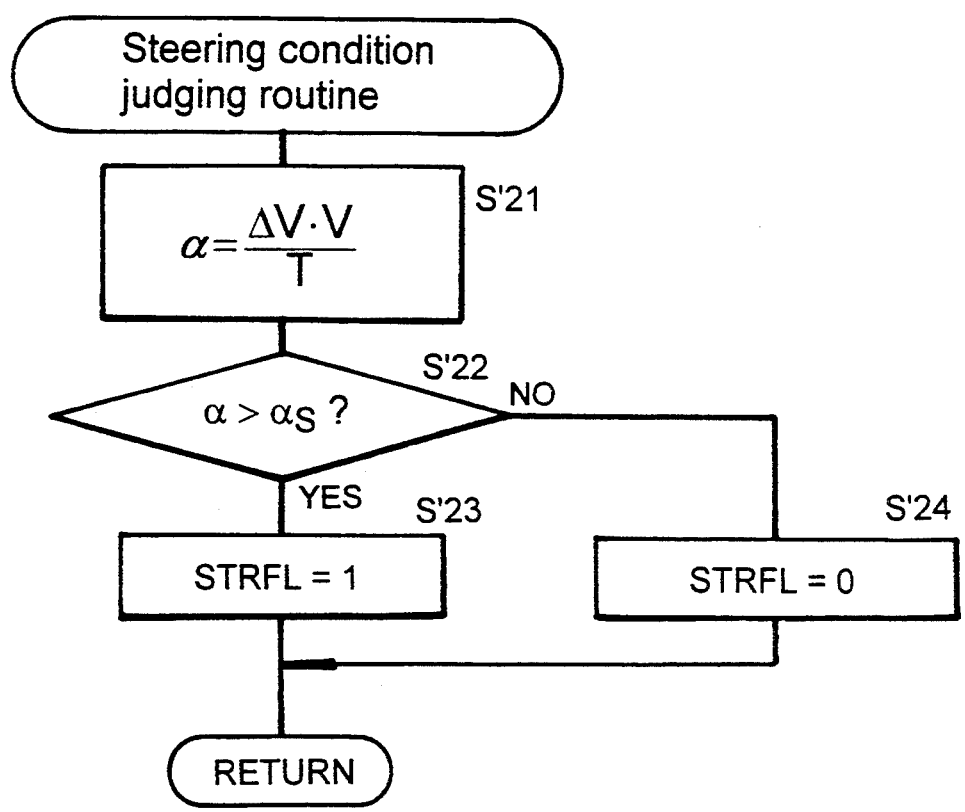

FIG. 21 illustrates another embodiment of the steering condition judging routine. At a step S'21, a lateral acceleration $\alpha$ of the vehicle is calculated from a difference $\Delta v$ between left and right wheel speeds, a vehicle speed V and a tread T according to an expression, $\alpha = \Delta v \times V/T$. At a step S'22, the lateral acceleration $\alpha$ is compared with a steering operation judging lateral acceleration threshold value $\alpha s$. If the lateral acceleration $\alpha$ is more than the steering operation judging lateral acceleration threshold value $\alpha s$, it is decided that the steering operation is being conducted. And at a step S'23, the steering flag STRFL is set at "I". On the other hand, if the lateral acceleration $\alpha$ is equal to or less than the steering operation judging lateral acceleration threshold value $\alpha s$, it is decided that the steering operation is not being conducted, and at a step S'24, the steering flag STRFL is set at "0".

In the flow chart shown in FIG. 17, if it has been decided that the steering operation is not being conducted at a step S506; a mode-2 flag M2FL which will be described hereinafter is not set at "1" at a step S507; the anti-lock brake systems for the front wheels Wf are not in operation at a step S508; and the anti-lock brake systems for the rear wheels are not operated at a step S509 (i.e., if a fail is not produced, a hard braking is not conducted); then, the steering operation is not being conducted and the anti-lock brake systems are not in operation, the mode-3 is selected at a step S510, whereby a mode-3 flag M3FL is set at "1".

If it has been decided at the step S506 that the steering operation is being conducted, the count-down of the mode-2 timer M2TM is started at steps S511 and S512, and the mode-2 is selected at a step S513, whereby a mode-2 flag M2FL is set at "1". At the step S508, if the anti-lock brake systems for the front wheels Wf are in operation, or if the anti-lock brake systems for the rear wheels Wr are in operation at the step S509, the mode-2 flag M2FL is likewise set at "1" at steps S511 to S513.

If the fail flag FAILFL has been set at "1" at the step S501, or if it has been decided at the step S504 that a hard braking is being conducted, the mode-1 is selected at a step S514, whereby a mode-1 flag MIFL is set at "1". Further, if the mode-2 flag M2FL has been set at "1" at the step S507, the mode-2 timer M2TM completes the count down (time-up) at a step S515, and the anti-lock brake systems for the front and rear wheels Wf and Wr are in operation at a step S516, the processing is shifted to the step S514 at which the mode-I flag MIFL is set at "1". Namely, if the anti-lock brake systems for the front and rear wheels Wf and Wr are in operation after a lapse of a predetermined time defined by the mode-2 timer M2TM from the selection of the mode-2, it is decided that the wheels are still in their locking tendency, notwithstanding that the mode-2 has been selected to reduce the braking force, and the mode is switched over to the mode-1.

If the steering operation is being conducted or the anti-lock brake systems are operated when the mode-3 has been selected, the mode-3 is switched over to the mode-2. In addition, if the anti-lock brake systems are still in operation even if a predetermined time has been lapsed after switch-over of the mode-3 to the mode-2, the mode-2 is switched over to the mode-1. When a fail has been generated and when a hard braking has been applied, either of the mode-3 or the mode-2 is switched over unconditionally to the mode-1.

The specified content of a differential pressure regulating valve operation quantity determining routine at the step S500 in the flow chart shown in FIG. 6 will be described in connection with flow charts shown in FIGS. 22 to 24 and graphs shown in FIGS. 25 to 28.

Figure 22:
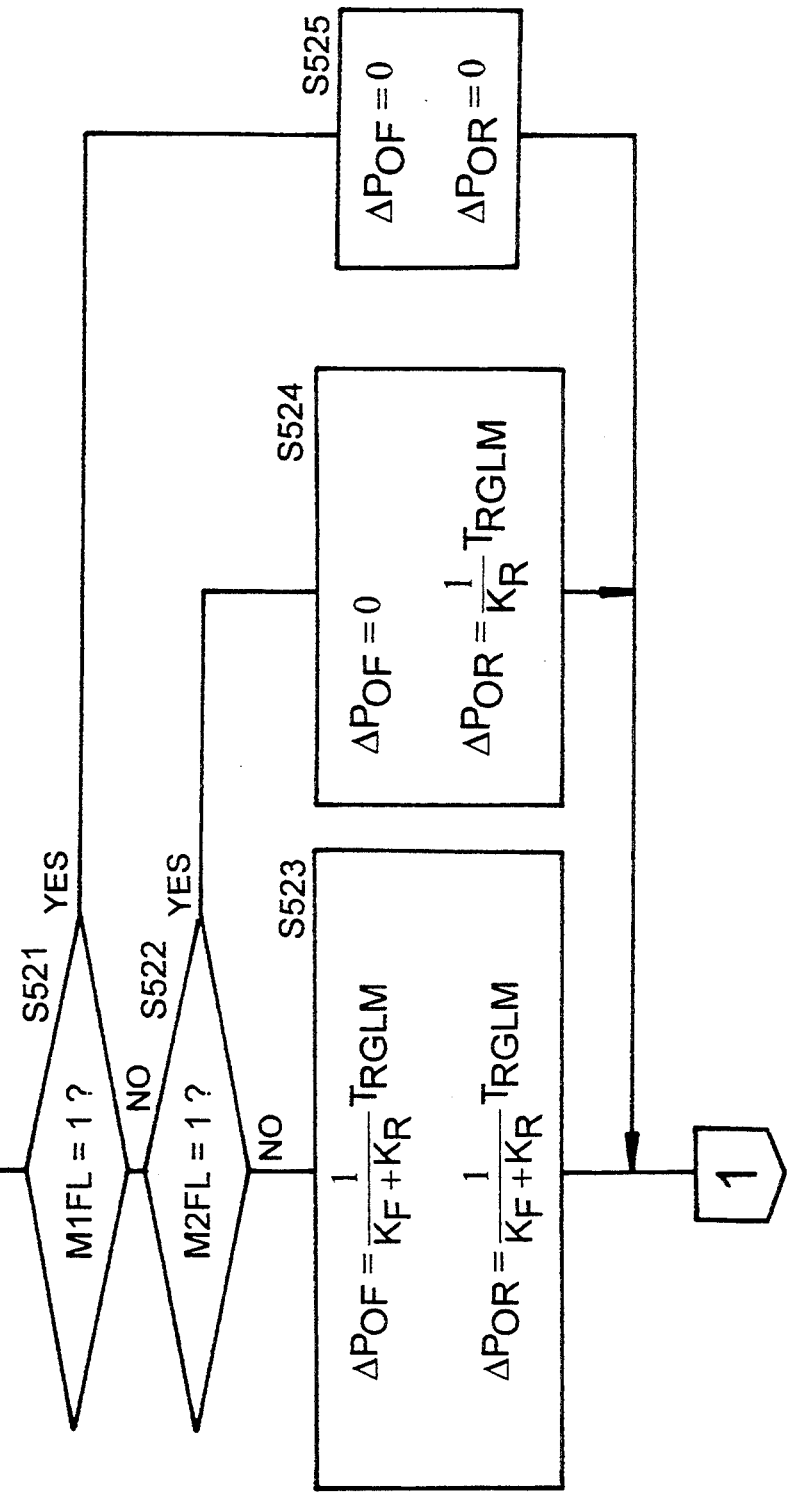

First, if the mode-1 flag MIFL is not set at "I" at a step S S521 in the flow chart shown in FIG. 22, and the mode-2 flag M2FL is not set at "1" at a step S522, i.e., if the mode-3 has been selected, a quantity $\Delta P_{OF}$ of operation of the differential pressure regulating valve for the front wheels and a quantity $\Delta P_{OR}$ of operation of the differential pressure regulating valve for the rear wheels are calculated on the basis of the regenerative braking force limit $T_{RGLM}$ corresponding to the axle torque, a front hydraulic pressure/torque conversion constant $K_F$ and a rear hydraulic pressure/torque conversion constant $K_R$ (see FIG. 24A) according to following equations:

$$\alpha P_{OF} = T_{RGLM}/(K_F + K_R) \quad (7)$$

$$\Delta P_{OR} = T_{RGLM}/(K_F + K_R) \quad (8)$$

Figure 25A:
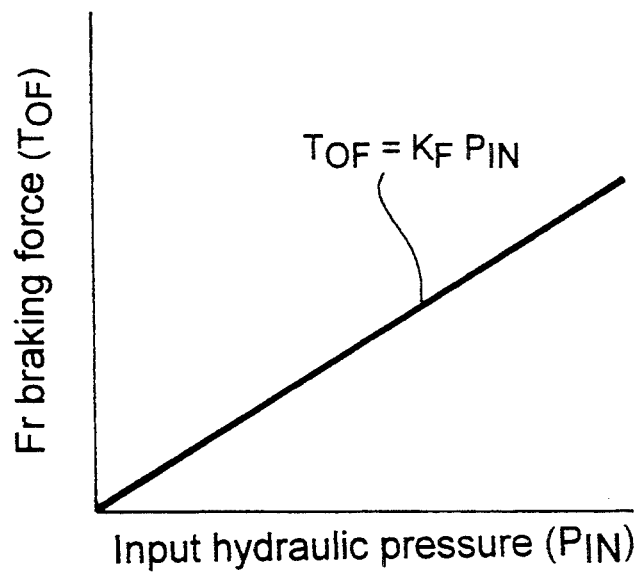
FIGS. 25A and 25B are graphs illustrating the relationship of the braking force relative to the input hydraulic pressure.
Figure 25B:
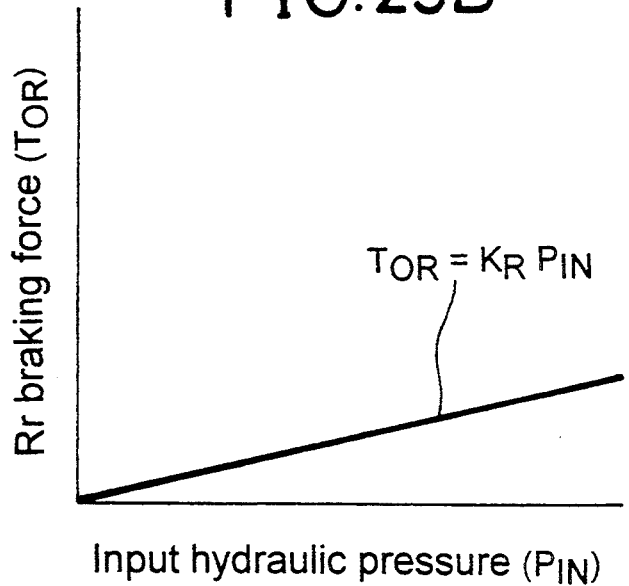

The above equation will be further described. As shown in FIGS. 25A and B, a hydraulic pressure intrinsically on the front side is determined by multiplying an input hydraulic pressure $P_{IN}$ (see the step S502 in the mode determining routine shown in FIG. 17) by the front hydraulic pressure/torque conversion constant $K_F$, and a hydraulic pressure on the rear side is determined by multiplying such input hydraulic pressure $P_{IN}$ by the rear hydraulic pressure/torque conversion constant $K_F$. In fact, however, in a region from the O point to the P point in the braking force distribution in the mode-3 shown in FIG. 3, only the regenerative braking force for the rear wheels Wr is applied. And in a region beyond the P point where the regenerative braking force limit $T_{RGLM}$ corresponding to the axle torque has been reached, the regenerative braking force is maintained at a given value, and the hydraulic braking force for the rear wheels Wr and the hydraulic braking force for the rear wheels Wf start increasing from zero. Therefore, if the hydraulic braking force is increased from zero at the start of the hydraulic braking of the rear and front wheels Wr and Wf upon reaching the P point at which the regenerative braking force for the rear wheels Wr becomes the regenerative braking force limit $T_{RGLM}$, the connection of the regenerative braking and the hydraulic braking at the P point is performed smoothly.

Figure 26A:
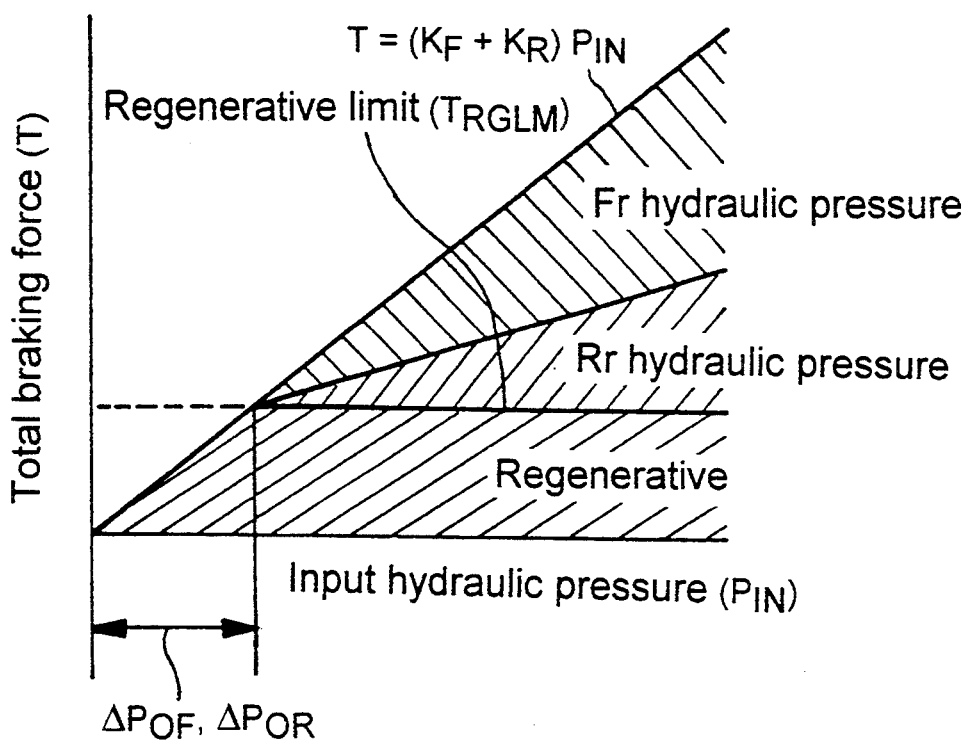
FIGS. 26A and 26B are graphs illustrating the relationship of the total braking force relative to the input hydraulic pressure.
Figure 27A:
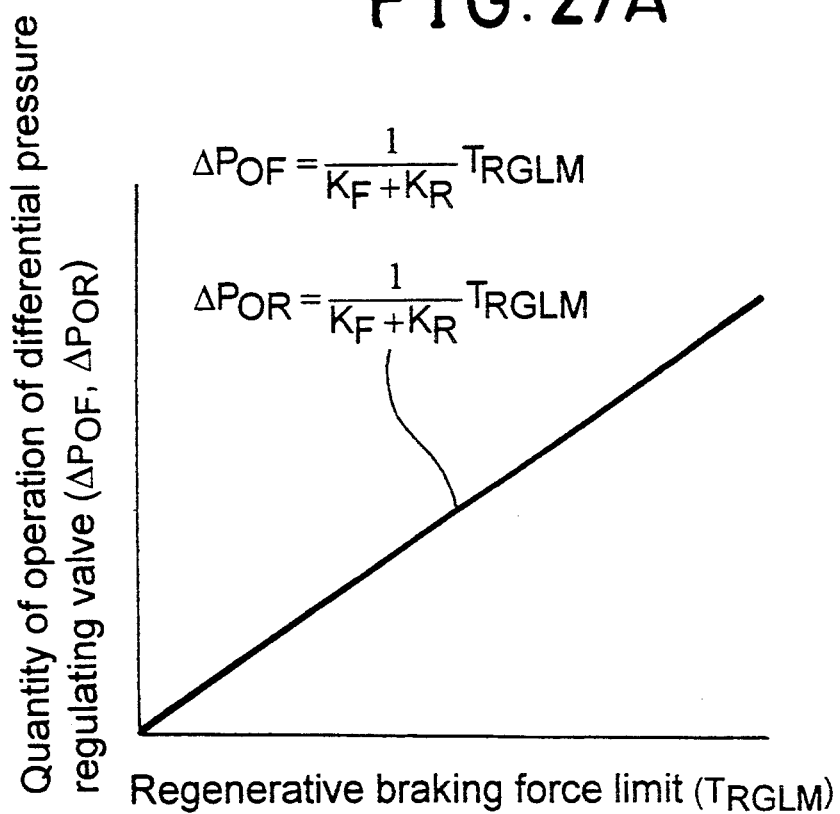
FIGS. 27A and 27B are graphs illustrating the relationship of the quantity of operation of the differential pressure regulating value relative to the regenerative braking force limit value.

For this purpose, the regenerative braking force limit TRGLM and the quantities $\Delta P_{OF}$ and $\Delta P_{OR}$ of operation of the front-side and rear-side differential pressure regulating valves may be in a relation shown in FIG. 26A and corresponding to the expressions (7) and (8) set forth above. Namely, if the relations of the expressions (7) and (8) are satisfied, the hydraulic braking force corresponding to a value obtained by $K_F \times T_{RGLM}/(K_F+K_R)$ is suppressed by the differential pressure regulating valve 16f, until the input hydraulic pressure $P_{IN}$ reaches the quantity $\Delta P_{OF}$ of operation of the front-side differential pressure regulating valve, and likewise, the hydraulic braking force corresponding to a value obtained by $K_R \times T_{RGLM}/(K_F+K_R)$ is suppressed by the differential pressure regulating valve 16r, until the input hydraulic pressure $P_{IN}$ reaches the quantity $\Delta P_{OR}$ of operation of the rear-side differential pressure regulating valve, as shown in FIGS. 26A and 27A. As a result, the total hydraulic braking force only equal to the regenerative braking force limit $T_{RGLM}$ corresponding to the axle torque is suppressed. This causes the hydraulic braking forces for the front and rear wheels Wf and Wr to be applied only when the P point is reached, so that the connection of the regenerative braking and the hydraulic braking is performed smoothly.

Figure 26B:
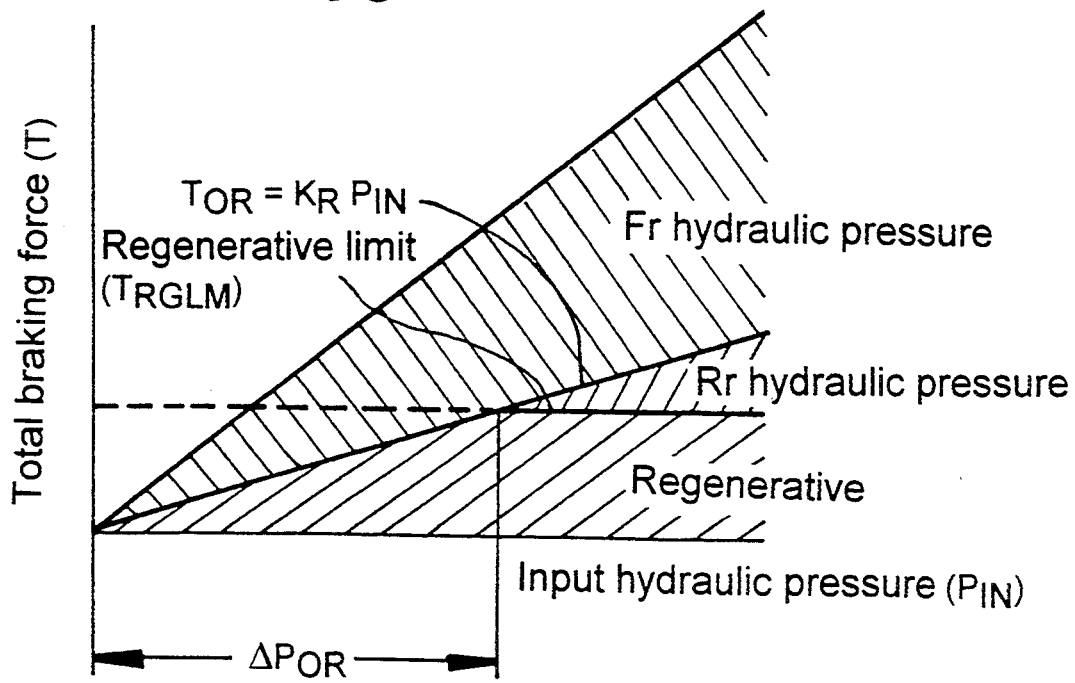

On the other hand, in the braking force distribution in the mode-2 shown in FIG. 3, the regenerative braking force for the rear wheels Wr and the hydraulic braking force for the front wheels Wf are applied from the O point, and after the regenerative braking force for the rear wheels Wr has reached the regenerative braking force limit $T_{RGLM}$, such regenerative braking force is maintained at a given value, and the hydraulic braking force for the rear wheels Wr is newly started to be applied, as shown in FIGS. 26B. Therefore, if the hydraulic braking force for the rear wheels Wr starts increasing when the regenerative braking force for the rear wheels Wr becomes the regenerative braking force limit $T_{RGLM}$ corresponding to the axle torque, the connection of the regenerative braking and the hydraulic braking is performed smoothly.

Figure 27B:
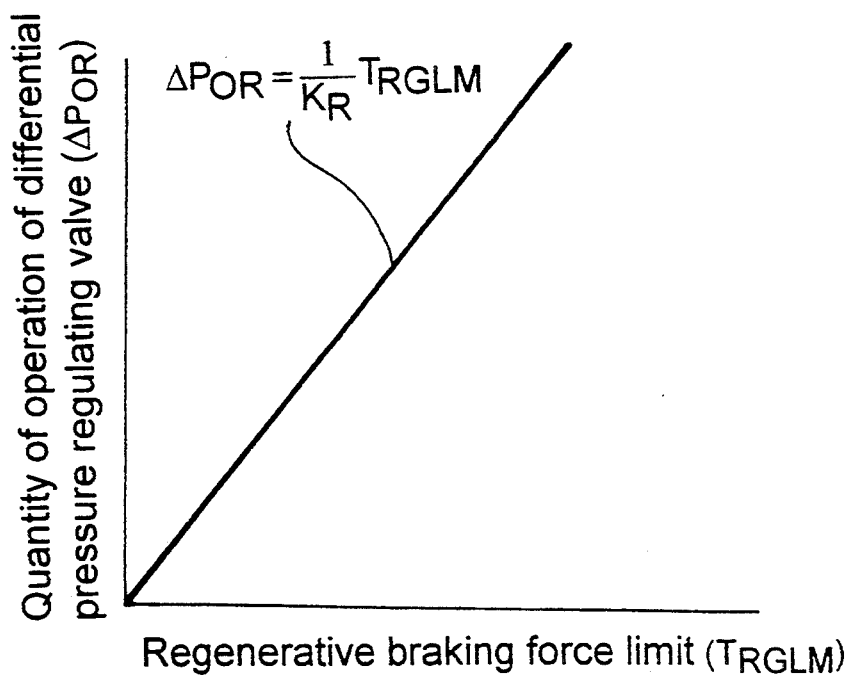

For this purpose, the regenerative braking force limit $T_{RGLM}$ and the quantity $\Delta P_{OR}$ of operation of the rear-side differential pressure regulating valve may be in a relation satisfying the following expression:

$$\Delta P_{OR}=T_{RGLM}/K_R \quad (9)$$

i.e., in a relation shown in FIG. 27B. More specifically, if the relation represented by the expression (9) is satisfied, the hydraulic braking force equal to the regenerative braking force limit $T_{RGLM}$ corresponding to the axle torque is suppressed by the differential regulating valves 16r, until the input hydraulic pressure $P_{IN}$ reaches the quantity $\Delta P_{OR}$ of operation of the rear-side differential pressure regulating valve, whereby the hydraulic braking force for the rear wheels Wr is applied only at the regenerative braking force limit $T_{RGLM}$, as shown in FIG. 26B, so that the connection of the regenerative braking and the hydraulic braking is performed smoothly.

Figure 23:
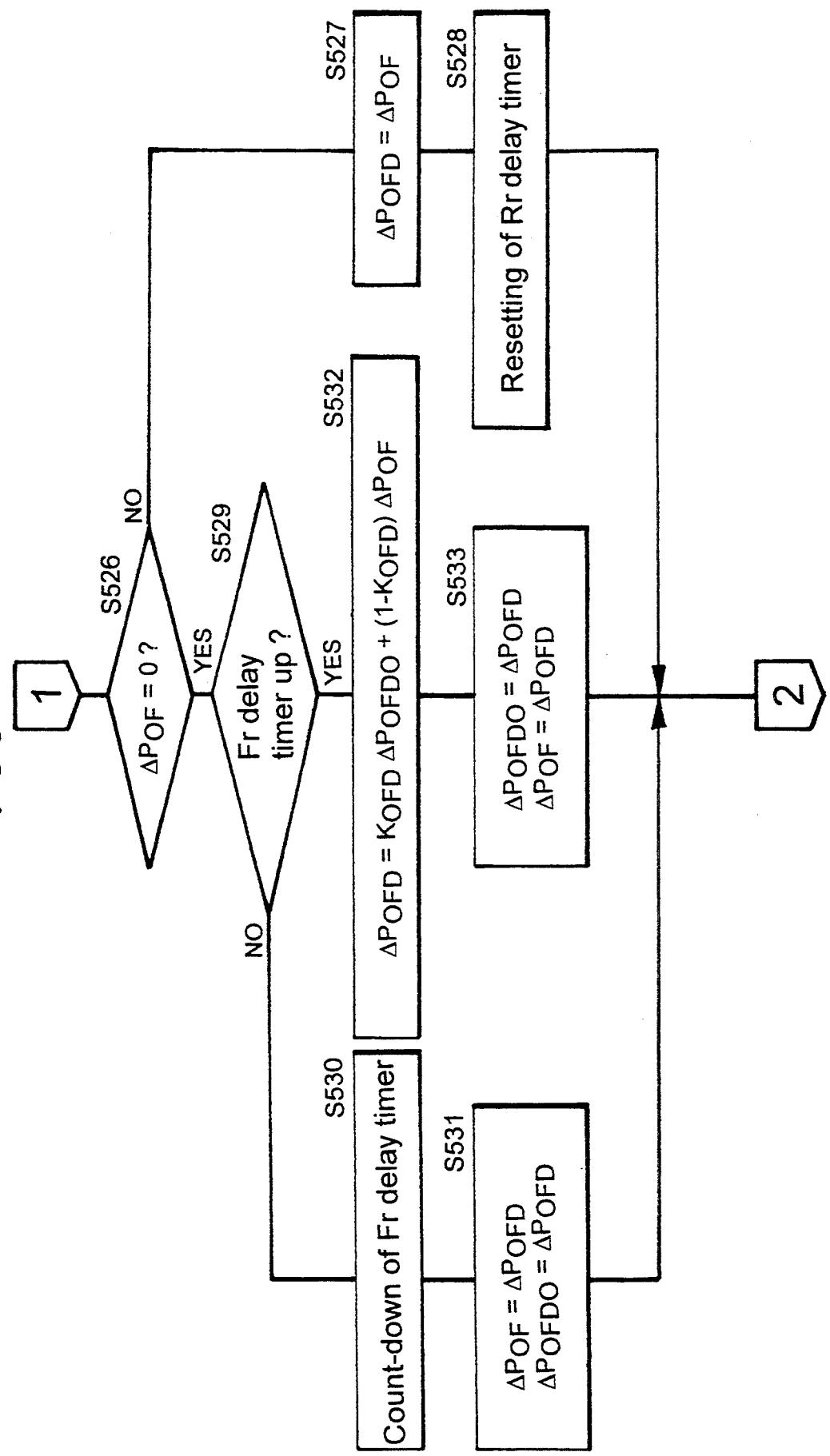

Then, at a step S526 in the flow chart shown in FIG. 23, it is judged whether or not the quantity $\Delta P_{OF}$ of operation of the font-side differential pressure regulating valve is zero. If the quantity $\Delta P_{OF}$ is not zero, the current value of $\theta P_{OF}$ is equalized to a value $\Delta P_{OFD}$ maintained during the delay treatment at a step S527, and a front delay timer $DLYTM_F$ is reset at a step S528. If $\Delta P_{OF}$ is zero at the step S526, the value $\Delta OFD$ maintained during the delay treatment is equalized to the quantity $\Delta P_{OF}$ of operation of the differential pressure regulating valve at a step S531 and equalized to an initial value $\Delta P_{OFDO}$ used at a step S532, for a period of time until the front delay timer DLYTMF completes the count down (time-up) at steps S529 and S530. If the front delay timer DLYTMF complete the count down (time-up) at the step S529, a temporarily delayed filtering is carried out at the step S532 to calculate a filtered value $\Delta P_{OFD}$ of the $\Delta P_{OF}$ according to the following equation:

$$\Delta P_{OFD}=K_{ODF} \times \Delta P_{OFDO}+(1-K_{ODF}) \Delta P_{OF} \quad (10)$$

and the filtered value $\Delta P_{OFD}$ is equalized to a value $\Delta P_{OFDO}$ maintained during the delay treatment before one loop and to the quantity $\Delta P_{OF}$ of operation of the differential pressure regulating valve at a step S533. In the above equation, $K_{ODF}$ is a first-order lag factor.

Figure 24:
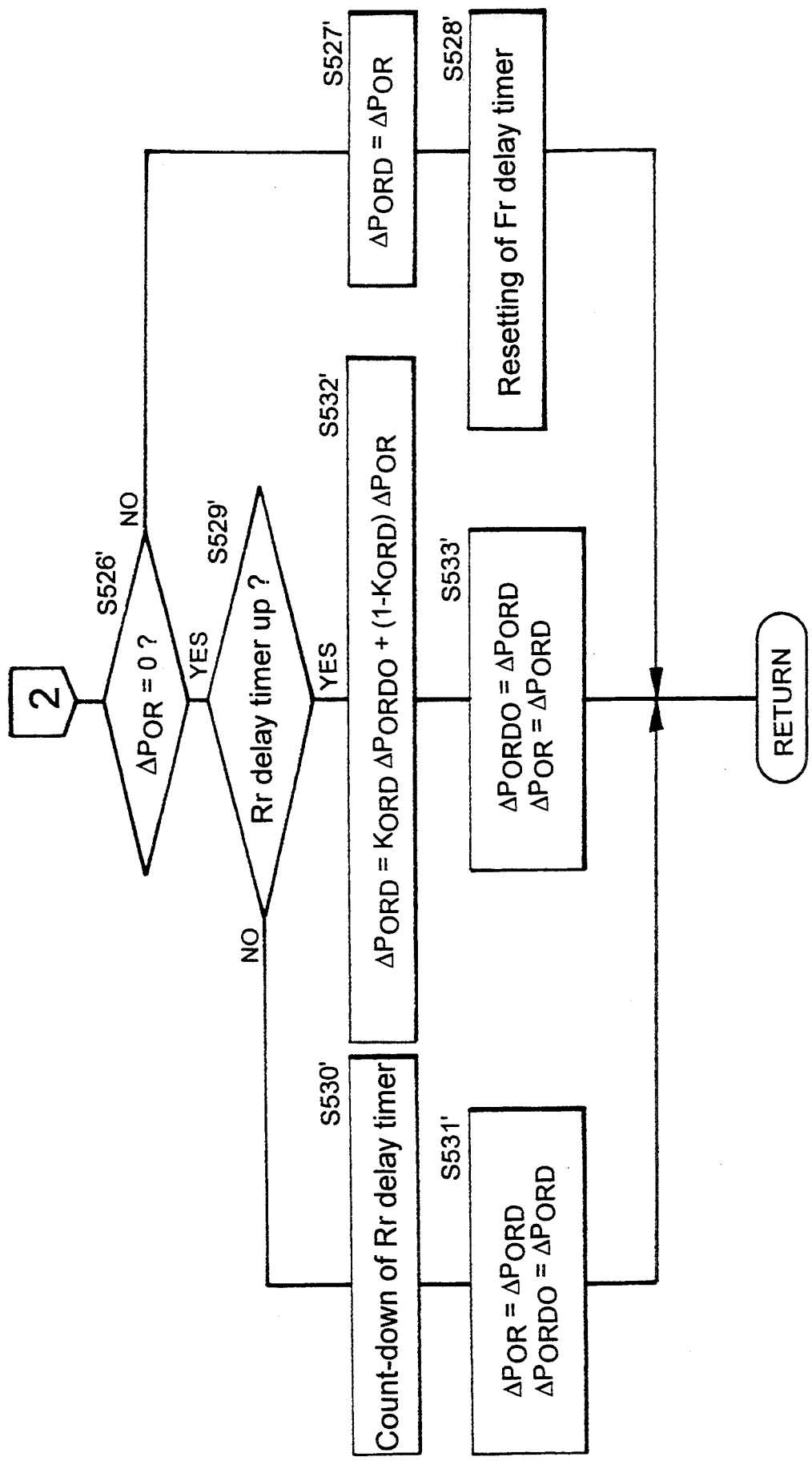

The flow chart shown in FIG. 24 indicates the temporarily delayed filtering for the quantity $\Delta POR$ of operation of the rear-side differential pressure regulating valve. The content thereof is substantially the same as that in the flow chart shown in FIG. 23 and hence, the duplicate description is omitted. The differences between FIGS. 23 and 24 are only that "Fr" and "F" representing the front side are replaced by "Rr" and "R" representing the rear side, and an "'" is affixed to each of step numbers. It should be noted that the above-described differential pressure regulating valve operation-quantity determining routine is carried out only during operation of the brake pedal 8 and hence, the wasteful consumption of electric power can be prevented (see FIG. 6).

Figure 28:
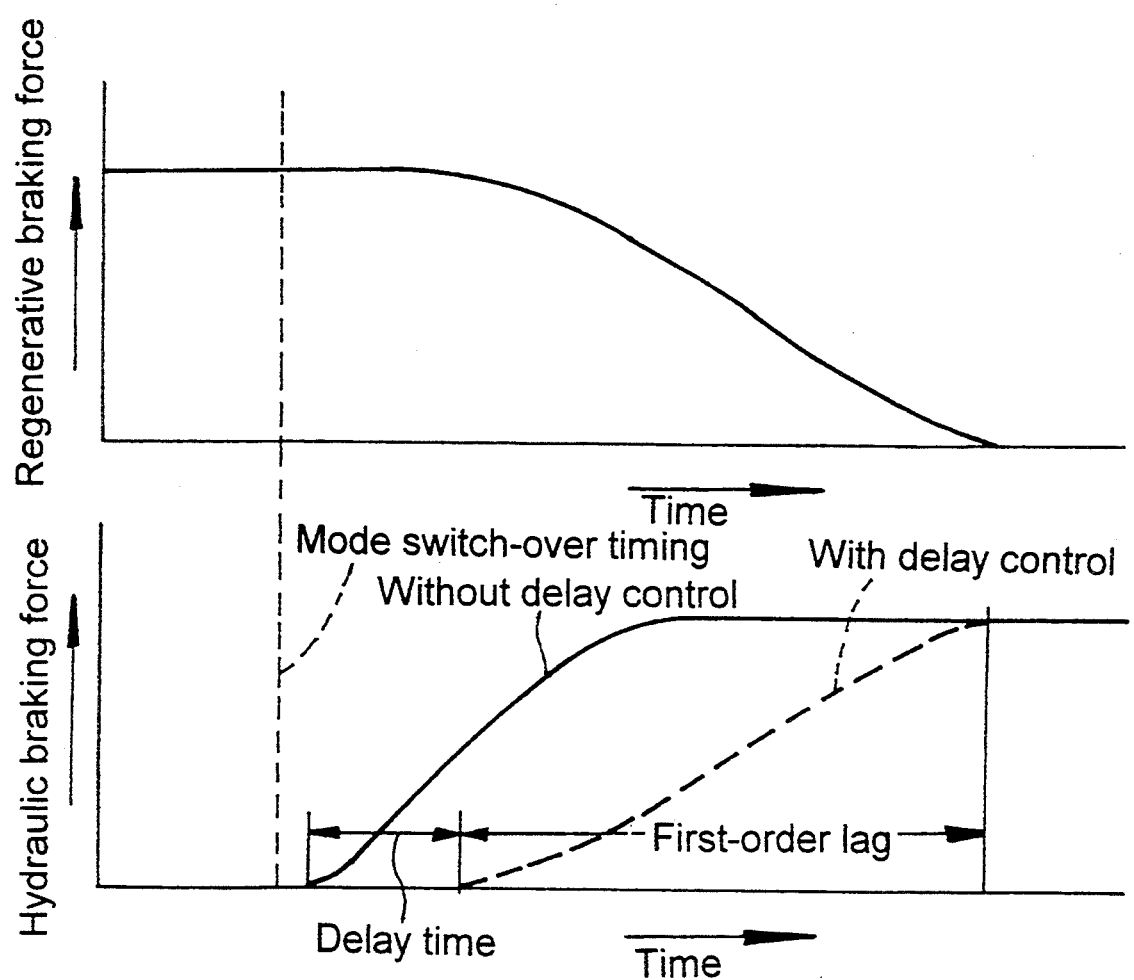

As apparent from FIG. 28, even if an increase in the hydraulic braking force is too early when the regenerative braking is switched over to the hydraulic braking, such increase is delayed by a delay time, and the speed of increase of the hydraulic braking force is delayed by a first-order lag control. Therefore, the switching-over of the regenerative braking to the hydraulic braking can be performed smoothly.

The specified content of a regenerative braking force command value determining routine at the step S500 in the flow chart shown in FIG. 6 will be described in connection with flow charts shown in FIGS. 29 to 32 and graphs shown in FIGS. 33 and 34.

The outline of a technique for determining a regenerative braking force command value will be first described in connection with FIG. 34.

If the differential pressure regulating valve $16f$ ($16r$) having the structure shown in FIG. 5 is used as described above, a hysteresis as shown in FIG. 34 is generated in the output hydraulic pressure $P_{OUT}$ from the differential pressure regulating valve $16f$ ($16r$) in the courses of increasing and decreasing the depression force on the brake pedal 8. More specifically, even if the input hydraulic pressure $P_{IN}$ is increased from the O point in proportion to an increase in depression force, the output hydraulic pressure $P_{OUT}$ is not generated in a region (1) extending to an A point at which the input hydraulic pressure $P_{IN}$ reaches the quantity $\Delta P_O$ of operation of the differential pressure regulating valve to open the differential pressure regulating valve $16f$($16r$), and a difference $\Delta P$ between the input hydraulic pressure $P_{IN}$ and the output hydraulic pressure $P_{OUT}$ is equal to a value of the input hydraulic pressure $P_{IN}$.

If the differential pressure regulating valve $16f$($16r$) is opened at the A point, the output hydraulic pressure $P_{OUT}$ is generated, and in a region (2) extending to a B point at which the output hydraulic pressure $P_{OUT}$ reaches the maximum output hydraulic pressure value $P_{OUTMAX}$, the difference $\Delta P$ between the input hydraulic pressure $P_{IN}$ and the output hydraulic pressure $P_{OUT}$ is equal to the quantity $\Delta P_O$ of operation of the differential pressure regulating valve which is a constant value. Even if the depression force is reduced at the B point, the output hydraulic pressure $P_{OUT}$ is not decreased and is maintained at the maximum output hydraulic pressure value $P_{OUTMAX}$ to a C point at which the input hydraulic pressure $P_{IN}$ and the output hydraulic pressure $P_{OUT}$ are equal to each other, and in such a region (3), the differential pressure $\Delta P$ is equal to $P_{IN}$ - $P_{OUTMAX}$. Then, the C point is reached, where the output hydraulic pressure $P_{OUT}$ starts reducing successively toward an O point. In such a region (4), the differential pressure $\Delta P$ is zero. If the brake pedal 8 is depressed to increase the depression force again at a D point in the course of reducing the depression force, the output hydraulic pressure $P_{OUT}$ is not increased because of the characteristic of the differential pressure regulating valve $16f$ ($16r$) and is maintained at the minimum output hydraulic pressure value $P_{OUTMIN}$ in a region of from the D point to an E point, and in such a region (5), the differential pressure $\Delta P$ is equal to $P_{IN}$ - $P_{OUTMIN}$.

In short, the differential pressure $\Delta P$ is determined by $P_{IN}$ - $P_{OUTMAX}$ in the regions (1), (2) and (3); is equal to zero in the region (4), and is determined by $P_{IN}$ - $P_{OUTMIN}$ in the region (5). The value of the maximum output hydraulic pressure value $P_{OUTMAX}$ is determined by subtracting the quantity $\Delta P_O$ from the input hydraulic pressure $P_{IN}$ in every loop to provide an output hydraulic pressure, so that the maximum value of such output hydraulic pressure $P_{OUT}$ may be used as the maximum output hydraulic pressure value $P_{OUTMAX}$. The entering into the region (4) can be judged by finding that the input hydraulic pressure $P_{IN}$ is lower than the maximum output hydraulic pressure value $P_{OUTMAX}$. In the region (4), the input hydraulic pressure $P_{IN}$ and the output hydraulic pressure $P_{OUT}$ are equal to each other and hence, the minimum value of the output hydraulic pressure $P_{OUT}$ is equalized to the minimum output hydraulic pressure value $P_{OUTMIN}$. The entering into the region (5) can be judged by finding that the input hydraulic pressure $P_{IN}$ is higher than the minimum output hydraulic pressure value $P_{OUTMIN}$. In the region (5), the same idea as in the region (3) can used by replacing the minimum output hydraulic pressure value $P_{OUTMIN}$ by the maximum output hydraulic pressure value $P_{OUTMAX}$.

Figure 29:
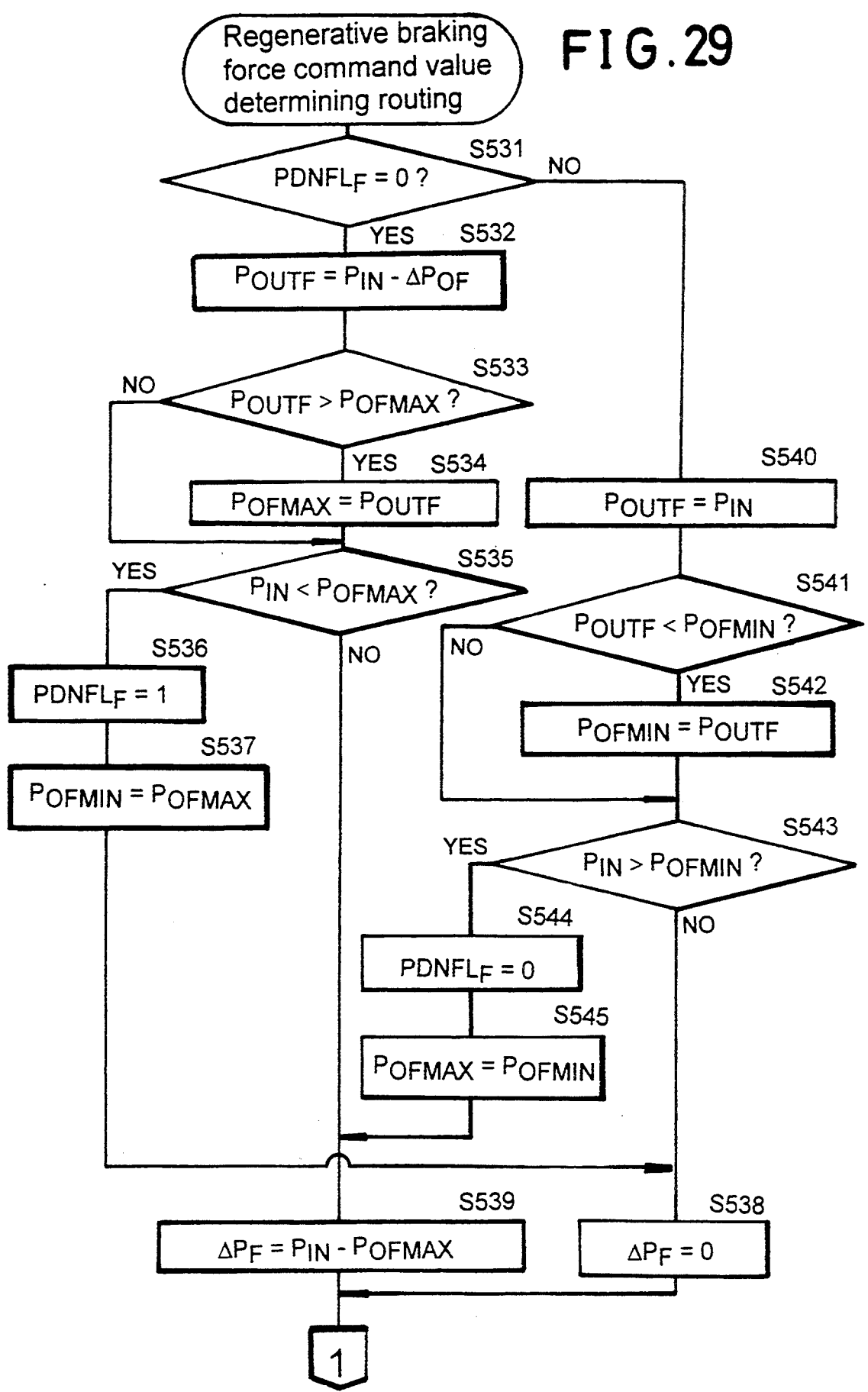

The foregoing will be further described in detail with respect to the front-side differential pressure regulating valve $16f$ with reference to a flow chart shown in FIG. 29. In the flow chart, the maximum output hydraulic pressure value $P_{OUTMAX}$ shown in FIG. 34 is represented by the front-side and rear-side maximum output hydraulic pressure values $P_{OFMAX}$ and $P_{ORMAX}$, and the minimum output hydraulic pressure value $P_{OUTMIN}$ is represented by the front-side and rear-side minimum output hydraulic pressure value $P_{OFMIN}$ and $P_{ORMIN}$.

Figure 34:
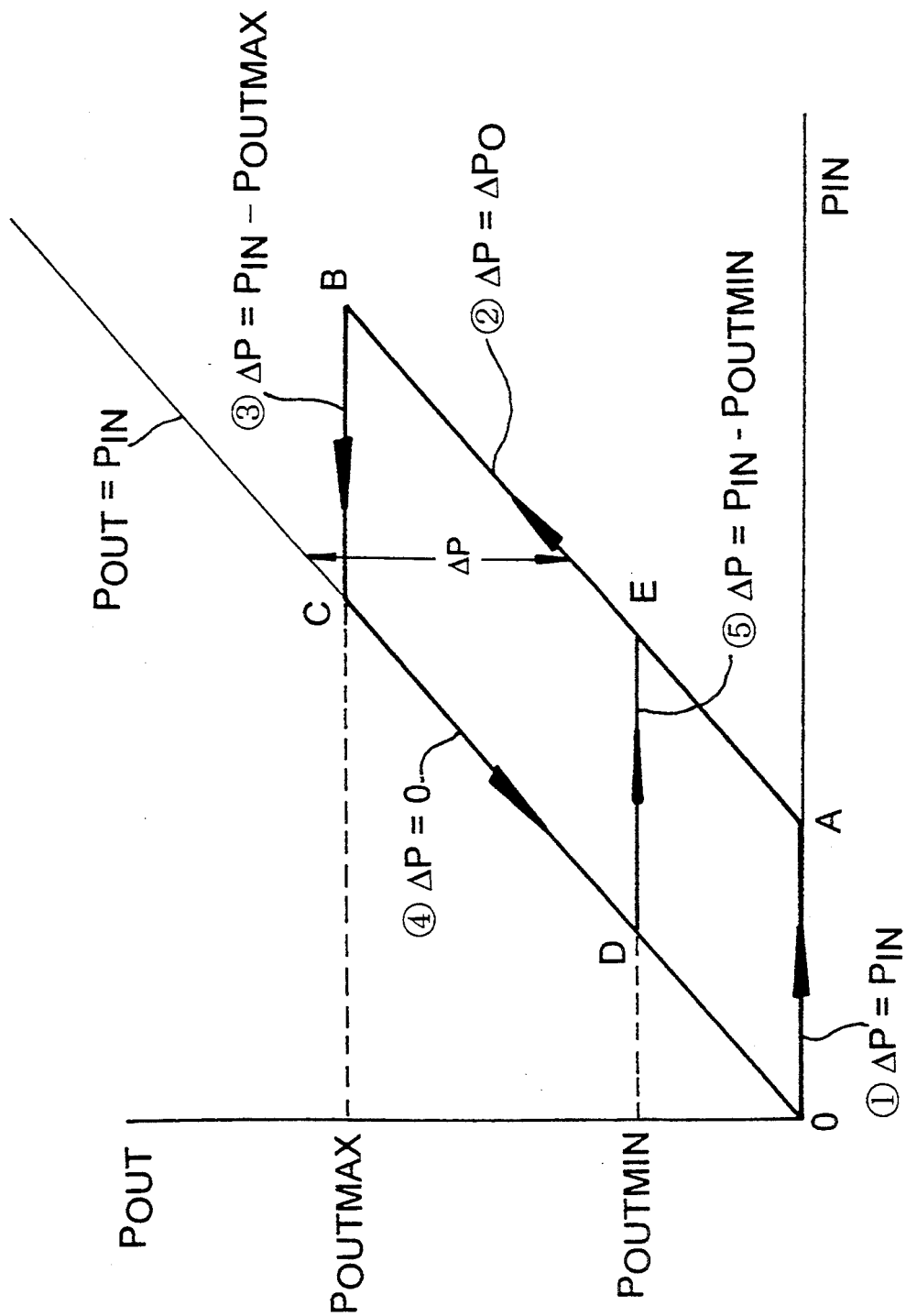

If a pressure-reduction flag $PDNFL_F$ is zero (0) at a step S531 in the flow chart shown in FIG. 29, i.e., in a region other than the region (4) in FIG. 34, an output hydraulic pressure $P_{OUTF}$ from the front-side differential pressure regulating valve $16f$ is calculated at a step S532 by subtracting the quantity $\Delta P_{OF}$ of operation of the differential pressure regulating valve $16f$ from the input hydraulic pressure $P_{IN}$. Then, if the output hydraulic pressure $P_{OUTF}$ is more than the maximum output hydraulic pressure value $P_{OUTMAX}$ at a step S534, the maximum output hydraulic pressure value $P_{OUTMAX}$ is replaced by such output hydraulic pressure $P_{OUTF}$ every time at a step S534.

If the input hydraulic pressure $P_{IN}$ is lower than the maximum output hydraulic pressure value $P_{OUTMAX}$ at a step S535, it is decided that the region (4) in which the output hydraulic pressure $P_{OUTF}$ is decreased has been entered. At a step S536, the pressure reduction flag $PDNFL_F$ is set at "1" and at a step S537, the minimum output hydraulic pressure value $P_{OFMIN}$ is replaced by the maximum output hydraulic pressure value $P_{OFMAX}$. Thereafter, at a step S538, the differential pressure $\Delta P_F$ is set at zero, so that the characteristic of the region (4) is obtained. On the other hand, if the input hydraulic pressure $P_{IN}$ is higher than the maximum output hydraulic pressure value $P_{OFMAX}$ at the step S535, i.e., in any of the regions (1), (2), (3) and (5) other than the region (4), the differential pressure $\Delta P_F$ is calculated by subtracting the maximum output hydraulic pressure value $P_{OFMAX}$ from the input hydraulic pressure $P_{IN}$.

If the pressure reduction flag $PDNFL_F$ has been set at "1" at the step S531, i.e., in the region (4), the input hydraulic pressure $P_{IN}$ is first equalized to the output hydraulic pressure $P_{OUTF}$ at a step S540. Then, if the output hydraulic pressure $P_{OUTF}$ is lower than the minimum output hydraulic pressure value $P_{OFMIN}$ at a step S541, the minimum output hydraulic pressure value $P_{OFMIN}$ is replaced by such output hydraulic pressure $P_{OUTF}$ every time at a step S542. If it has been decided at a step S543 that the region (5) in which the input hydraulic pressure $P_{IN}$ is higher than the minimum output hydraulic pressure value $P_{OFMIN}$ is reached. Thus, the pressure reduction flag $PDNFL_F$ is set at "0" at a step S544. Then, at a step S545, the maximum output hydraulic pressure value $P_{OFMAX}$ is replaced by the minimum output hydraulic pressure value $P_{OFMAX}$, and at a step S539, the differential pressure $\Delta P_F$ is calculated by subtracting the maximum output hydraulic pressure value $P_{OFMAX}$ from the input hydraulic pressure $P_{IN}$. On the other hand, if the input hydraulic pressure $P_{IN}$ is lower than the minimum output hydraulic pressure value $P_{OFMIN}$ at the step S543, it is decided that the region (5) has not been entered, and at a step S538, the differential pressure $\Delta P_F$ is set at zero.

Figure 30:
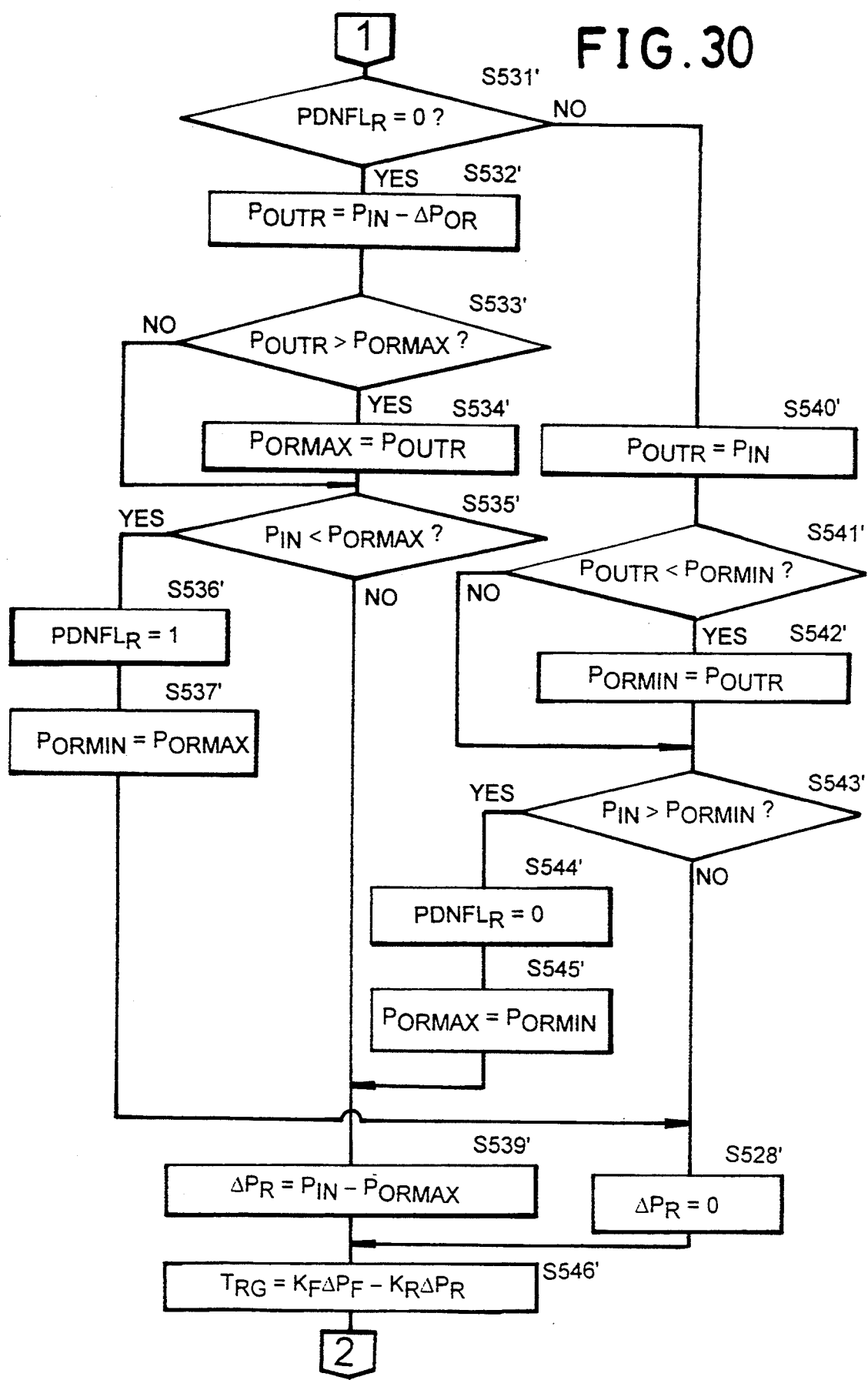

FIG. 30 illustrates a flow chart for determining a differential pressure $\Delta P_R$ associated with the rear-side differential pressure regulating valve 16r. The content of this flow chart is substantially the same as the flow chart shown in FIG. 29 and hence, the duplicate description is omitted. The differences between FIGS. 30 and 29 are only that a suffix "F" representing the front side is replaced by a suffix "R" representing the rear side, and an "'" is added to each step number.

If the differential pressure $\Delta P_F$ on the front side and the differential pressure $\Delta P_R$ on the rear side have been determined in the above manner, a regenerative braking force output value $T_{RG}$ is calculated using the front hydraulic pressure/torque conversion constant $K_F$ and the rear hydraulic pressure/torque conversion constant $K_R$ according to the following equation:

$$T_{RG}=K_F\Delta P_F+K_R\Delta P_R \qquad (11)$$

In the flow charts shown in FIGS. 29 and 30, the above-described hydraulic pressure sensors 27f and 27r for detecting the output hydraulic pressures $P_{OUTF}$ and $POUT^R$ from the differential pressure regulating valves 16f and 16r are not used, but the hydraulic pressure sensors 27f and 27r can be used to directly detect the output hydraulic pressures $P_{OUT}$ and $P_{OUTR}$, thereby simplifying the control thereof.

Figure 35:
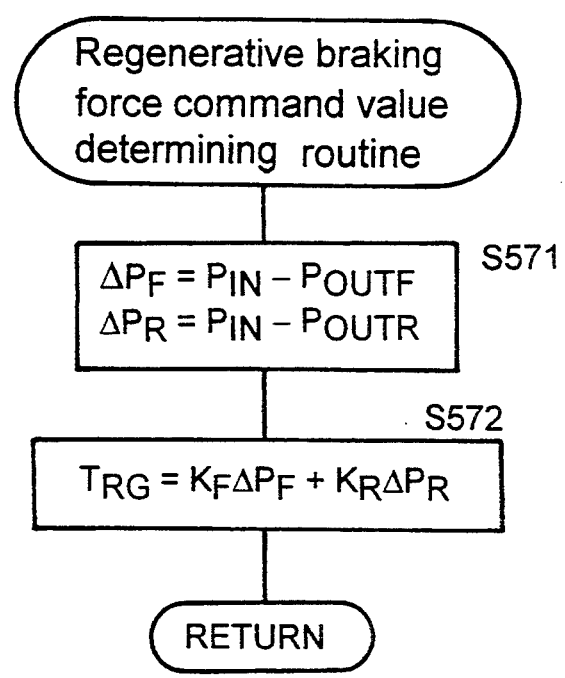

FIG. 35 illustrates a regenerative braking force command value determining routine when the hydraulic pressure sensors 27f and 27r are used. A front-side output hydraulic pressure $P_{OUTF}$ and a rear-side output hydraulic pressure $P_{OUTR}$ are directly detected by the hydraulic pressure sensors 27f and 27r, and at a step S571, front-side and rear-side differential pressures $\Delta P_F$ and $\Delta P_R$ are calculated by subtracting the detected output hydraulic pressures $P_{OUTF}$ and $P_{OUTR}$ from the input hydraulic pressure $P_{IN}$. Then, at a step S572, a regenerative braking force output value $T_{RG}$ is calculated according to the equation (11).

Subsequently, the processing is transferred from the flow chart shown in FIG. 30 to a flow chart shown in FIG. 31, in which a first-order lag control of the regenerative braking force, when the mode-2 is selected, is illustrated.

Figure 31:
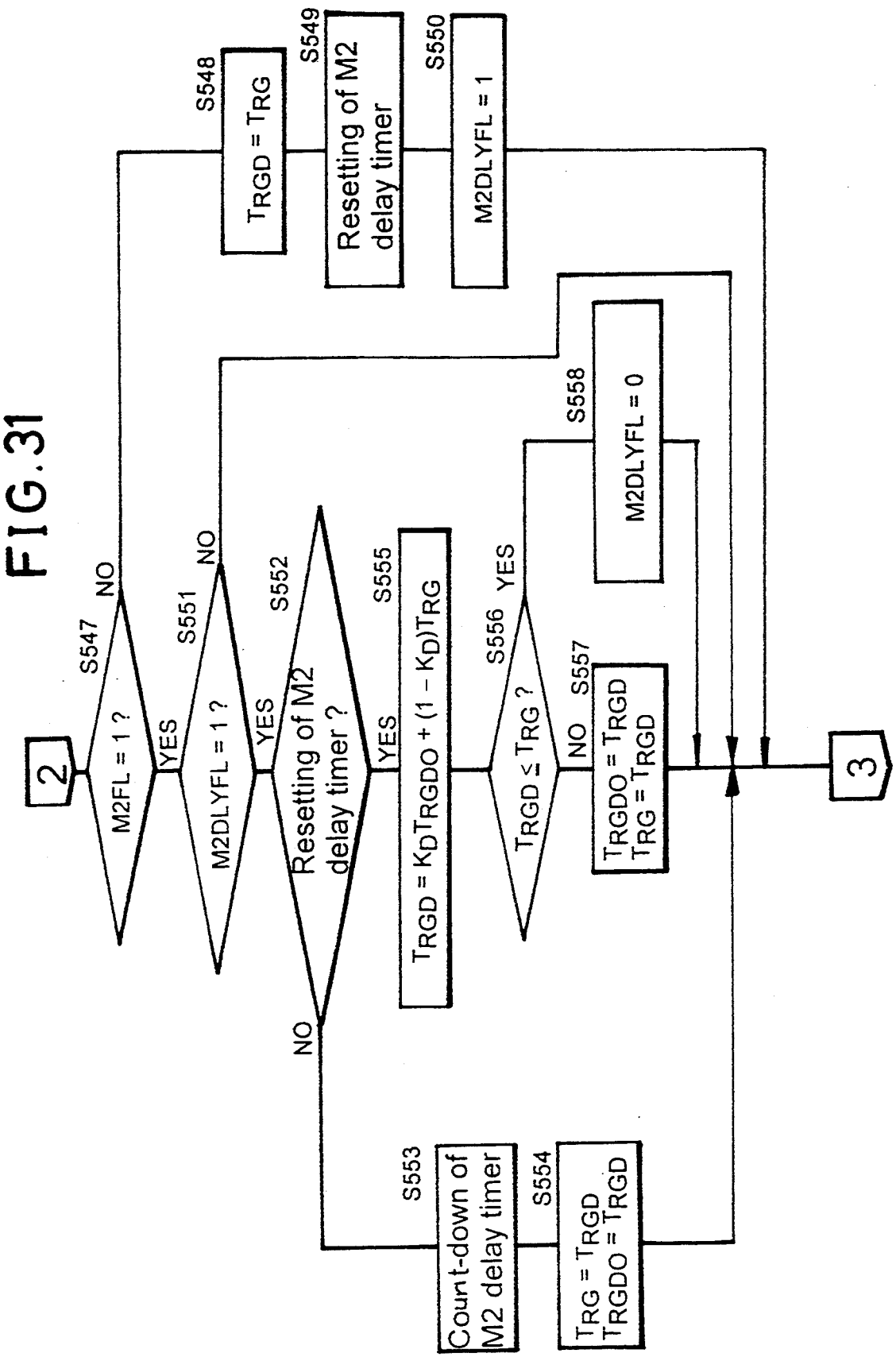

First, if the mode-2 flag M2FL is determined to be not set at "1" at a step S547 in the flow chart shown in FIG. 31, the current regenerative braking force output value $T_{RG}$ is equalized to a value $T_{RGD}$ maintained during the delay treatment at a step S548. Then, at a step S549, a mode-2 delay timer M2DLYTM is reset, and at a step S550, a mode-2 delay flag M2DLYFL is set at "1". If the mode-2 flag M2FL has been determined to be set at "1" at the step S547; the mode-2 delay flag M2DLYFL has been determined to be set at "1" at the step S551; and the mode-2 delay timer M2DLYTM does not reach the time-up, it is decided that the count-down is delayed. Thus, at a step S553, the count-down of the mode-2 delay timer M2DLYTM is continued, and at a step S554, the value $T_{RGD}$ maintained during the delay treatment is equalized to the regenerative braking force output value $T_{RG}$ to maintain the regenerative braking force constant, and is equalized to a filtered value $T_{RGDO}$ before one loop.

If the mode-2 delay timer M2DLYTM has completed the count down (time-up) at the step S552, a temporarily delayed filtering is carried out at a step S555 to calculate a filtered value $T_{RGDO}$ of the regenerative braking force output value $T_{RG}$ according to the following equation:

$$T_{RGD}=K_D T_{RGDO}+(1-K_D)T_{RG} \qquad (12)$$

wherein $K_D$ is a first-order lag factor. At a subsequent step S556, the first-order lag control is continued for a period of time until the filtered value $T_{RGD}$ becomes lower than the regenerative braking force output value $T_{RG}$. At a step S557, the filtered value $T_{RGD}$ is equalized to the filtered value TRGDO before one loop, and is equalized to the regenerative braking force output value $T_{RG}$. If the filtered value $T_{RGD}$ becomes equal to lower than the regenerative braking force output value $T_{RG}$ at the step S556, the first-order lag control is completed, and at a step S558, the mode-2 delay flag M2DLYFL is set at "0".

Figure 32:
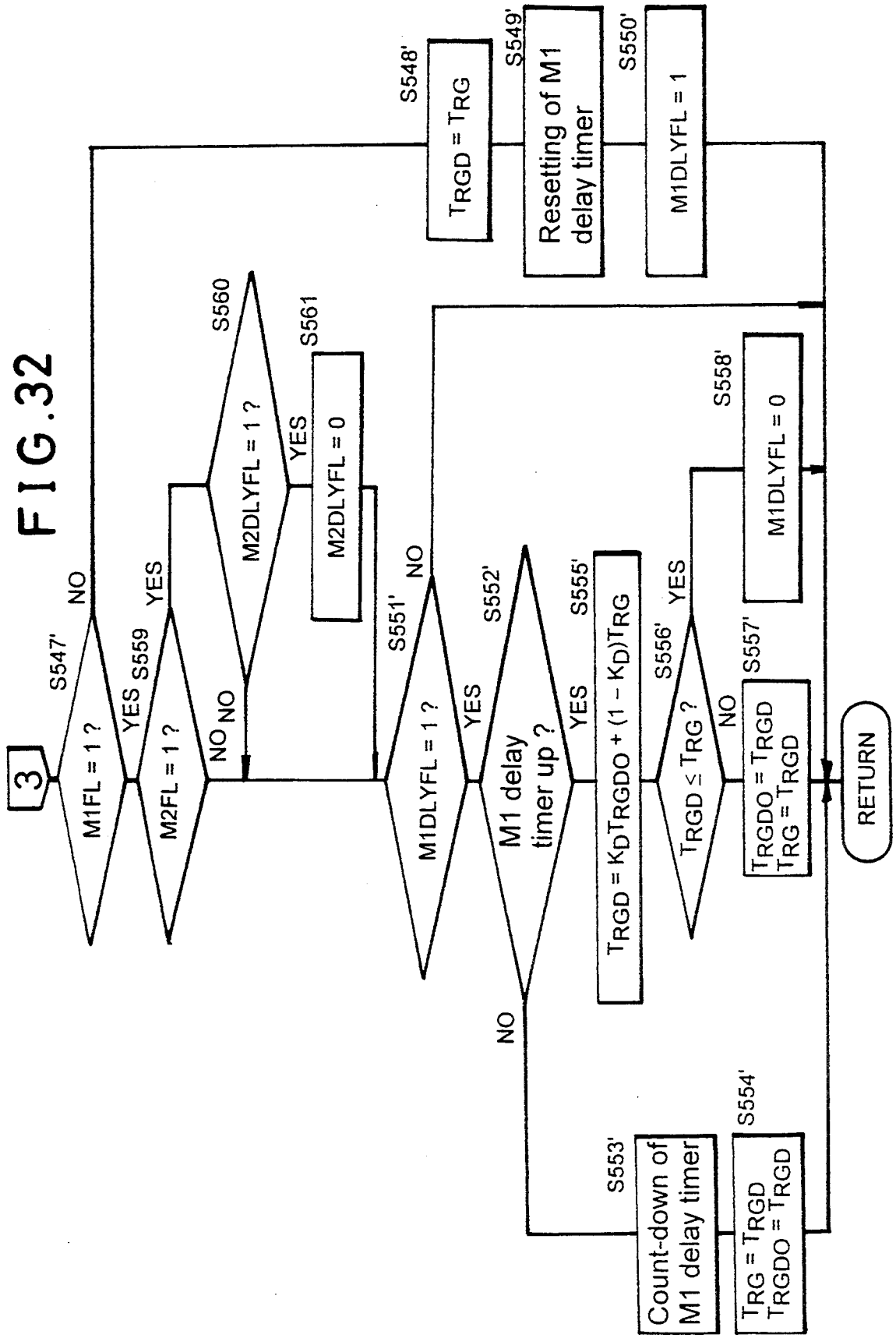

A first-order lag control of the regenerative braking force, when the mode-2 is selected, is illustrated in a flow chart shown in FIG. 32.

This flow chart has substantially the same control content, except that the mode-2 flag M2FL, the mode-2 delay flag M2DLYFL and the mode-2 delay timer M2DLYTM in the flow chart shown in FIG. 31 are changed to a mode-1 flag M1FL, a mode-1 delay flag M1DLYFL and a mode-1 delay timer M1DLYTM, respectively, wherein numbers S547' to S558' are affixed to steps corresponding to the steps S547 to S558 shown in FIG. 31 to omit the duplicate description.

However, when the mode-1 has been entered during delaying or during filtering in the mode-2, the delaying and the filtering in the mode-2 are discontinued and switched over to a delaying and a filtering in the mode-1. Therefore, a difference is that when the mode-1 flag M1FL has been determined to be set at "1" at the step S547', the mode-2 delay flag M2DLYFL is set at "0" at a step S561, if the mode-2 flag M2FL has been determined to be set at "1" and the mode-2 delay flag M2DLYFL has been determined to be set at "1" at steps S559 and S560, respectively.

Figure 33:
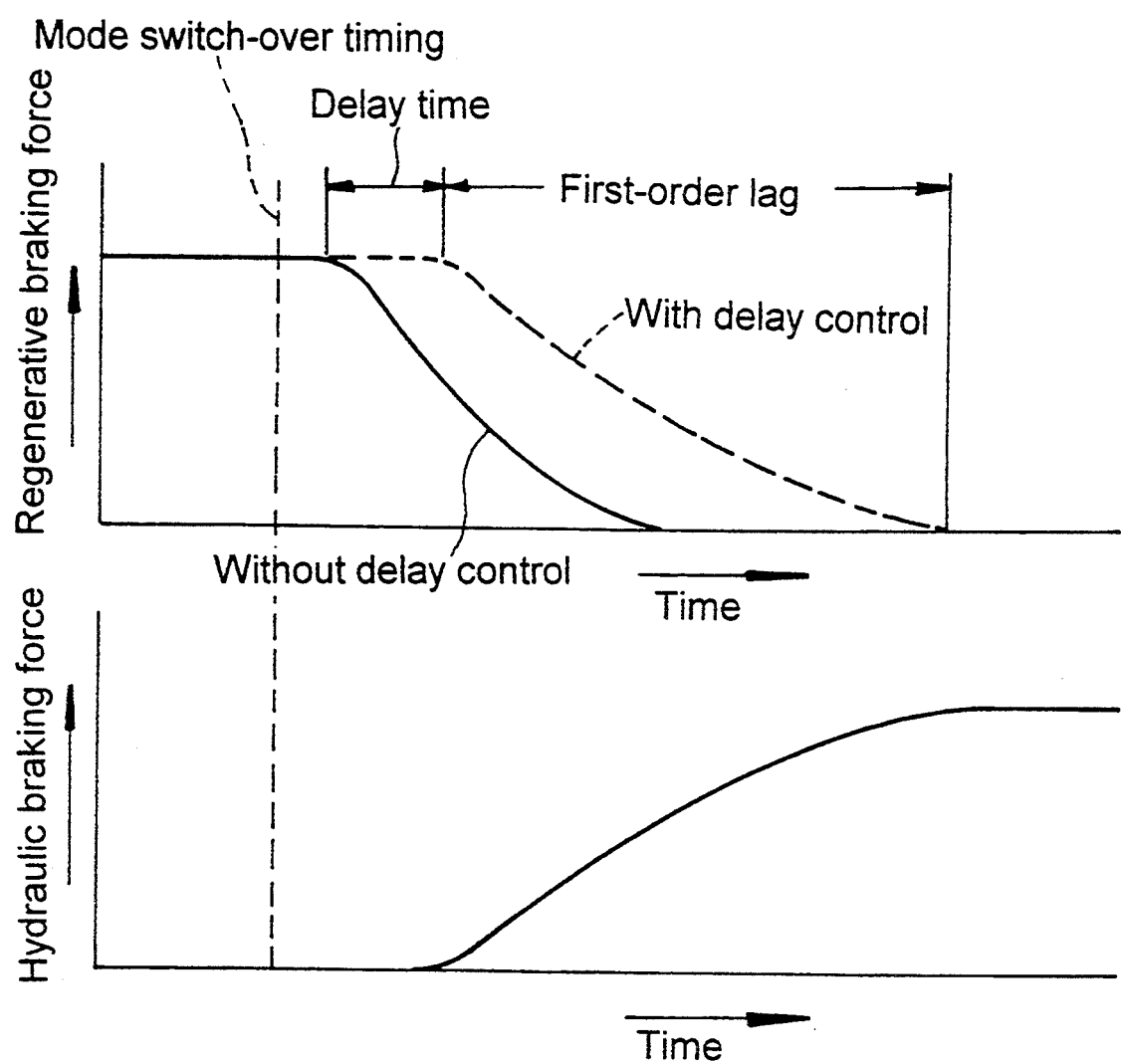

As is apparent from FIG. 33, even if there is a delay in the increase of the hydraulic braking force when the regenerative braking is switched over to the hydraulic braking, the start of the decreasing of the regenerative braking force is delayed by a delay time, and the speed of decreasing thereof is delayed by a first-order lag control. Therefore, it is possible to smoothly perform the switching-over of the regenerative braking to the hydraulic braking, with the sum total of the regenerative braking force and the hydraulic braking force remaining maintained constant.

It should be noted that the delay control of the hydraulic braking force (see FIG. 28) and the delay control of the regenerative braking force (see FIG. 33) are selected properly in accordance with the characteristics of the braking system and can be used in combination.

The specified content of a brake pedal depression force 0 correcting routine carried out during non-braking in the step S500 in the flow chart shown in FIG. 6 will be described in connection with a flow chart shown in FIG. 36.

First, at a step S581, an output value P 2 detected this time by the brake pedal depression force sensor $24_1$ is added to an addition value SUM to calculate a current addition value SUM, and until N reaches a predetermined number $N_0$ at a step S582, the addition of the output value $P_2$ is repeated at a step S583, while increasing the N. If the N has reached the predetermined number $N_0$ at the step S582, an average deviation $P_{20}$ is calculated by dividing the current addition value SUM by the predetermined number $N_0$ at a step S584. Then, the N is reset at 1, and the SUM is reset at zero.

If the average deviation $P_{20}$ of the outputs from the brake pedal depression force sensor $24_1$ during non-operation of the brake pedal 8 has been determined, an input hydraulic pressure $P_{IN}$ into the differential pressure regulating valve $16f$, $16r$ is calculated by subtracting such average deviation $P_{20}$ from the output value $P_2$ from the brake pedal depression force sensor $24_1$ at a step S502 shown in FIG. 17.

Figure 37:
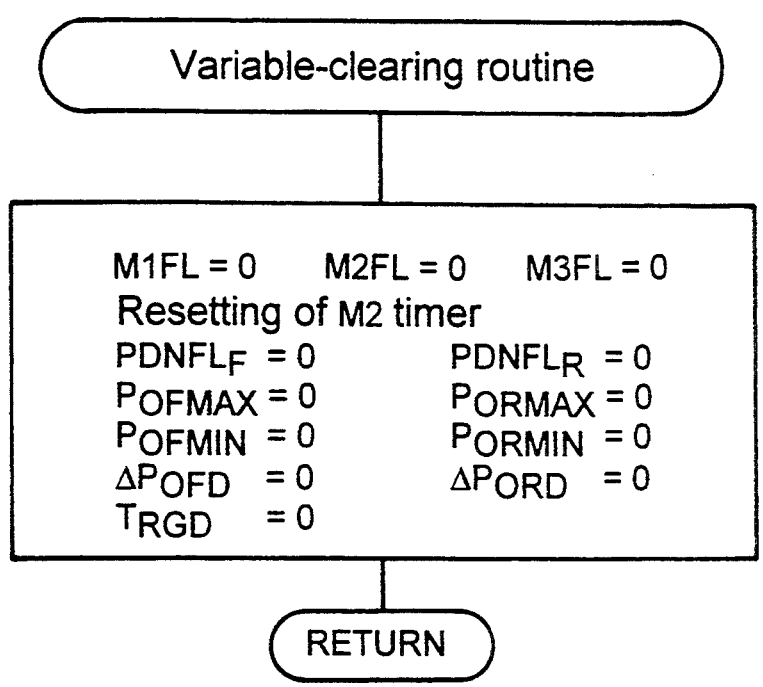

The specified content of a variable-clearing routine in the step S500 in the flow chart shown in FIG. 6 will be described below in connection with a flow chart shown in FIG. 37.

In this routine, the mode-1 flag M1FL, the mode-2 flag M2FL, the mode-3 flag M3FL, the M2 timer M2TM, the front pressure reduction flag $PDNFL_F$, the rear pressure reduction flag $PDNFL_R$, the front output hydraulic pressure maximum value $P_{OFMAX}$, the rear output hydraulic pressure maximum value $P_{ORMAX}$, the front output hydraulic pressure minimum value $P_{OFMIN}$, the rear output hydraulic pressure minimum value $P_{ORMIN}$, the front value differential pressure $\Delta P_{OFD}$ maintained during the delay treatment, the rear value differential pressure $\Delta P_{ORD}$ maintained during the delay treatment and the value $T_{RGD}$ maintained during the delay treatment are set at zero when the brake is not being applied.

Figure 41:
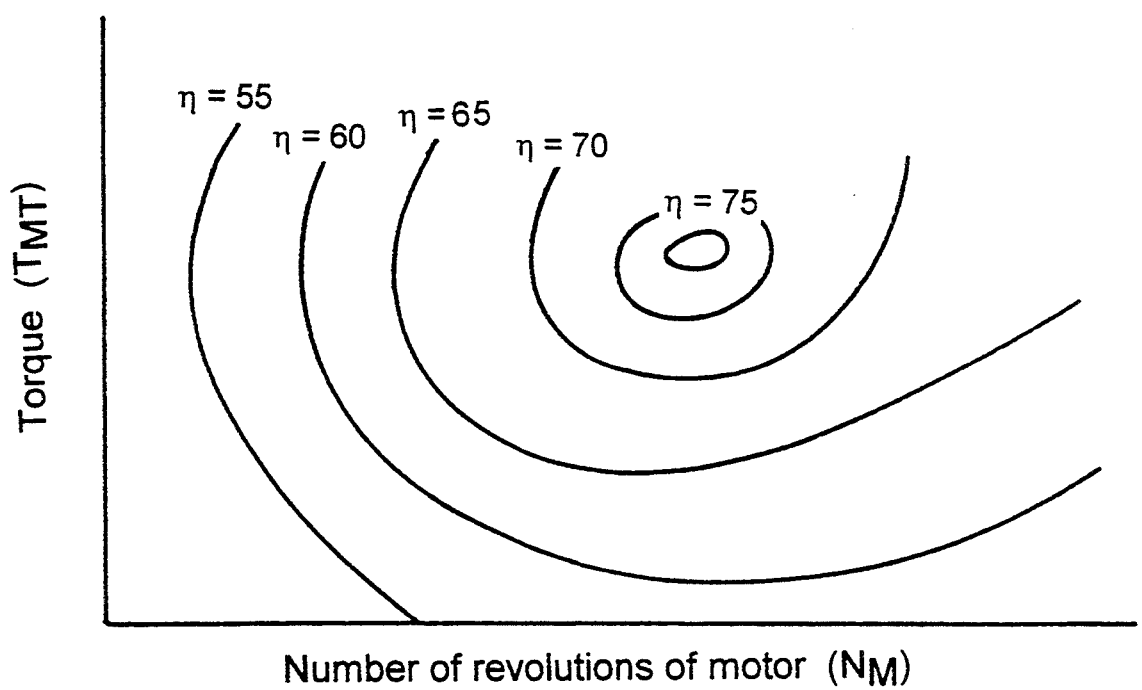
Figure 42:
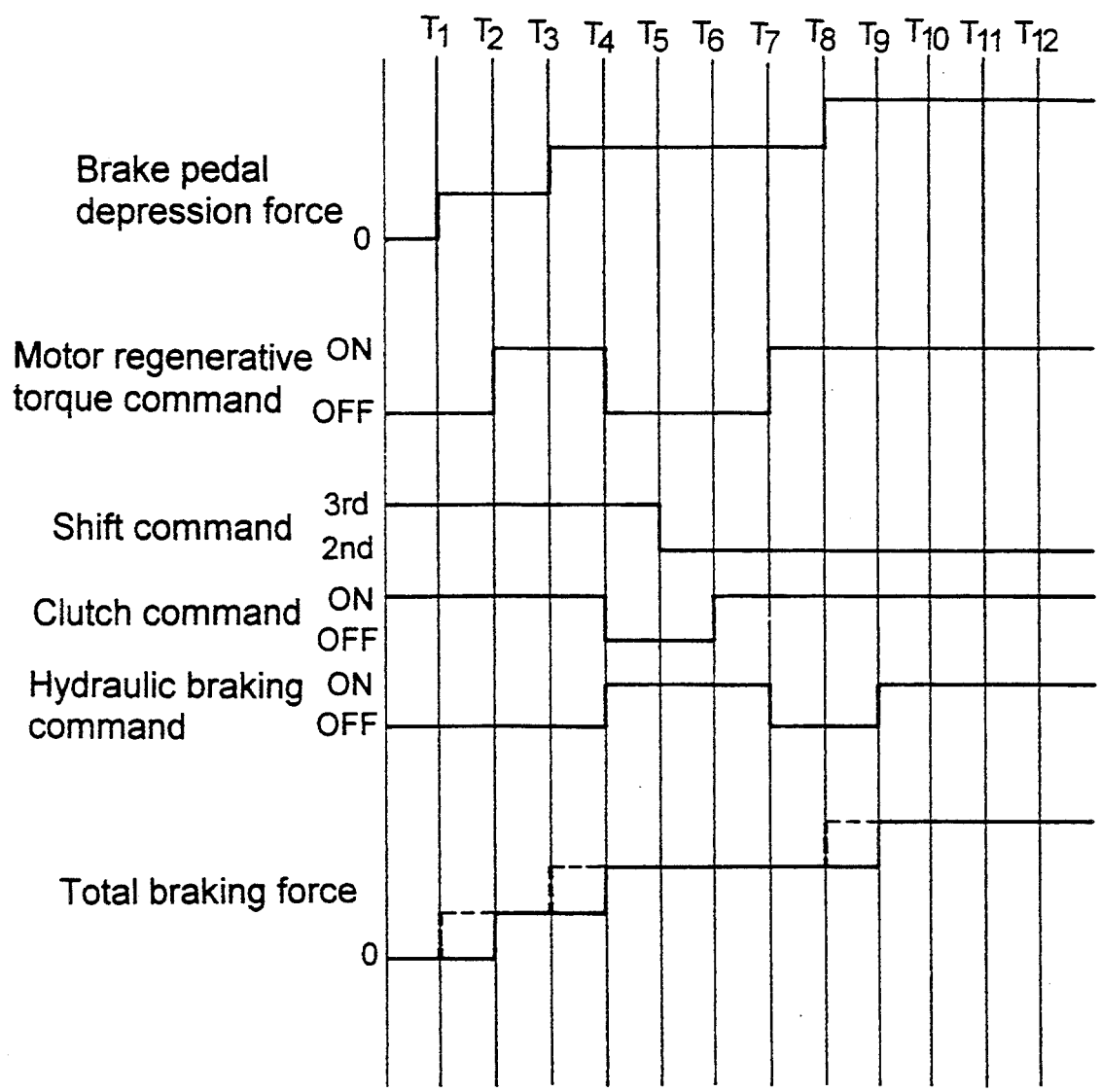

The specified content of a shift command routine in the step S600 in the flow chart shown in FIG. 6 will be described below in connection with flow charts shown in FIGS. 38 to 40 and graphs shown in FIGS. 41 and 42.

Figure 38:
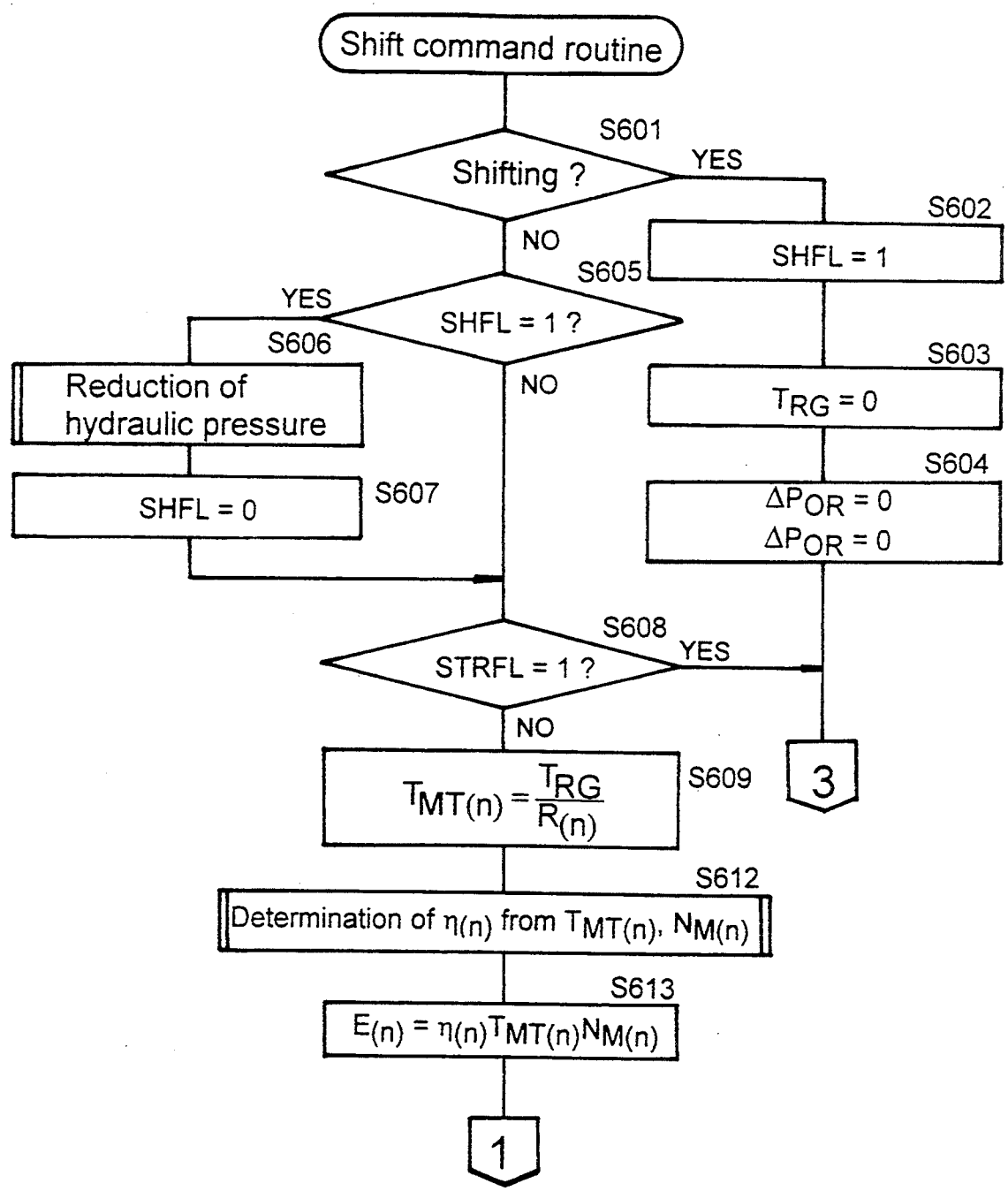
Figure 39:
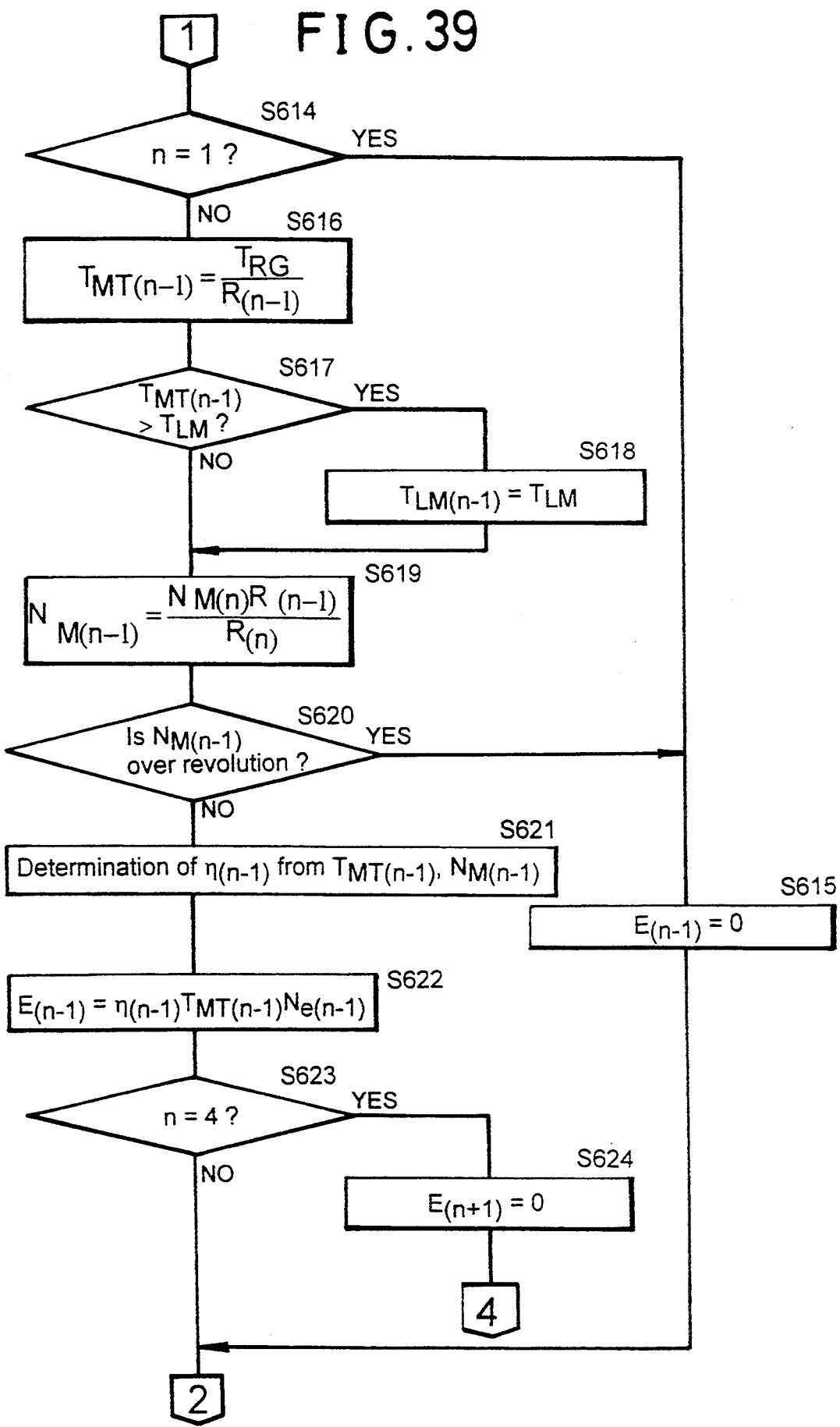
Figure 40:
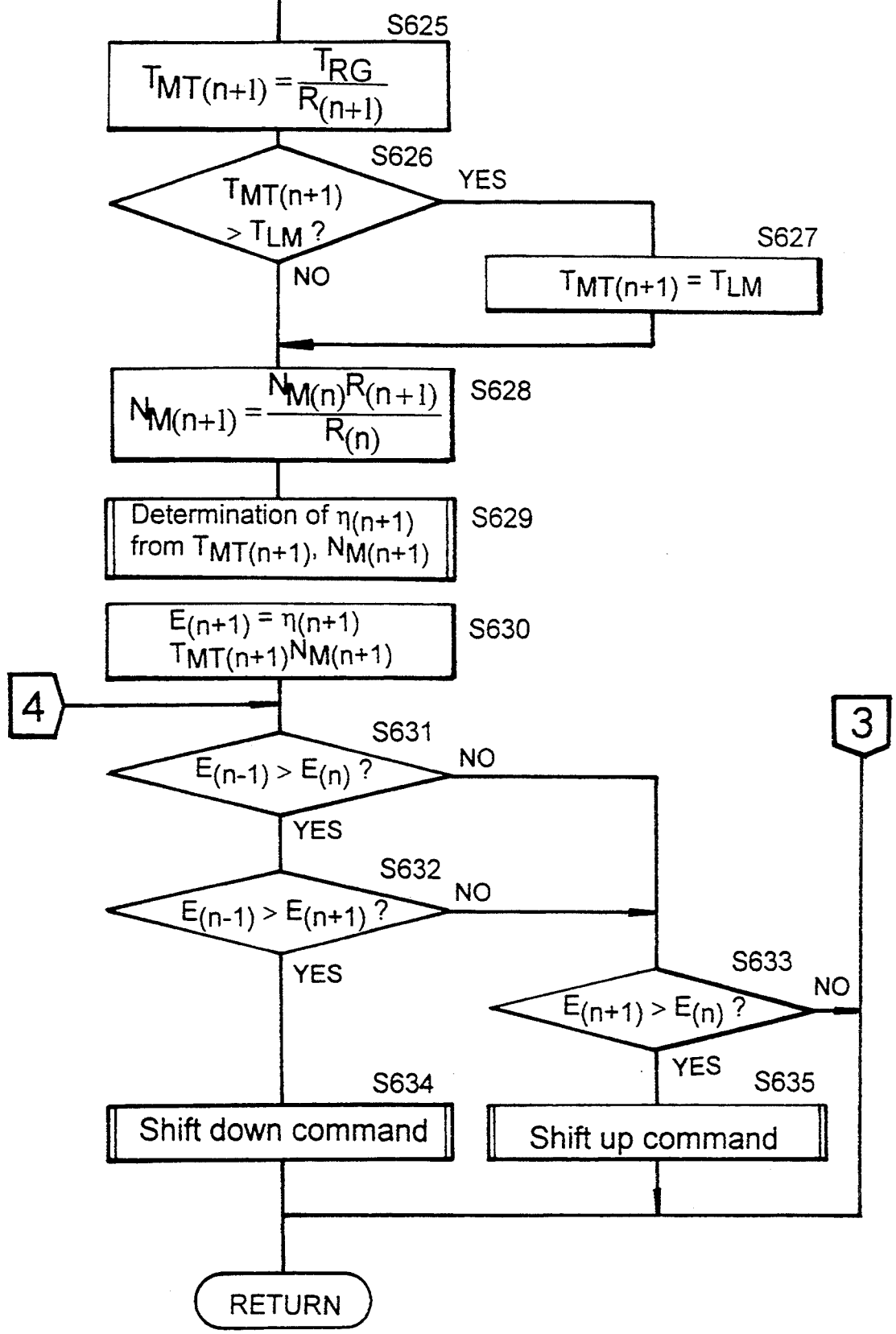

If the shifting is being conducted, as determined at a step S601 in the flow charts shown in FIGS. 38 to 40, a shift flag SHFL is set at "1" at a step S602. Then, at a step S603 the conversion regenerative braking force $T_{RG}$ corresponding to the axle torque is set at zero, and both the quantities $\Delta P_{OF}$ and $\Delta P_{OF}$ of operation of the front-side and rear-side differential pressure regulating valves are set at zero. Thus, during shifting, the front and rear wheels Wf and Wr are braked by a usual hydraulic pressure without the regenerative braking.

If the shift flag SHFL is set at "1" at a step S605, notwithstanding that the shifting is not being conducted at the step, it is judged that the shifting has been completed. At a next step S606, the hydraulic braking of the front and rear wheels Wf and Wr is released, and at a step S607, the shift flag SHFL is set at "0".

If the shifting is being conducted and a steering flag STRFL has been set determined to be at "1" at a step S608, a shift command which will be described hereinafter is not conducted.

At subsequent steps S609 to S613, a presumed regenerative electric power $E_{(n)}$ in the current shift position n is calculated. More specifically, at the step S609, a motor torque $T_{MT(n)}$ at an n-shift is calculated by dividing the conversion regenerative braking force $T_{RG}$ by a gear ratio $R_{(n)}$. Then, at the step S612, a motor efficiency $^n(n)$ is determined from the motor torque $T_{MT(n)}$ and the number $N_M$ of revolutions of the motor 2 on the basis of the graph shown in FIG. 21, and at a next step S613, a presumed regenerative electric power at such shift position $^n(n)$ is calculated by multiplying the motor efficiency $^n(n)$ by the motor torque $T_{MT(n)}$ and the number $N_M$ of revolutions of the motor 2.

Then, at steps S614 to S622 in FIG. 39, a presumed regenerative electric power $E_{(n-1)}$ upon downshifting from the current shift position is calculated. More specifically, if the current shift position is determined to be a 1-shift (the lowest gear ratio) at the step S614, the downshifting is impossible and for this reason, the presumed regenerative electric power at the time when the downshifting has been conducted is set at zero. On the other hand, if the current shift position n is any of 2-, 3- and 4-shifts at the step S614, a presume regenerative electric power at the time when the downshifting to an $n_1$ shift has been conducted is likewise calculated at steps S616 to S622. In this case, if a motor torque $T_{MT(n1)}$ is more than a limit value of the regenerative braking force $T_{LM}$ at the step S617, such limit value of the regenerative braking force $T_{LM}$ is equalized to the motor torque $T_{MT(n-1)}$ at the step S618. In downshifting, the number $N_{M(n-1)}$ of revolutions of the motor 2 upon downshifting is calculated from gear ratios $R_{(n)}$ and $R_{(n-1)}$ and the revolution number $N_{M(n)}$ at the n-shift at the step S619. As a result, if the revolution number $N_{M(n-1)}$ is an over-revolution at the step S620, the presumed regenerative electric power $E_{(N-1)}$ is set at zero at the step S615.

Then, at steps S623 to 630, a presumed regenerative electric power $E_{(n+1)}$ upon upshifting from the current shift position is calculated. More specifically, if the current shift position is determined to be a 4-shift (highest gear ratio) at the step S623, the upshifting is impossible and for this reason, the presumed regenerative electric power $E_{(n+1)}$ upon upshifting is set at zero at the step S624. At the subsequent steps S625 to 630 shown in FIG. 40, a presumed regenerative electric power $E_{(n+1)}$ upon upshifting is calculated in the same manner. In this case, if a motor torque $T_{MT(n+1)}$ is more than a limit value of the regenerative braking force $T_{LM}$ at the step S627, such limit value of the regenerative braking force $T_{LM}$ is equalized to the motor torque $T_{MT(n+1)}$ at the step S627. It should be noted that an over revolution cannot be generated in the upshifting and hence, the judgment of over-revolution conducted in the downshifting is not conducted.

At steps S631 to S633, the currently presumed regenerative electric power $E_{(n)}$, the presumed regenerative electric power $E_{(n-1)}$ upon downshifting and the presumed regenerative electric power $E_{(n+1)}$ upon upshifting are compared with one another. If the $E_{(n-1)}$ is largest, a downshifting command is issued at a step S634. On the other hand, if the $E_{(n+1)}$ is largest, an upshifting command is issued at a step S635.

The above-described shifting operation will be described in connection with a time chart shown in FIG. 42. For example, suppose that the brake pedal 8 is operated so that the depression force on the brake pedal 8 is gradually increased at time points $T_1$, $T_3$ and $T_8$, and a regenerative braking command is issued at a time point $T_2$. In this case, if it has been decided that the shift position is downshifted, for example, from the 3-shift to the 2-shift to maximize the regenerative energy, the clutch is disengaged at a time point $T_4$.

If the clutch has been disengaged, the rear wheels Wr and the motor 2 are disconnected from each other, so that the regenerative braking is impossible. Therefore, the regenerative torque command of the motor 2 is canceled for a period from the time point $T_4$ to a time point $T_7$. For a period in which the regenerative braking is not conducted, i.e., for the period from the time point $T_4$ to the time point $T_7$, a hydraulic braking command is issued, whereby the hydraulic braking is substituted for the regenerative braking. At a time point $T_5$ in a clunch disengaged period from the time point $T_4$ to a time point $T_6$, a shifting command is issued, whereby the downshifting from the 3-shift to the 2-shift is carried out.

In the above manner, a total braking force is insured by the regenerative braking for a period from the time point $T_2$ to the time point $T_4$, by the hydraulic braking for the period from the time point $T_4$ to the time point $T_7$, by the regenerative braking for a period from the time point $T_7$ to a time point $T_9$, and by a combination of the regenerative braking and the hydraulic braking for a period after the time point $T_9$.

Figure 44:
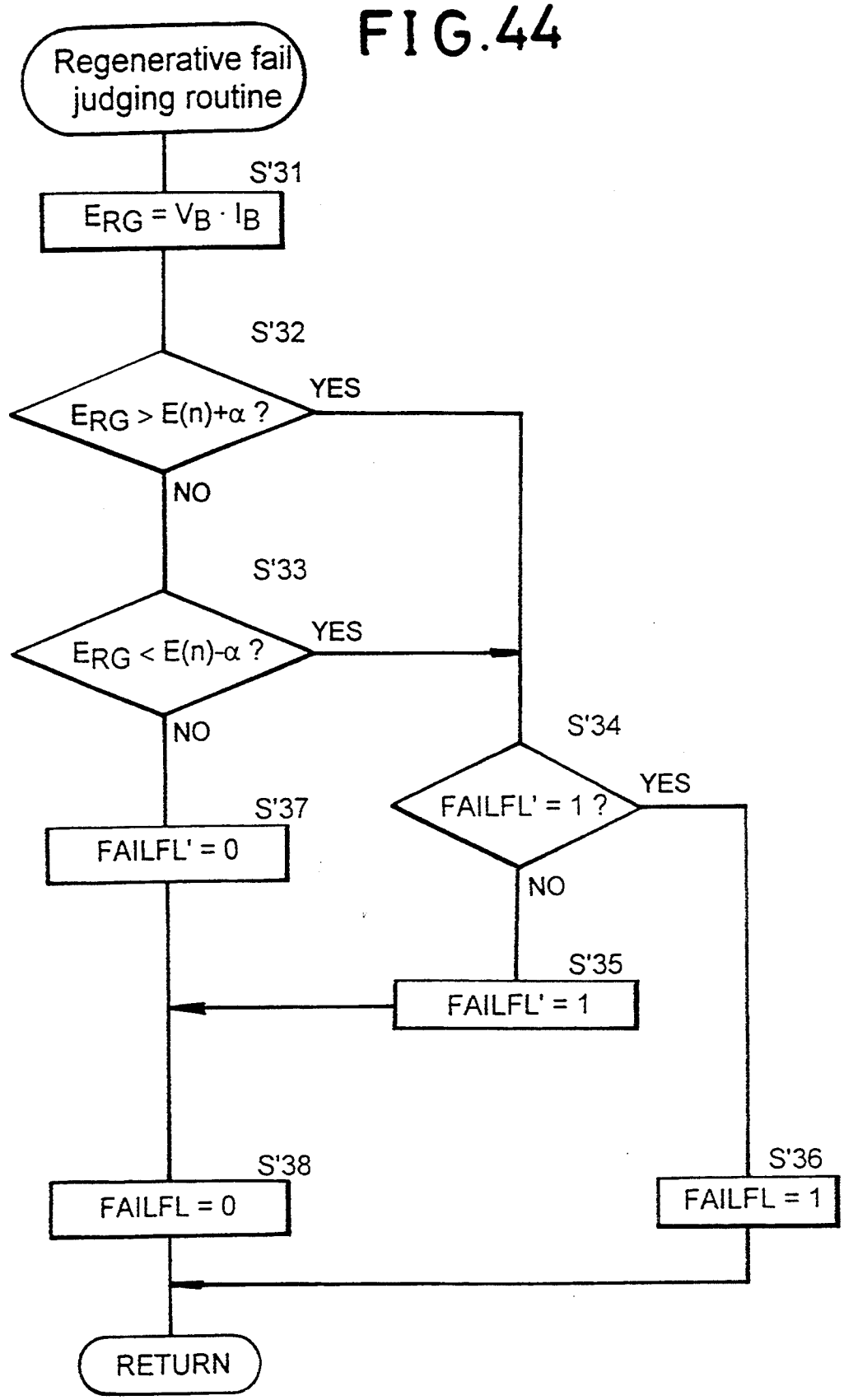
Figure 45:
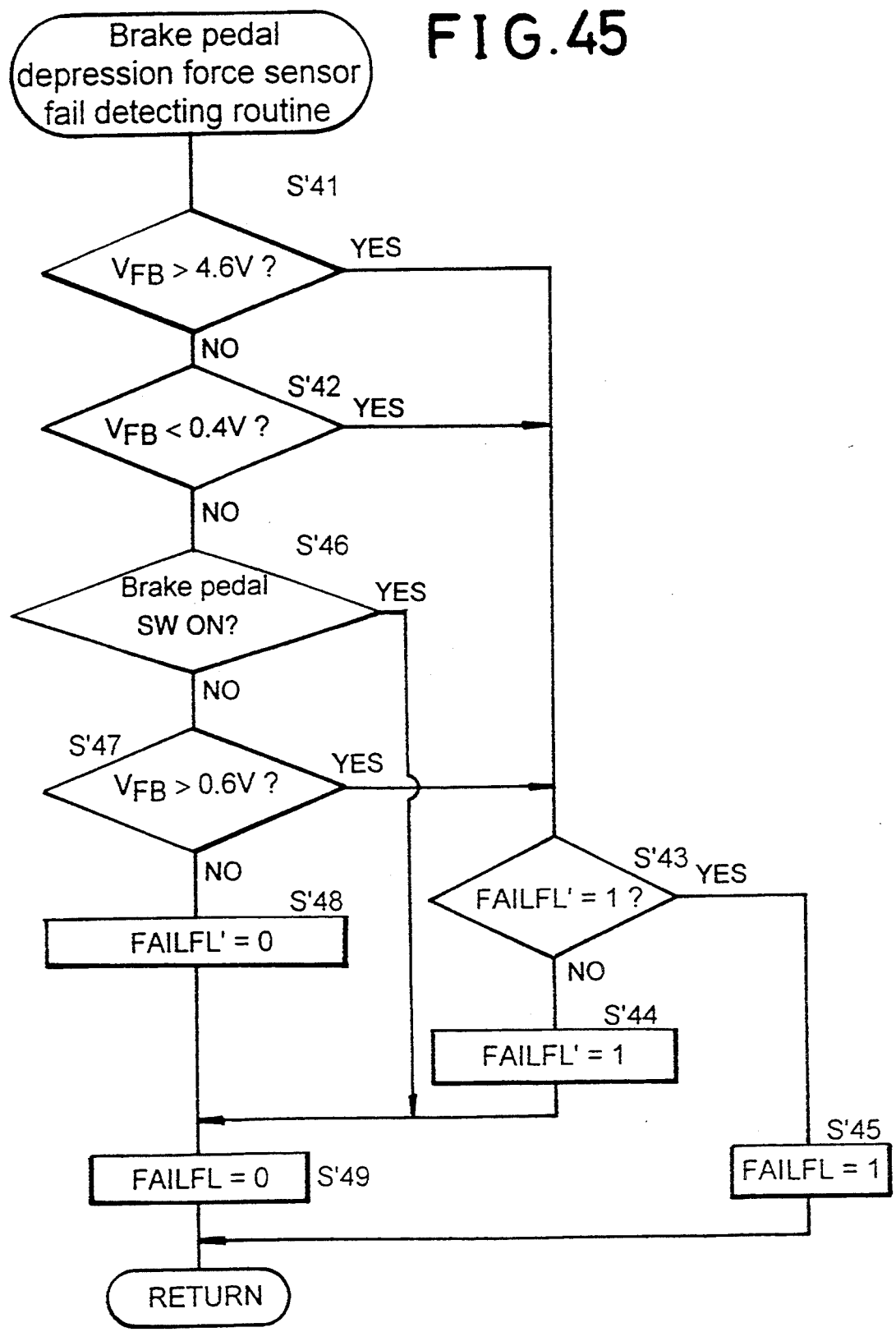
Figure 46:
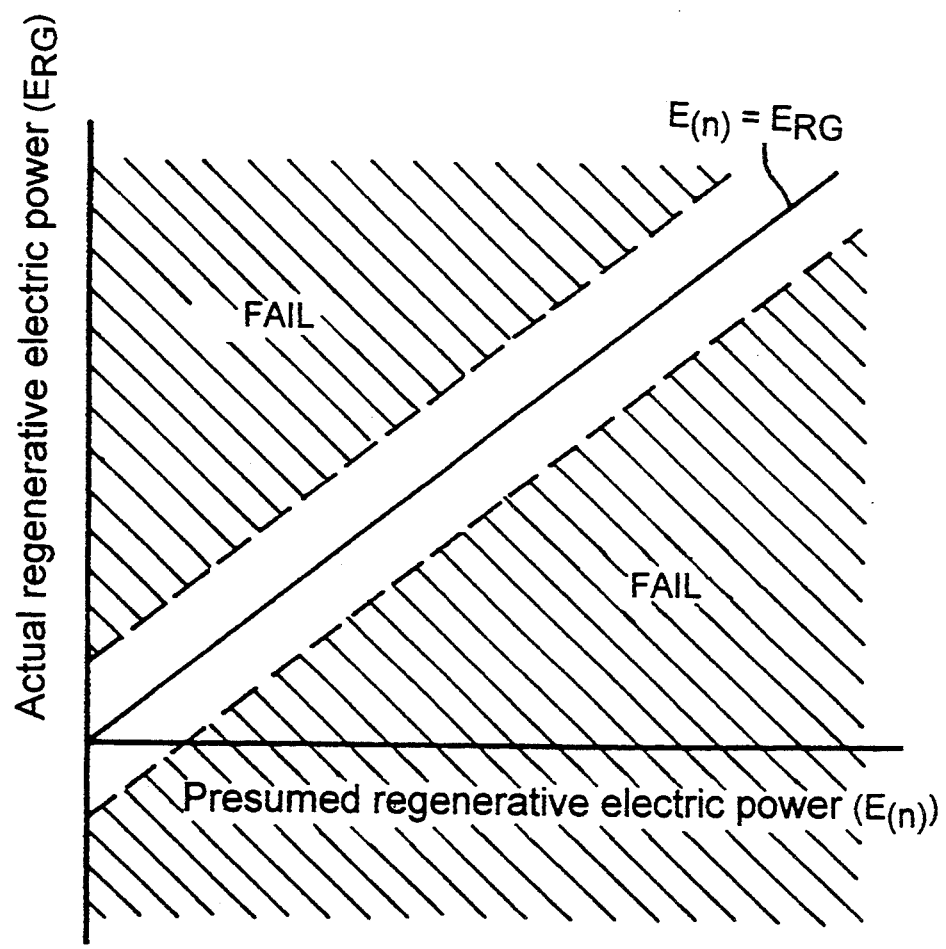
Figure 47:
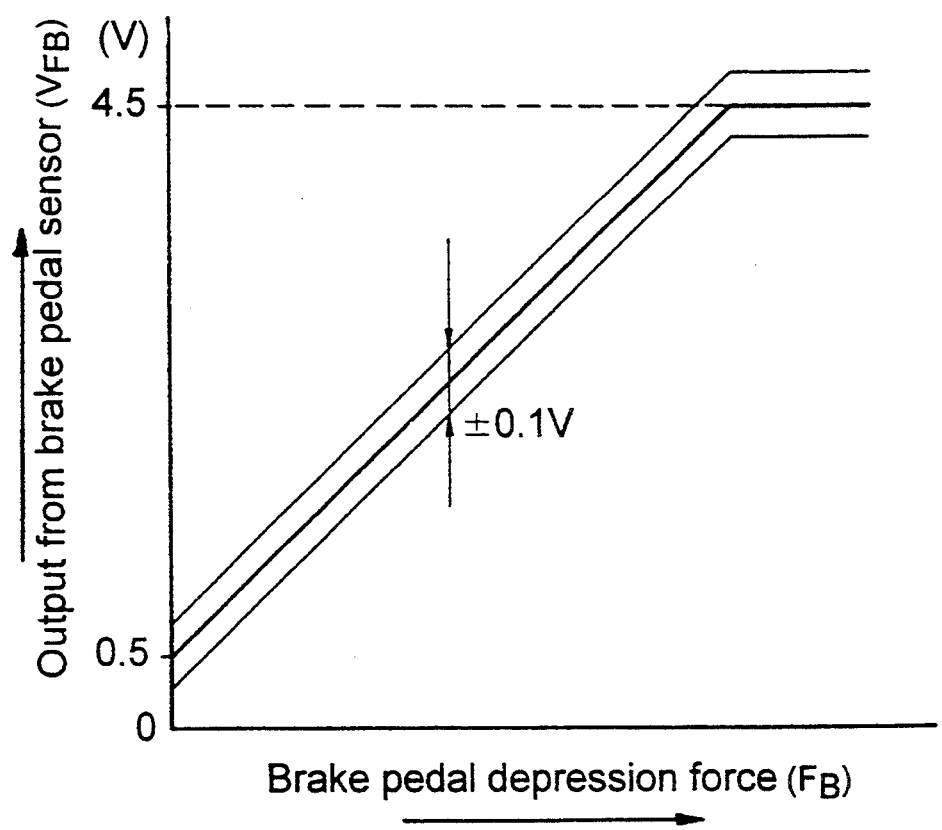

The specified content of a fail judging routine in the step S700 shown in FIG. 6 will be described below in connection with flow charts shown in FIGS. 43 to 45 and graphs shown in FIGS. 46 to 47.

Figure 43:
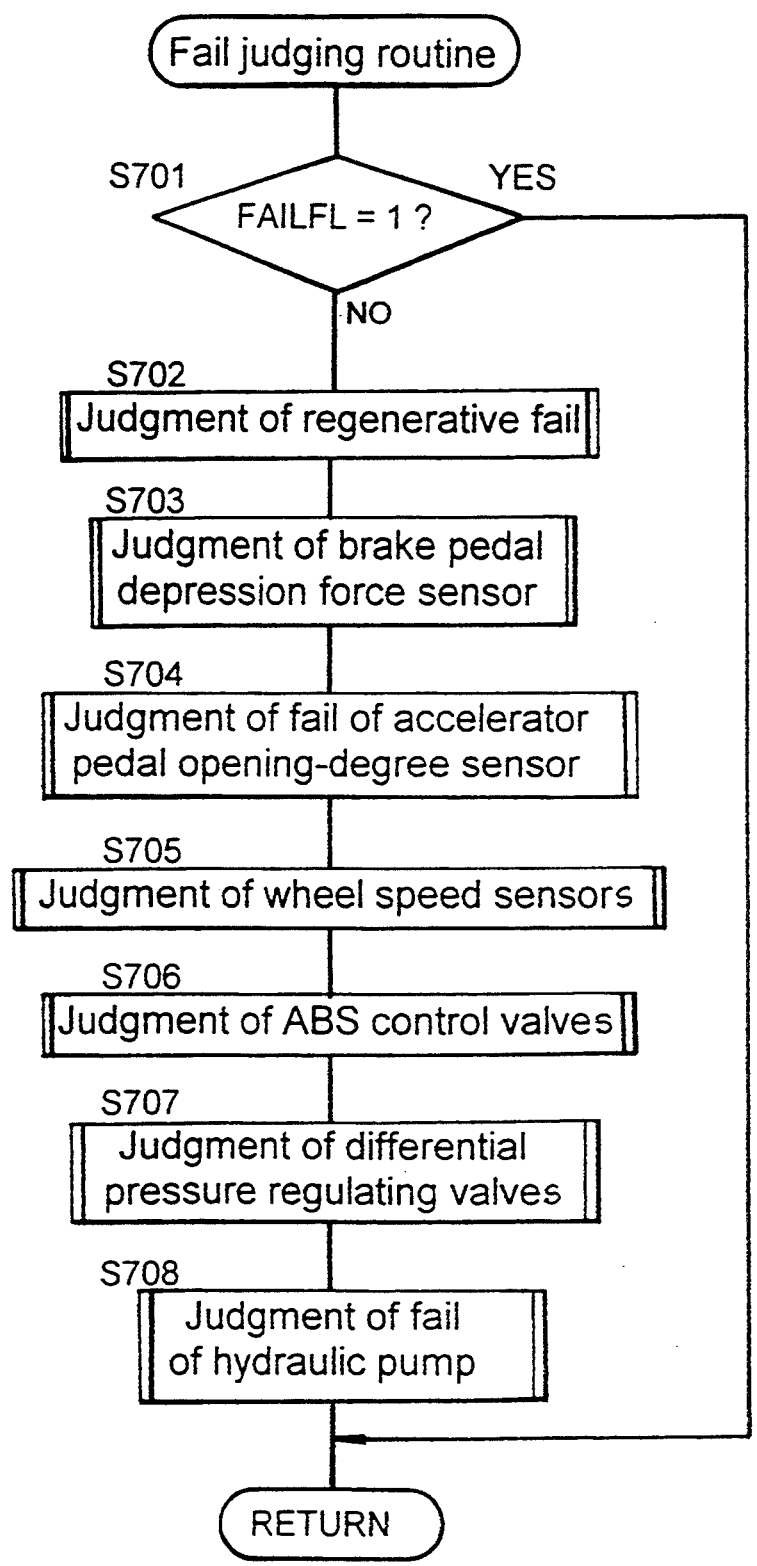

If any trouble has not arisen and the fail flag FAILFL (see the step S501 shown in FIG. 17) is not set at "1" at a step S701 in the flow chart shown in FIG. 43, the fail of the regenerative braking system, the fail of the brake pedal depression force sensor $24_1$, the fail of the accelerator pedal opening degree sensor 25, the fail of each of the wheel speed sensors $23_{FL}$, $23_{FR}$, $23_{RL}$, and $23_{RR}$, the fail of each of the ABS control valves $14f$ and $14r$, the fail of each of the differential pressure regulating valves $16f$ and $16r$ and the fail of the hydraulic pump 10 are judged successively.

A sub-routine of the step S702 (judgment of regenerative fail) shown in FIG. 43 will be described below in connection with the flow chart shown in FIG. 44.

First an actual regenerative electric power $E_{RG}$ generated by the motor is calculated at a step S'31 by multiplying an output signal $V_B$ from the battery voltage sensor $20_2$ and an output signal $1_B$ from the battery current sensor $20_1$. At subsequent steps S'32 and S'33, it is judged whether or not the actual regenerative electric power ERG is between two values resulting from the addition and subtraction of the predetermined value $\alpha$ to and from the presumed regenerative electric power $E_{(n)}$ calculated at the step S613 shown in FIG. 38, namely, between $E_{(n)} + \alpha$ and $E_{(n)} - \alpha$. That is, if the actual regenerative electric power $E_{RG}$ and the presumed regenerative electric power $E_{(n)}$ are in obliquely lined regions in FIG. 46, it is decided that there is an abnormality in the regenerative braking system.

When the judgment of the abnormality has been initially conducted and a temporary fail flag FAILFL' is not set at "1" at a step S'34, the temporary fail flag FAILFL' is set at "1" at a step S'35. If it is decided again in a next loop that there is an abnormality, i.e., when the temporary fail flag FAILFL' has been determined to be set at "1" at the step S'34, the fail flag FAILFL is finally set at "1" at a step S'36. If it has been decided at the steps S'32 and S'33 that the regenerative braking system is normal, the temporary fail flag FAILFL' and the fail flag FAILFL are set at "0" at steps S'37 and S'38, respectively. In addition, if the temporary fail flag FAILFL' has been set at "1" at the step S'35, the fail flag FAILFL is set at "0" at the step S'38.

If the presumed regenerative electric power $E_{(n)}$ and the actual regenerative electric power $E_{RG}$ are compared with each other and as a result, the actual regenerative electric power $E_{RG}$ is too large, exceeding a predetermined value, or too small, thereby deciding that there is an abnormality, the temporary fail flag FAILFL' is displayed. If such abnormality is continuously detected even in a next loop, the fail flag FAILFL is displayed. This enables the fail of the regenerative braking system to be judged reliably without reception of an influence such as obstacle of electric wave.

A sub-routine of the step S703 (judgment of the fail of the brake pedal depression force sensor) shown in FIG. 43 will be described below in connection with a flow chart shown in FIG. 45.

First, it is judged whether or not an output signal from the brake pedal depression force sensor 241 is between 0.4 v and 4.6 V. As shown in a graph in FIG. 47, the output $V_{FB}$ from the brake pedal depression force sensor $24_1$ is set so that it is increased linearly from 0.5 V to 4.5 V with an increase in depression force FB and thereafter maintained at a given value 4.5 V. An acceptable range of the error in output from the brake pedal depression force sensor $24_1$ is from $+0.1$ V to $-0.1$ v and hence, if the brake pedal depression force sensor $24_1$ is normal, the above-described output $V_{FB}$ must be between the minimum value 0.4 V and the maximum value 4.6 V. However, if the output $V_{FB}$ is not in a range of from 0.4 V to 4.6 V, it is decided that there is an abnormality in the brake pedal depression force sensor $24_1$.

When the judgment of the abnormality has been initially conducted and the temporary fail flag FAILFL' is determined to be not set at "1" at a step S'43, the temporary fail flag FAILFL' is set at "1" at a step S'44. If it is decided again in a next loop that there is an abnormality in the brake pedal depression force sensor $24_1$, i.e., when the temporary fail flag FAILFL' has been determined to be set at "1" at the step S'43, the fail flag FAILFL is finally set at "1" at a step S'45.

If the output $V_{FB}$ from the brake pedal depression force sensor $24_1$ exceeds 0.6 V at a step S'47, notwithstanding that the brake pedal switch is determined to be not turned ON at the step S'46, i.e., that the brake pedal 8 is not operated, it is decided that there is an abnormality in the brake pedal depression force sensor 241, and the processing is passed to the step S'43

If it has been decided at the steps S'41, S'42, S'46 and S'47 that there is no abnormality in the brake pedal depression force sensor $24_1$, the temporary fail flag FAILFL' and the fail flag FAILFL are set at "0" at steps S'48 and S'49, respectively. In addition, if the brake pedal switch has been determined to be turned ON at the step S'46 and if the temporary fail flag FAILFL' has been set at "1" at the step S'44, the fail flag FAILFL is set at "0" at the step S'49.

As described above, it is decided that there is an abnormality when the output $V_{FB}$ from the brake pedal depression force sensor $24_1$ reads an impossible value (which is equal to or less than 0.4 V and equal to or more than 4.6 V) upon operation of the brake pedal 8, and if the output $V_{FB}$ reads an impossible value (which is equal to or more than 0.6 V) when the brake pedal 8 is not operated. Therefore, it is possible to reliably detect not only an abnormality of the output from the brake pedal depression force sensor $24_1$ but also trouble due to the sticking of the brake pedal depression force sensor $24_1$. Moreover, a final judgment of abnormality is drawn using the temporary fail flag FAILFL', when the above-described abnormality has been continuously detected, and therefore, it is possible to reliably judge the fail of the brake pedal depression force sensor $24_1$ without reception of an influence such as obstacle of electric wave.

Figure 6:
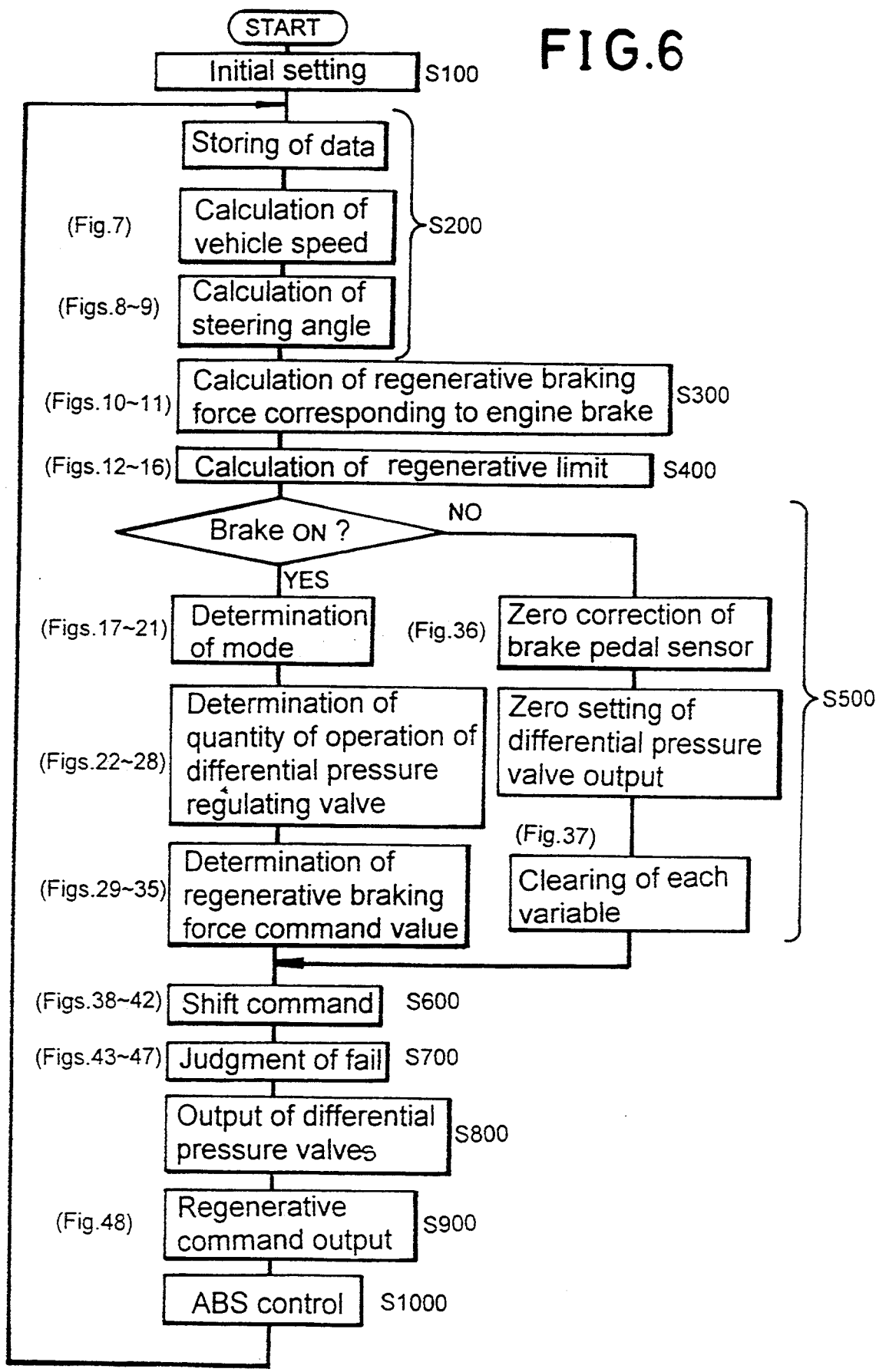
Figure 7:
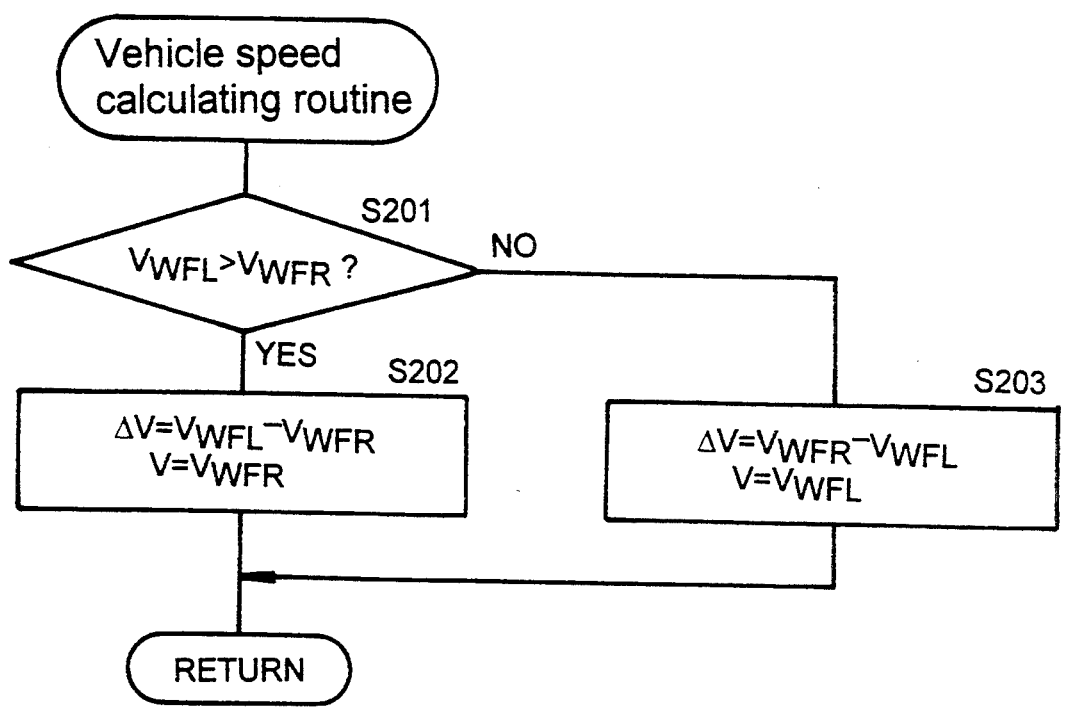

At the step S800 shown in FIG. 6, the quantities $\Delta F_{OF}$ and $\Delta F_{OR}$ of operation of the differential pressure regulating valves determined at the steps S523 to S525 shown in FIG. 22 are delivered. At a step S901 in a regenerative command output routine shown in FIG. 48 which is a sub-routine of the step S900, a final regenerative torque command value $T_{RGT}$ is calculated in the form of the sum of the regenerative output command value $T_{RG}$ and the engine brake-corresponding regenerative braking force $T_{RGE}$, and at a step S902, such regenerative torque command value $T_{RGT}$ is delivered. Thus, the regenerative braking force and the hydraulic braking force are exhibited in a predetermined ratio as shown in FIGS. 4A, 4B and 4C in each of the mode-3, the mode-2 and the mode-1.

FIG. 49 illustrates a second embodiment of a differential pressure regulating valve 16f (16r).

As shown in FIG. 49A, the differential pressure regulating valve 16f of this embodiment is comprised of a spool 29f having a movable seat on which a valve member 18f is seated. The spool 29f is biased toward the valve member 18f by a spring 30f. If the spool 29f is moved rightwardly, an output port is put into communication with a reservoir 32 in the master cylinder 9.

As can be seen from reference to FIGS. 49A and 49B, in a condition in which a linear solenoid 19f has been energized to apply a biasing force fs1 to the valve member 18f, no output hydraulic pressure $P_{OUT}$ is generated, until the input hydraulic pressure $P_{IN}$ applied in an input port is increased from an O point to an A point. If the valve member 18f is moved away from the spool 29f at the A point, the output hydraulic pressure $P_{OUT}$ is increased toward a B point with a relation represented by the following equation:

$$P_{OUT}=P_{IN}-fs_1/b \quad (13)$$

wherein b is a sectional area of the spool 29f in its inside diameter.

Then, if the depression force is reduced at the B point to decrease the input hydraulic pressure $P_{IN}$, the valve member 18f is closed, so that the output hydraulic pressure $P_{OUT}$ is maintained constant. When the input hydraulic pressure PIN is nondecreased to a C point, the spool 29f is moved rightwardly to put the output port into communication with the reservoir 32, so that the output hydraulic pressure $P_{OUT}$ is decreased to a D point while maintaining a relation represented by the following equation:

$$P_{OUT}=P_{IN}(fs_1-fs_2)/a \quad (14)$$

wherein fs2 is a biasing force of the spring 30f for biasing the spool 29f leftwardly, and a is a sectional area of the spool 29f in its outside diameter. After the output hydraulic pressure POUT becomes zero at the D point, it is maintained at zero, until the input hydraulic pressure PIN is decreased from the D point to the O point.

In this embodiment, the magnitude of a hysteresis H is represented by the following equation:

$$H=[(1/b)+(1/a)]\times fs_1+(fs_2/a) \quad (15)$$

As is apparent from FIGS. 5B and 49B, the hysteresis H in the second embodiment can be reduced to a substantially negligible extent, as compared with that in the first embodiment. Therefore, the sum total of the regenerative braking force and the hydraulic braking force can be proportioned to the depression force on the brake pedal 8 only by controlling the magnitude of the regenerative braking force as shown in FIG. 49C, i.e., only by conducting the same control, when the depression force on the brake pedal 8 is increased and decreased. This enables the regenerative braking force command value determining routine to be simplified substantially.

FIG. 50 illustrates a third embodiment of a differential pressure regulating valve 16f, 16r.

Figure 50A:
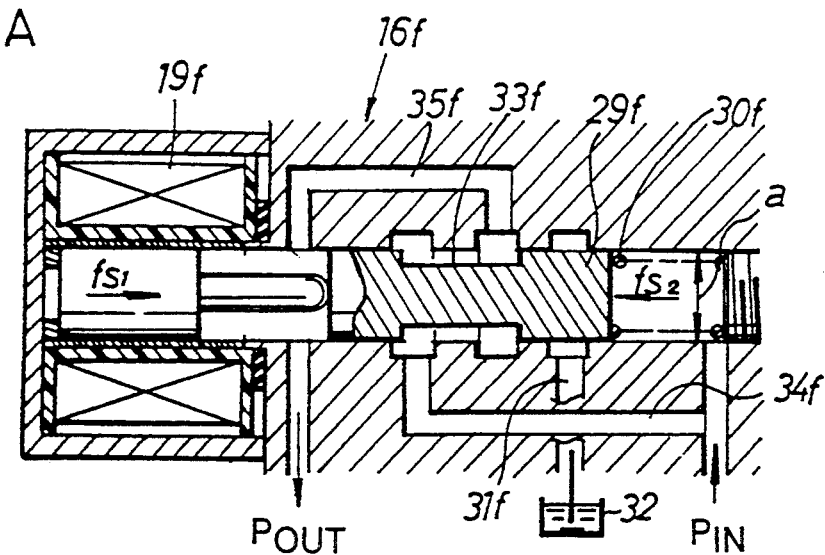
FIG. 50A is a sectional view illustrating the structure of a further embodiment of a differential pressure regulating valve and FIGS. 50B and 50C are graphs illustrating the characteristics thereof.

As shown in FIG. 50A, the differential pressure regulating valve 16f of this embodiment includes a spool 29f laterally slidably mounted therein and biased rightwardly by a linear solenoid 19f and biased leftwardly by a spring 30f. An oil passage 34f connected to an input port and an oil passage 35f connected to an output port are interconnected through a groove 33f centrally provided in the spool 29f. If the spool 29f is moved rightwardly, the output port is put into communication with the reservoir 32 in the master cylinder 9 through the oil passage 35f, the groove 33f and the oil passage 31f.

Figure 50B:
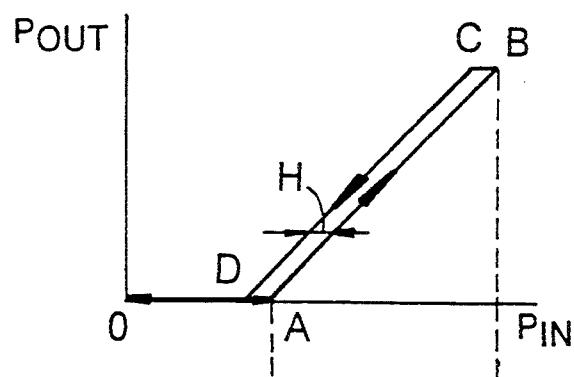

As apparent from reference to FIGS. 50A and 50B, in a condition in which a linear solenoid 19f has been energized to apply a biasing force fs1 to a valve member 18f, no output hydraulic pressure $P_{OUT}$ is generated until the input hydraulic pressure $P_{IN}$ applied in the input port is increased from an O point to an A point. When the spool 29f is moved leftwardly at the A point, the input and output ports are put into communication with each other through the groove 33f, so that the output hydraulic pressure $P_{OUT}$ is increased with a relation represented by a following equation:

$$P_{OUT}=P_{IN}-(fs_1-fs_2)/a \quad (16)$$

wherein a is a sectional area of the spool 29f.

When the depression force is then reduced at the B point to decrease the input hydraulic pressure $P_{IN}$, the spool 29f is moved rightwardly to block the communication of the output and input ports with each other, so that the output hydraulic pressure $P_{OUT}$ is maintained constant. When the input hydraulic pressure $P_{IN}$ is soon decreased to a C point, the output port is put into communication with the reservoir 32, so that the output hydraulic pressure $P_{OUT}$ is decreased to a D point while maintaining a relation represented by the following equation:

$$P_{OUT}=P_{IN}-(fs_1-fs_2')/a \quad (17)$$

wherein fs2, is a biasing force of the spring 30f after movement of the spool 29f. After the output hydraulic pressure $P_{OUT}$ becomes zero at the D point, it is maintained at zero, until the input hydraulic pressure $P_{IN}$ is decreased from the D point to the O point.

Figure 50C:
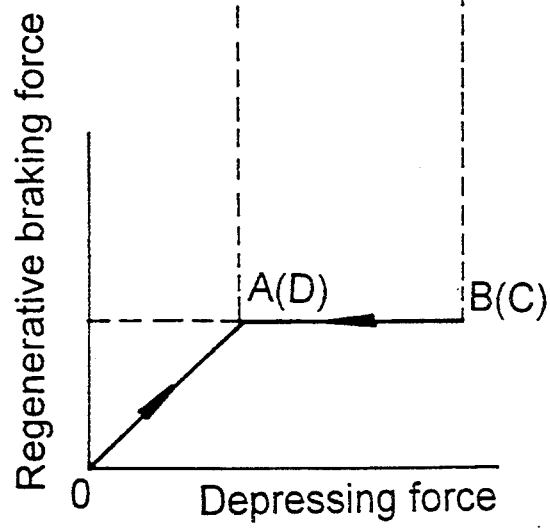

In this embodiment, the magnitude of a hysteresis H is represented by a following equation:

$$H=k\,\delta/a \quad (18)$$

wherein k is a spring constant of the spring 30f, and $\delta$ is an amount of spool 29f moved. According to the third embodiment, as apparent from FIG. 50B, the hysteresis H is further smaller than that in the second embodiment. Therefore, even in this case, it is possible to avoid the generation of an error in the sum total of the regenerative braking force and the hydraulic braking force, only by controlling the magnitude of the regenerative braking force as shown in FIG. 50C. This enables the regenerative braking force command value determining routine to be simplified substantially.

Although the embodiment of the present invention has been described in detail, it will be understood that the present invention is not limited thereto, and various modifications in design can be made without departing from the spirit and scope of the invention defined in claims.

For example, although the vehicle having the front wheels Wf as the non-driven wheels and the rear wheels Wr as the driven wheels has been illustrated and described in the embodiment, the present invention is applicable to a vehicle having front wheels Wf as driven wheels and rear wheels Wr as non-driven wheels.

What is claimed is:

1. A braking system for an electric vehicle having a driven wheel which is connected to and driven by a motor using a battery as an energy source, wherein the driven wheel is braked hydraulically and regeneratively on the basis of the operation of a brake operating element, and a differential pressure regulating valve is interposed between a master cylinder for generating a hydraulic braking pressure by the operation of the brake operating element and a brake cylinder for the driven wheel so as to reduce the hydraulic braking pressure from said master cylinder and transmit a reduced pressure to said brake cylinder, wherein said differential pressure regulating valve is formed to have such a characteristic that an output hydraulic pressure is maintained substantially at zero in a first region in which an input hydraulic pressure is equal to or lower than a predetermined value, and the output hydraulic pressure is lower than the input hydraulic pressure by substantially the predetermined value in a second region in which the input hydraulic pressure exceeds the predetermined value, and wherein, in said first region, a regenerative braking force is determined in proportion to a quantity of operation of the brake operating element, and in said second region, the regenerative braking force is maintained at a constant value irrespective of the quantity of operation of the brake operating element.

2. A braking system for an electric vehicle having a driven wheel which is connected to and driven by a motor using a battery as an energy source, wherein the driven wheel is braked hydraulically and regeneratively on the basis of the operation of a brake operating element, and a differential pressure regulating valve is interposed between a master cylinder for generating a hydraulic braking pressure by the operation of the brake operating element and a brake cylinder for the driven wheel so as to reduce the hydraulic braking pressure from said master cylinder and transmit a reduced pressure to said brake cylinder, wherein said differential pressure regulating valve is formed to have such a characteristic that when a quantity of operation of the brake operating element is increased, an output hydraulic pressure is maintained at zero in a first region in which an input hydraulic pressure is increased but at or below a first predetermined value, and the output hydraulic pressure is increased to the largest value in a second region in which the input hydraulic pressure is increased above said first predetermined value, and when the quantity of operation of the brake operating element is decreased, the output hydraulic pressure is maintained at a constant value in a third region in which the input hydraulic pressure is decreased but still at a level above a second predetermined value, and the output hydraulic pressure is decreased to zero in a fourth region in which the input hydraulic pressure is decreased lower than the second predetermined value, and wherein a regenerative braking force is increased in said first region in accordance with an increase in the quantity of operation of the brake operating element; the regenerative braking force is maintained at a constant value in the second region, irrespective of the quantity of operation of the brake operating element; the regenerative braking force is decreased in the third region in accordance with a decrease in the quantity of operation of the brake operating element; and the regenerative braking force is maintained at zero in the fourth region, irrespective of the quantity of operation of the brake operating element.

3. A braking system for an electric vehicle according to claims 1 or 2, wherein a magnitude of the regenerative braking force is determined on the basis of a difference between the input and output hydraulic pressures.

4. A braking system for an electric vehicle according to claims 1 or 2, wherein a magnitude of the output hydraulic pressure is determined from an operated state of said brake operating element and an operated state of said differential pressure regulating valve.

5. A braking system for an electric vehicle according to claims 1 or 2, wherein a magnitude of a differential pressure generated by said differential pressure regulating valve is determined in accordance with a limit of the regenerative braking force of the motor.

6. A braking system for an electric vehicle according to claim 5 wherein said differential pressure regulating valve is operated only when the brake operating element is operated.

7. A braking system for an electric vehicle according to claim 5, wherein the vehicle has a non-driven wheel which is provided with a brake cylinder connected through a differential regulating valve to the master cylinder, and wherein a regenerative-preferential mode in which a hydraulic braking of the non-driven wheel is started by the operation of the brake operating element after the regenerative braking force of the motor reaches said limit, and a normal mode in which the hydraulic braking of the non-driven wheel is started simultaneously with the operation of the brake operating element, are provided so as to be switchable from one mode to another mode, and a relationship between said limit of the regenerative braking force and said differential pressure is differentiated between the modes.

8. A braking system for an electric vehicle according to claim 7, wherein the vehicle has left and right non-driven wheels, wherein said regenerative-preferential mode is switched over to said normal mode during a steering operation.

9. A braking system for an electric vehicle having a driven wheel which is connected to and driven by a motor using a battery as an energy source, wherein the driven wheel is braked hydraulically and regeneratively on the basis of the operation of a brake operating element and an accelerator operating element, said braking system comprising means for determining a first regenerative braking force on the basis of an operated state of the brake operating element, means for determining a second regenerative braking force on the basis of an operated state of the accelerator operating element and the number of revolutions of said motor, and means for producing a regenerative braking force corresponding to a sum of said first and second regenerative braking forces to regeneratively brake the driven wheel.

10. A braking system for an electric vehicle according to claim 9, further including means for prohibiting the regenerative braking when said motor is brought into a driving state by the operation of said accelerator operating element.

11. A braking system for an electric vehicle according to claim 1, 2 or 9, further including a brake operation quantity detecting sensor for detecting the quantity of operation of said brake operating element, said brake operation quantity detecting sensor including means for correcting, to zero, an output produced when said brake operating element is not operated.

12. A braking system for an electric vehicle according to claims 1, 2 or 9, further including a timer which starts a count-down upon switching-over between the hydraulic braking and the regenerative braking, and means for maintaining a magnitude of the regenerative braking force at a constant value for a predetermined period of time on the basis of an output from said timer.

13. A braking system for an electric vehicle according to claims 1, 2 or 9, further including a timer which starts a count-down upon switching-over between the hydraulic braking and the regenerative braking, and means for maintaining a magnitude of the hydraulic braking force at a constant value for a predetermined period of time on the basis of an output from said timer.

14. A braking system for an electric vehicle according to claims 1, 2 or 9, further including a timer which starts the count-down upon switching-over between the hydraulic braking and the regenerative braking, and means for maintaining a magnitude of each of the hydraulic braking force and the regenerative braking force at a constant value for a predetermined period of time on the basis of an output from said timer.

15. A braking system for an electric vehicle according to claims 1, 2 or 9, further including means for applying a time delay processing to a variation in the regenerative braking force upon switching-over between the hydraulic braking and the regenerative braking.

16. A braking system for an electric vehicle according to claims 1, 2 or 9, further including means for applying a time delay processing to a variation in the hydraulic braking force upon switching over between the hydraulic braking and the regenerative braking.

17. A braking system for an electric vehicle according to claims 1, 2 or 9, further including means for applying a time delay processing to variations in the hydraulic braking force and regenerative braking force upon switching-over between the hydraulic braking and the regenerative braking.

18. A braking system for an electric vehicle according to claims 1, 2 or 9, wherein the vehicle has left and right non-driven wheels and wherein a regenerative-preferential mode in which the regenerative braking force is given at a high ratio and a normal mode in which the regenerative braking force is given at a low ratio are provided so as to be switchable over from one to another, said regenerative-preferential mode is switched to said normal mode during a steering operation, and said steering operation is judged on the basis of a difference between outputs from a pair of wheel speed sensors for separately detecting speeds of the left and right non-driven wheels.

19. A braking system for an electric vehicle according to claims 1, 2 or 9, further including a battery voltage sensor for detecting a battery voltage, and control means for comparing said battery voltage and a battery voltage limit with each other and, if said battery voltage exceeds the battery voltage limit, controlling the limit of the regenerative braking force of the motor.

20. A braking system for an electric vehicle according to claim 19, further including a timer for detecting the lapse of a predetermined time, wherein the battery voltage and the battery voltage limit are compared with each other for every lapse of the predetermined time based on outputs of said timer.

21. A braking system for an electric vehicle according to claim 19, wherein when the battery voltage exceeds the battery voltage limit, a current regenerative braking force is determined as said limit of the regenerative braking force.

22. A braking system for an electric vehicle according to claim 19, wherein said limit of the regenerative braking force is determined on the basis of a battery over voltage which is a battery voltage exceeding the battery voltage limit.

23. A braking system for an electric vehicle according to claim 12, wherein the vehicle has left and right non-driven wheels and wherein a regenerative-preferential mode in which the regenerative braking force is given at a high ratio and a normal mode in which the regenerative braking force is given at a low ratio are provided so as to be switchable over from one to another, said regenerative-preferential mode is switched to said normal mode during a steering operation, and said steering operation is judged on the basis of a difference between outputs from a pair of wheel speed sensors for separately detecting speeds of the left and right non-driven wheels.

24. A braking system for an electric vehicle according to claim 13, wherein the vehicle has left and right non-driven wheels and wherein a regenerative-preferential mode in which the regenerative braking force is given at a high ratio and a normal mode in which the regenerative braking force is given at a low ratio are provided so as to be switchable over from one to another, said regenerative-preferential mode is switched to said normal mode during a steering operation, and said steering operation is judged on the basis of a difference between outputs from a pair of wheel speed sensors for separately detecting speeds of the left and right non-driven wheels.

25. A braking system for an electric vehicle according to claim 14, wherein the vehicle has left and right non-driven wheels and wherein a regenerative-preferential mode in which the regenerative braking force is given at a high ratio and a normal mode in which the regenerative braking force is given at a low ratio are provided so as to be switchable over from one to another, said regenerative-preferential mode is switched to said normal mode during a steering operation, and said steering operation is judged on the basis of a difference between outputs from a pair of wheel speed sensors for separately detecting speeds of the left and right non-driven wheels.

26. A braking system for an electric vehicle according to claim 15, wherein the vehicle has left and right non-driven wheels and wherein a regenerative-preferential mode in which the regenerative braking force is given at a high ratio and a normal mode in which the regenerative braking force is given at a low ratio are provided so as to be switchable over from one to another, said regenerative-preferential mode is switched to said normal mode during a steering operation, and said steering operation is judged on the basis of a difference between outputs from a pair of wheel speed sensors for separately detecting speeds of the left and right non-driven wheels.

27. A braking system for an electric vehicle according to claims 16, wherein the vehicle has left and right non-driven wheels and wherein a regenerative-preferential mode in which the regenerative braking force is given at a high ratio and a normal mode in which the regenerative braking force is given at a low ratio are provided so as to be switchable over from one to another, said regenerative-preferential mode is switched to said normal mode during a steering operation, and said steering operation is judged on the basis of a difference between outputs from a pair of wheel speed sensors for separately detecting speeds of the left and right non-driven wheels.

28. A braking system for an electric vehicle according to claims 17, wherein the vehicle has left and right non-driven wheels and wherein a regenerative-preferential mode in which the regenerative braking force is given at a high ratio and a normal mode in which the regenerative braking force is given at a low ratio are provided so as to be switchable over from one to another, said regenerative-preferential mode is switched to said normal mode during a steering operation, and said steering operation is judged on the basis of a difference between outputs from a pair of wheel speed sensors for separately detecting speeds of the left and right non-driven wheels.

29. A braking system tier an electric vehicle having a driven wheel which is connected to and driven by a motor using a battery as an energy source, wherein the driven wheel is braked hydraulically and regeneratively on the basis of the operation of a brake operating element, a master cylinder for generating a hydraulic braking pressure by the operation of the brake operating element and a brake cylinder for the driven wheel, an improvement comprising, means for controlling the hydraulic braking pressure from said master cylinder to maintain the hydraulic pressure at the brake cylinder substantially at zero in a region between no operation of the brake operating element and a predetermined magnitude of operation of the brake operating element, means for controlling a regenerative braking force which is determined in proportion to the magnitude of operation of the brake operating element so as to be to a substantially maximum regenerative braking force at said predetermined magnitude of operation of the brake operating element, said means for controlling the regenerative braking force being operable to reduce the regenerative braking force during a steering operation of the vehicle as compared with the regenerative braking force during a non-steering operation of the vehicle.

30. A braking system for an electric vehicle according to claim 29, wherein the substantially maximum braking force is maintained constant upon further increased operation of the brake operating element and said means for controlling the hydraulic brake pressure increases the hydraulic braking pressure in the brake cylinder proportional to the increased operation of the brake operating element.

31. A braking system for an electric vehicle according to claim 29, wherein said means for controlling the hydraulic pressure is operated only when the brake operating element is operated.

32. A braking system for an electric vehicle according to claim 29, wherein the vehicle has a non-driven wheel which is provided with a brake cylinder connected through a means for controlling the hydraulic pressure in said brake cylinder from the master cylinder, and wherein a regenerative-preferential mode in which a hydraulic braking of the non-driven wheel is started by the operation of the brake operating element after the regenerative braking force of the motor reaches said substantially maximum magnitude, and a normal mode in which the hydraulic braking of the non-driven wheel is started simultaneously with the operation of the brake operating element, are provided so as to be switchable from one mode to the other mode, and a relationship between said substantially maximum magnitude of the regenerative braking force and said differential pressure is differentiated between the modes.

33. A braking system for an electric vehicle according to claim 32, wherein the vehicle has left and right non-driven wheels, wherein said regenerative-preferential mode is switched over to said normal mode during a steering operation of the vehicle.

34. A braking system for an electric vehicle according to claim 29, further including means for prohibiting the regenerative braking when said motor is brought into a driving state by the operation of an accelerator operating element.

35. A braking system for an electric vehicle according to claim 29, further including a brake operation quantity detecting sensor for detecting the quantity of operation of said brake operating element, said brake operation quantity detecting sensor including means for correcting, to zero, an output produced when said brake operating element is not operated.

36. A braking system for an electric vehicle according to claim 29, further including a timer which starts a count-down upon switching-over between the hydraulic braking and the regenerative braking, and means for maintaining a magnitude of the regenerative braking force at a constant value for a predetermined period of time on the basis of an output from said timer.

37. A braking system for an electric vehicle according to claim 29, further including a timer which starts a count-down upon switching-over between the hydraulic braking and the regenerative braking, and means for maintaining a magnitude of the hydraulic braking force at a constant value for a predetermined period of time on the basis of an output from said timer.

38. A braking system for an electric vehicle according to claim 29, further including a timer which starts the count-down upon switching-over between the hydraulic braking and the regenerative braking, and means for maintaining a magnitude of each of the hydraulic braking force and the regenerative braking force at a constant value for a predetermined period of time on the basis of an output from said timer.

39. A braking system for an electric vehicle according to claim 29, further including means for applying a time processing to a variation in the regenerative braking force upon switching-over between the hydraulic braking and the regenerative braking.

40. A braking system for an electric vehicle according to claim 29, further including means for applying a time delay processing to a variation in the hydraulic braking force upon switching over between the hydraulic braking and the regenerative braking.

41. A braking system for an electric vehicle according to claim 29, further including means for applying a time delay processing to variations in the hydraulic braking force and regenerative braking force upon switching-over between the hydraulic braking and the regenerative braking.

42. A braking system for an electric vehicle according to claim 29, further including a battery voltage sensor for detecting a battery voltage, and control means for comparing said battery voltage and a battery voltage limit with each other and, if said battery voltage exceeds the battery voltage limit, controlling the substantially maximum magnitude of the regenerative braking force of the motor.

43. A braking system for an electric vehicle according to claim 42, further including a timer for detecting the lapse of a predetermined time, wherein the battery voltage and the battery voltage limit are compared with each other for every lapse of the predetermined time based on outputs of said timer.

44. A braking system for an electric vehicle having a driven wheel which is connected to and driven by a motor using a battery as an energy source, wherein the driven wheel is braked hydraulically and regeneratively on the basis of the operation of a brake operating element, a master cylinder for generating a hydraulic braking pressure by the operation of the brake operating element, and a brake cylinder for the driven wheel, an improvement comprising, means for controlling the hydraulic braking pressure from said master cylinder to maintain the hydraulic pressure at the brake cylinder substantially at zero in a region between no operation of the brake operating element and a predetermined magnitude of operation of the brake operating element, means for controlling a regenerative braking force which is determined in proportion to the magnitude of operation of the brake operating element so as to be a substantially maximum regenerative braking force at said predetermined magnitude of operation of the brake operating element, wherein the vehicle has a non-driven wheel which is provided with a brake cylinder connected through a means for controlling the hydraulic pressure in said brake cylinder from the master cylinder, and wherein a regenerative-preferential mode in which a hydraulic braking of the non-driven wheel is started by the operation of the brake operating element after the regenerative braking force of the motor reaches said substantially maximum magnitude, and a normal mode in which the hydraulic braking of the non-driven wheel is started simultaneously with the operation of the brake operating element, are provided so as to be switchable from one mode to the other mode, and a relationship between said substantially maximum magnitude of the regenerative braking force and said differential pressure is differentiated between the modes.

45. A braking system for an electric vehicle according to claim 44, wherein the vehicle has left and right non-driven wheels, wherein said regenerative-preferential mode is switched over to said normal mode during a steering operation of the vehicle.

46. A braking system for an electric vehicle having a driven wheel which is connected to and driven by a motor using a battery as an energy source, wherein the driven wheel is braked hydraulically and regeneratively on the basis of the operation of a brake operating element, a master cylinder for generating a hydraulic braking pressure by the operation of the brake operating element, and a brake cylinder for the driven wheel, an improvement comprising, means for controlling the hydraulic braking pressure from said master cylinder to maintain the hydraulic pressure at the brake cylinder substantially at zero in a region between no operation of the brake operating element and a predetermined magnitude of operation of the brake operating element, means for controlling a regenerative braking force which is determined in proportion to the magnitude of operation of the brake operating element so as to be a substantially maximum regenerative braking force at said predetermined magnitude of operation of the brake operating element, and further including means for prohibiting the regenerative braking when said motor is brought into a driving state by the operation of an accelerator operating element.

47. A braking system for an electric vehicle having a driven wheel which is connected to and driven by a motor using a battery as an energy source, wherein the driven wheel is braked hydraulically and regeneratively on the basis of the operation of a brake operating element, a master cylinder for generating a hydraulic braking pressure by the operation of the brake operating element, and a brake cylinder for the driven wheel, an improvement comprising, means for controlling the hydraulic braking pressure from said master cylinder to maintain the hydraulic pressure at the brake cylinder substantially at zero in a region between no operation of the brake operating element and a predetermined magnitude of operation of the brake operating element, means for controlling a regenerative braking force which is determined in proportion to the magnitude of operation of the brake operating element so as to be a substantially maximum regenerative braking force at said predetermined magnitude of operation of the brake operating element, and further including a brake operation quantity detecting sensor for detecting the quantity of operation of said brake operating element, said brake operation quantity detecting sensor including means for correcting, to zero, an output produced when said brake operating element is not operated.

48. A braking system for an electric vehicle having a driven wheel which is connected to and driven by a motor using a battery as an energy source, wherein the driven wheel is braked hydraulically and regeneratively on the basis of the operation of a brake operating element, a master cylinder for generating a hydraulic braking pressure by the operation of the brake operating element, and a brake cylinder for the driven wheel, an improvement comprising, means for controlling the hydraulic braking pressure from said master cylinder to maintain the hydraulic pressure at the brake cylinder substantially at zero in a region between no operation of the brake operating element and a predetermined magnitude of operation of the brake operating element, means for controlling a regenerative braking force which is determined in proportion to the magnitude of operation of the brake operating element so as to be a substantially maximum regenerative braking force at said predetermined magnitude of operation of the brake operating element, and further including a timer which starts a count-down upon switching-over between the hydraulic braking and the regenerative braking, and means for maintaining a magnitude of the regenerative braking force at a constant value for a predetermined period of time on the basis of an output from said timer.

49. A braking system for an electric vehicle having a driven wheel which is connected to and driven by a motor using a battery as an energy source, wherein the driven wheel is braked hydraulically and regeneratively on the basis of the operation of a brake operating element, a master cylinder for generating a hydraulic braking pressure by the operation of the brake operating element, and a brake cylinder for the driven wheel, an improvement comprising, means for controlling the hydraulic braking pressure from said master cylinder to maintain the hydraulic pressure at the brake cylinder substantially at zero in a region between no operation of the brake operating element and a predetermined magnitude of operation of the brake operating element, means for controlling a regenerative braking force which is determined in proportion to the magnitude of operation of the brake operating element so as to be a substantially maximum regenerative braking force at said predetermined magnitude of operation of the brake operating element, and further including a timer which starts a count-down upon switching-over between the hydraulic braking and the regenerative braking, and means for maintaining a magnitude of the hydraulic braking force at a constant value for a predetermined period of time on the basis of an output from said timer.

50. A braking system for an electric vehicle having a driven wheel which is connected to and driven by a motor using a battery as an energy source, wherein the driven wheel is braked hydraulically and regeneratively on the basis of the operation of a brake operating element, a master cylinder for generating a hydraulic braking pressure by the operation of the brake operating element, and a brake cylinder for the driven wheel, an improvement comprising, means for controlling the hydraulic braking pressure from said master cylinder to maintain the hydraulic pressure at the brake cylinder substantially at zero in a region between no operation of the brake operating element and a predetermined magnitude of operation of the brake operating element, means for controlling a regenerative braking force which is determined in proportion to the magnitude of operation of the brake operating element so as to be a substantially maximum regenerative braking force at said predetermined magnitude of operation of the brake operating element, and further including a timer which starts the count-down upon switching-over between the hydraulic braking and the regenerative braking, and means for maintaining a magnitude of each of the hydraulic braking force and the regenerative braking force at a constant value for a predetermined period of time on the basis of an output from said timer.

51. A braking system for an electric vehicle having a driven wheel which is connected to and driven by a motor using a battery as an energy source, wherein the driven wheel is braked hydraulically and regeneratively on the basis of the operation of a brake operating element, a master cylinder for generating a hydraulic braking pressure by the operation of the brake operating element, and a brake cylinder for the driven wheel, an improvement comprising, means for controlling the hydraulic braking pressure from said master cylinder to maintain the hydraulic pressure at the brake cylinder substantially at zero in a region between no operation of the brake operating element and a predetermined magnitude of operation of the brake operating element, means for controlling a regenerative braking force which is determined in proportion to the magnitude of operation of the brake operating element so as to be a substantially maximum regenerative braking force at said predetermined magnitude of operation of the brake operating element, and further including a battery voltage sensor for detecting a battery voltage, and control means for comparing said battery voltage and a battery voltage limit with each other and, if said battery voltage exceeds the battery voltage limit, controlling the substantially maximum magnitude of the regenerative braking force of the motor.

52. A braking system for an electric vehicle according to claim 51, further including a timer for detecting the lapse of a predetermined time, wherein the battery voltage and the battery voltage limit are compared with each other for every lapse of the predetermined time based on outputs of said timer.

* * * * *